(12) United States Patent
Okada et al.

(10) Patent No.: US 10,035,640 B2
(45) Date of Patent: *Jul. 31, 2018

(54) OXYGEN-ABSORBING MULTILAYER BODY, OXYGEN-ABSORBING CONTAINER, OXYGEN-ABSORBING AIRTIGHT CONTAINER, OXYGEN-ABSORBING PUSH-THROUGH PACK, AND STORAGE METHOD USING SAME

(71) Applicant: MITSUBISHI GAS CHEMICAL COMPANY, INC., Tokyo (JP)

(72) Inventors: Satoshi Okada, Kanagawa (JP); Shinpei Iwamoto, Kanagawa (JP); Shinichi Ikeda, Tokyo (JP); Fumihiro Ito, Kanagawa (JP); Takashi Kashiba, Kanagawa (JP); Shun Ogawa, Kanagawa (JP); Shota Arakawa, Kanagawa (JP); Kenichiro Usuda, Kanagawa (JP)

(73) Assignee: MITSUBISHI HAS CHEMICAL COMPANY, INC., Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 14/766,562

(22) PCT Filed: Mar. 6, 2014

(86) PCT No.: PCT/JP2014/055871
§ 371 (c)(1),
(2) Date: Aug. 7, 2015

(87) PCT Pub. No.: WO2014/136914
PCT Pub. Date: Sep. 12, 2014

(65) Prior Publication Data
US 2015/0368022 A1      Dec. 24, 2015

(30) Foreign Application Priority Data

| Mar. 6, 2013 | (JP) | ................. | 2013-044233 |
| Mar. 6, 2013 | (JP) | ................. | 2013-044234 |
| Mar. 6, 2013 | (JP) | ................. | 2013-044235 |
| Mar. 6, 2013 | (JP) | ................. | 2013-044422 |
| Mar. 6, 2013 | (JP) | ................. | 2013-044423 |
| Mar. 6, 2013 | (JP) | ................. | 2013-044424 |
| Mar. 6, 2013 | (JP) | ................. | 2013-044425 |
| Mar. 6, 2013 | (JP) | ................. | 2013-044752 |
| Mar. 6, 2013 | (JP) | ................. | 2013-044753 |

(51) Int. Cl.
*B65D 81/26* (2006.01)
*A61J 1/14* (2006.01)
(Continued)

(52) U.S. Cl.
CPC ............ *B65D 81/266* (2013.01); *B32B 27/06* (2013.01); *B32B 27/08* (2013.01); *B32B 27/18* (2013.01);
(Continued)

(58) Field of Classification Search
CPC ... A61J 1/1468; A61M 5/3129; B65D 81/266; B65D 11/20; B32B 27/08; B32B 27/36; B32B 27/34; B32B 27/32; B32B 27/18; B32B 2250/00; B32B 2553/00; B32B 2250/05; B32B 2250/02; B32B 2307/54
USPC ......... 252/188.28, 194, 184, 182.28, 188.25, 252/397, 182.17, 188.1, 400.3, 400.53, 252/408.1, 182.1, 182.16, 186.24, 188.2, 252/188.21, 2, 364, 373, 398, 400.1, 252/400.2, 400.52, 405, 407, 586, 588,
(Continued)

(56) References Cited

U.S. PATENT DOCUMENTS

| 5,346,644 A | 9/1994 | Speer et al. |
| 2001/0016670 A1 | 8/2001 | Murara et al. |

(Continued)

FOREIGN PATENT DOCUMENTS

| CN | 104582831 | 4/2015 |
| JP | 51-136845 | 11/1976 |

(Continued)

OTHER PUBLICATIONS

Atsushi (JP2008050403A, Atasushi, et al., machine translation, p. 1-25).*

(Continued)

*Primary Examiner* — James C Yager
*Assistant Examiner* — Kevin C Ortman, Jr.
(74) *Attorney, Agent, or Firm* — Greenblum & Bernstein, P.L.C.

(57) ABSTRACT

Provided is an oxygen-absorbing multilayer body including an oxygen-absorbing layer containing an oxygen-absorbing composition and a thermoplastic resin layer containing a thermoplastic resin (b), wherein the oxygen-absorbing composition includes at least one compound having a tetralin ring represented by Formula (1), a transition metal catalyst, and a thermoplastic resin (a).

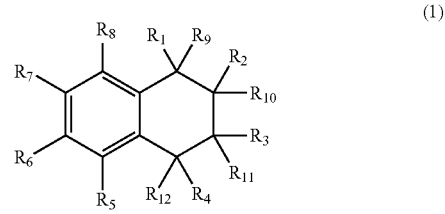

(1)

16 Claims, No Drawings

(51) Int. Cl.
*B65D 6/00* (2006.01)
*B32B 27/18* (2006.01)
*B32B 27/06* (2006.01)
*B32B 27/08* (2006.01)
*B32B 27/32* (2006.01)
*B32B 27/34* (2006.01)
*B32B 27/36* (2006.01)
*B32B 27/30* (2006.01)
*B65B 25/00* (2006.01)

(52) U.S. Cl.
CPC ............ *B32B 27/306* (2013.01); *B32B 27/32* (2013.01); *B32B 27/325* (2013.01); *B32B 27/34* (2013.01); *B32B 27/36* (2013.01); *B65B 25/001* (2013.01); *B32B 2250/00* (2013.01); *B32B 2250/02* (2013.01); *B32B 2250/05* (2013.01); *B32B 2250/24* (2013.01); *B32B 2250/242* (2013.01); *B32B 2307/724* (2013.01); *B32B 2307/7244* (2013.01); *B32B 2307/7265* (2013.01); *B32B 2439/00* (2013.01); *B32B 2439/70* (2013.01); *B32B 2439/80* (2013.01); *B32B 2553/00* (2013.01); *B65D 81/267* (2013.01); *Y10T 428/1397* (2015.01); *Y10T 428/2848* (2015.01); *Y10T 428/3192* (2015.04); *Y10T 428/31797* (2015.04)

(58) Field of Classification Search
USPC ......... 252/589, 67, 68, 8.83; 428/35.7, 36.6, 428/35.2, 35.8, 36.92, 523, 336, 34.1, 428/483, 516, 423.1, 474.7, 500, 220, 428/34.9, 35.4, 36.7, 411.1, 451, 457, 428/474.4, 475.2, 515, 520, 137, 141, 428/201, 316.6, 323, 34.2, 35.9, 402, 446, 428/476.3, 476.9, 480, 518, 522, 702, 76, 428/81, 142, 146, 147, 149, 156, 159, 428/189, 195.1, 198, 209, 210, 211.1, 428/212, 216, 219, 315.9, 32.39, 332, 428/335, 338, 339, 343, 349, 34.5, 34.7, 428/354, 35.3, 36.1, 36.4, 36.91, 391, 428/408, 412, 413, 424.2, 425.5, 425.9, 428/426, 429, 430, 447, 448, 450, 458, 428/461, 472, 475.8, 484.1, 512; 506/9, 506/2, 39, 35, 12, 38, 7, 10, 11, 17, 18, 506/23, 26, 33, 4, 40, 8

See application file for complete search history.

(56) References Cited

U.S. PATENT DOCUMENTS

| | | |
|---|---|---|
| 2002/0133119 A1 | 9/2002 | Eakins et al. |
| 2003/0012896 A1* | 1/2003 | Ching ................. B32B 27/06 428/34.2 |
| 2004/0267194 A1 | 12/2004 | Sano et al. |
| 2005/0142373 A1 | 6/2005 | Komatsu et al. |
| 2007/0036923 A1 | 2/2007 | Ishizaki et al. |
| 2008/0241521 A1 | 10/2008 | Solovyov et al. |
| 2009/0162675 A1 | 6/2009 | Bourgeois |
| 2011/0172335 A1* | 7/2011 | Deshpande .......... C08K 5/3417 524/94 |
| 2013/0145962 A1* | 6/2013 | Gupta ................. C08K 5/1545 106/287.21 |
| 2013/0284617 A1 | 10/2013 | Yamada et al. |
| 2015/0232251 A1 | 8/2015 | Ikeda et al. |

FOREIGN PATENT DOCUMENTS

| | | |
|---|---|---|
| JP | 1-259870 | 10/1989 |
| JP | 2-500846 | 3/1990 |
| JP | 5-115776 | 5/1993 |
| JP | 7-39329 | 2/1995 |
| JP | 8-127641 | 5/1996 |
| JP | 8-133345 | 5/1996 |
| JP | 9-234832 | 9/1997 |
| JP | 2000-319207 | 11/2000 |
| JP | 2001-233809 | 8/2001 |
| JP | 2001-252560 | 9/2001 |
| JP | 2003-521552 | 7/2003 |
| JP | 2004-229750 | 8/2004 |
| JP | 2008-050403 | 3/2008 |
| JP | 2008050403 A * | 3/2008 |
| JP | 2009-108153 | 5/2009 |
| JP | 2011-212447 | 10/2011 |
| WO | 89/01012 | 2/1989 |
| WO | 99/48963 | 9/1999 |
| WO | 2004/018556 | 3/2004 |
| WO | 2005/105887 | 11/2005 |
| WO | 2012/102086 | 8/2012 |
| WO | 2014/034800 | 3/2014 |

OTHER PUBLICATIONS

International Search Report issued in PCT/JP2014/055871, dated Jun. 10, 2014.

* cited by examiner

OXYGEN-ABSORBING MULTILAYER BODY, OXYGEN-ABSORBING CONTAINER, OXYGEN-ABSORBING AIRTIGHT CONTAINER, OXYGEN-ABSORBING PUSH-THROUGH PACK, AND STORAGE METHOD USING SAME

TECHNICAL FIELD

The present invention relates to an oxygen-absorbing multilayer body, an oxygen-absorbing container, an oxygen-absorbing sealed container, an oxygen-absorbing PTP packaging body, and a storage method using them.

BACKGROUND ART

In order to prevent oxygen oxidation of various types of articles that are easily deteriorated or degraded by oxygen, such as foods, beverages, medicinal products, and cosmetics, and to store them for a long time, oxygen absorbers are used for removing oxygen inside the containers accommodating these articles.

As the oxygen absorber, an oxygen absorber including an iron powder as the base reactive compound is generally used because of its oxygen-absorbing ability, easiness in handling, and safety. The iron-based oxygen absorber is, however, responsive to a metal detector, and it is therefore difficult to use a metal detector for inspection of foreign matters. Furthermore, packaging bodies containing iron-based oxygen absorbers cannot be heated by a microwave oven because of a risk of ignition. Moreover, since the oxidation reaction of an iron powder needs water, the oxygen-absorbing effect is exhibited only when moisture-rich articles are stored.

Packaging containers and other containers having improved gas barrier properties and oxygen-absorbing properties have been developed by making the containers by a multilayer material including an oxygen-absorbing layer of an oxygen-absorbing resin composition composed of a thermoplastic resin and an iron-based oxygen absorber blended therein (see Patent Literature 1). Specifically, the oxygen-absorbing multilayer film includes an oxygen-absorbing layer disposed between the layers of a conventional gas barrier multilayer film composed of a heat sealing layer and a gas barrier layer, with an intermediate layer of a thermoplastic resin between the oxygen-absorbing layer and each of the layers of the conventional gas barrier multilayer film, depending on the case. The oxygen-absorbing layer is a thermoplastic resin layer dispersing an oxygen absorber therein. The oxygen-absorbing multilayer film is used as a film having the function of absorbing oxygen inside a container in addition to the function of preventing oxygen permeation from the outside and is produced by a known production method, such as extrusion lamination, coextrusion lamination, or dry lamination. However, this oxygen-absorbing multilayer film also similarly has disadvantages: The multilayer film is detected by a metal detector for foreign matter inspection of foods, etc., cannot be heated by a microwave oven, and shows the effect only on moisture-rich articles to be stored. The oxygen-absorbing multilayer film also has a disadvantage of insufficient internal visibility due to its opacity. An oxygen-absorbing multilayer film containing an oxygen absorber such as an iron powder has disadvantages: The multilayer film is detected by a metal detector for foreign matter inspection of foods, etc., has insufficient internal visibility due to its opacity, and reduces flavor when the contents are an alcoholic beverage due to generation of aldehyde by oxidation reaction of alcohol using iron as a catalyst.

If a container accommodating contents is sealed in the air, the air is taken and entrapped inside the container. Consequently, a certain amount of oxygen is taken inside the container and affects the contents in some way. Although the degree of the influence varies depending on the chemical properties of the contents, the flavor and color tone are gradually degraded after the sealing. The flavor and color tone are degraded by the influence of oxygen with an increase in storage period or distribution period after sealing, resulting in a reduction in commercial value. Thus, the existence of oxygen is not negligible, even if the amount is small.

For example, commercially available processed cooked rice is mainly stored as retort pouch cooked rice. In this storage, however, the rice is sterilized by heating under conditions different from common cooking conditions, leading to a disadvantage of degradation of the taste. Accordingly, sterilized cooked rice prepared by processing rice by a common cooking method in a sterile environment has been commercialized. Recently, a technique of wrapping such sterilized cooked rice with a multilayer body having an oxygen-absorbing function has been disclosed (see Patent Literature 7). Furthermore, a method for producing cooked rice by filling an oxygen-scavenging multilayer container with rice and water, performing substitution of oxygen inside the container, sealing the container, and then heating and cooking the rice has been disclosed (see Patent Literature 8). However, retort pouch cooked rice using an oxygen absorber such as an iron powder has disadvantages: The multilayer body is detected by a metal detector for foreign matter inspection of foods, etc.; if the multilayer body is used as the lid member, the iron powder adheres to the flange part when unsealed; the workability is low, and there is no visibility of the contents due to low transparency.

Technologies for filling metallic cans or glass bottles with alcoholic beverages, such as rice wine (Japanese sake), wine, or distilled spirit (shochu), and storing the alcoholic beverages are known. In these technologies, the metallic cans and glass bottles involve the problem of treatment of noncombustible waste and are required to be reduced in the weight of the packaging containers. In addition, metallic cans have the problem of dissolution of the metallic component into the contents and have been replaced with plastic containers such as gas barrier multilayer containers. When an alcoholic beverage is stored in a gas barrier multilayer body composed of usual gas barrier films, the operation in the air for filling a boron container with an alcoholic beverage necessarily causes contamination by the air. In order to prevent this contamination, although an inert gas, typically a nitrogen gas, is used for preventing the contamination by the air, the contamination by the air cannot be completely prevented, and such an operation in an actual production process increases the number of steps, resulting in a reduction in production efficiency. In other words, even if any gas replacement has been performed, a small amount of oxygen remaining in the packaging container or a small amount of oxygen dissolved in the alcoholic beverage inevitably causes a deterioration in the flavor of alcoholic beverages.

Furthermore, regarding drug solutions, as medical packaging containers for packaging and storing drug solutions in hermetically sealed conditions, for example, glass ampoules, vials, and prefilled syringes have been conventionally used. These glass containers, however, have problems: sodium ions and other components elute into the solution of the contents inside the container during storage; micro substances called flakes occur; when a light-shielding glass container colored with a metal is used, the contents are contaminated by the metal for coloring; and the container is easily broken by a shock such as falling. In addition to these problems, since glass containers have a relatively large specific gravity, medical packaging containers are disadvantageously heavy. Therefore, development of alternate materials has been demanded. Specifically, plastics lighter than glass, for example, polyester, polycarbonate, polypropylene, and cycloolefin polymers, have been investigated as glass alternatives. For example, a medical container made of a polyester-based resin material has been proposed (see Patent Literature 9).

Meanwhile, a plastic multilayer container including a gas barrier layer as an intermediate layer for providing a gas barrier property to the container has been investigated. Specifically, a prefilled syringe including the innermost layer and the outermost layer of a polyolefin-based resin and an intermediate layer of a resin composition having an excellent oxygen barrier property and thereby having an enhanced oxygen barrier property has been proposed (see Patent Literature 10). Furthermore, a multilayer container prepared by laminating a gas barrier layer on a resin layer has been investigated, where the gas barrier layer is made of, for example, a polyamide prepared from metaxylylenediamine and adipic acid (hereinafter, may be referred to as "nylon MXD6"), an ethylene-vinyl alcohol copolymer, polyacrylonitrile, poly(vinylidene chloride), aluminum foil, a carbon coat, or a vapor-deposited inorganic oxide. Furthermore, in recent years, nylon MXD6 provided with an oxygen-absorbing function by being mixed with a small amount of a transition metal compound has been proposed to be used as an oxygen barrier material constituting containers or packaging materials (see Patent Literature 11).

In the field of packaging medicinal products, foods, etc., press-through package (PTP) packaging bodies (may also referred to as blister package) are widely used for packaging medicinal agents such as tablets and capsules, granular foods, and other products. The PTP packaging is a form having a pocket portion for accommodating an article to be stored at the bottom formed by, for example, pressure molding or vacuum molding of a bottom member that is a plastic sheet of, e.g., a polyvinyl chloride resin or a polypropylene resin. The article to be stored is placed in the pocket portion, and the pocket portion is then sealed by laminating foil or a film made of a material that can be easily torn or broken by hand or be easily opened, such as aluminum foil, as the lid member. In the PTP packaging body, use of a transparent plastic sheet as the bottom member allows the article to be stored accommodated in the pocket to be directly observed with the naked eye before opening the packaging body. In addition, the article to be stored can be easily taken out by pressing the article from the pocket portion side with a finger to break the lid member.

However, if a PTP packaging body accommodating an article to be stored is sealed in the air, the air is taken and entrapped inside the packaging body. Consequently, a certain amount of oxygen is taken in the packaging body and affects the article to be stored in some way. Although the degree of the influence varies depending on the chemical properties of the article to be stored, the medicinal ingredients of medicinal agents and the flavor and color tone of foods are gradually degraded after the sealing. The quality is degraded by the influence of oxygen with an increase in storage period or distribution period after sealing. Thus, the existence of oxygen is not negligible, even if the amount is small.

In the aforementioned circumstances, an oxygen absorber including an organic material as a base reactive compound has been demanded. An oxygen absorber including ascorbic acid as the base compound is known as an oxygen absorber including an organic material as a base reactive compound (see Patent Literature 2).

Meanwhile, an oxygen-absorbing resin composition composed of a resin and a transition metal catalyst is known. For example, a resin composition composed of a polyamide as an oxidizable organic component, in particular, a xylylene group-containing polyamide, and a transition metal catalyst is known (see, Patent Literatures 3 and 4). Patent Literatures 3 and 4 exemplify packaging materials obtained by molding resin compositions.

An oxygen-absorbing resin composition composed of a resin having a carbon-carbon unsaturated bond and a transition metal catalyst is also known as an oxygen-absorbing resin composition not requiring moisture for absorbing oxygen (see Patent Literature 5).

Furthermore, a composition composed of a polymer containing a substituted cyclohexene functional group or a low molecular-weight substance bonded to the cyclohexene functional group and a transition metal is known as a composition for trapping oxygen (see Patent Literature 6).

PATENT LITERATURE

Patent Literature 1: Japanese Patent Laid-Open No. H09-234832
Patent Literature 2: Japanese Patent Laid-Open No. S51-136845
Patent Literature 3: Japanese Patent Laid-Open No. 2001-252560
Patent Literature 4: Japanese Patent Laid-Open No. 2009-108153
Patent Literature 5: Japanese Patent Laid-Open No. H05-115776
Patent Literature 6: National Publication of International Patent Application No. 2003-521552
Patent Literature 7: Japanese Patent Laid-Open No. H08-133345
Patent Literature 8: Japanese Patent Laid-Open No. H07-039329
Patent Literature 9: Japanese Patent Laid-Open No. H08-127641
Patent Literature 10: Japanese Patent Laid-Open No. 2004-229750
Patent Literature 11: Japanese Patent Laid-Open No. H02-500846

SUMMARY OF THE INVENTION

Problems to be Solved by the Invention

Unfortunately, the oxygen absorber described in Patent Literature 2 has disadvantages: The oxygen-absorbing performance is intrinsically low; the effect is expressed only when moisture-rich articles are stored; and the cost is relatively high.

The resin composition in Patent Literature 3 expresses an oxygen-absorbing function by oxidizing a xylylene group-containing polyamide resin in the presence of a transition metal catalyst, and thereby has a disadvantage, i.e., occurrence of cleavage of the polymer chain by oxidation degradation of the resin after oxygen absorption, resulting in a reduction in the strength of the packaging container itself. This resin composition also has disadvantages that the oxygen-absorbing performance is still insufficient and that the effect is expressed only when moisture-rich articles are stored. Patent Literature 4 describes a method for preventing peeling of the interlayer, but the effect is restrictive. This resin composition also has disadvantages that the oxygen-absorbing performance is still insufficient and that the effect is expressed only when moisture-rich articles are stored.

The oxygen-absorbing resin composition in Patent Literature 5 has, as in above, the problem of generation of a low molecular-weight organic compound, which becomes an odorous component, due to cleavage of the polymer chain by oxidation of the resin, resulting in occurrence of an odor after oxygen absorption.

The composition in Patent Literature 6 needs to contain a special material having a cyclohexene functional group. This material still has a disadvantage of relatively easily causing occurrence of an odor.

Regarding storage of the above-described drug solutions, the conventional gas barrier multilayer container and the multilayer container for medical use mentioned above are insufficient in the basic performance, such as oxygen barrier property, water vapor barrier property, drug solution adsorptivity, and durability of the container. These containers, therefore, have some points to be improved in order to store drug solutions. For example, improvement is required from the viewpoint of the performance of storing contents, such as a drug solution or a food. In particular, when a drug solution is stored in a conventional gas barrier multilayer container, the fact is that complete removal of oxygen in a packing container is difficult or significantly uneconomical even if any gas replacement is operated. In other words, it is difficult to completely eliminate oxygen, such as oxygen dissolved in a drug solution, oxygen contained in air bubbles generated and introduced during mixing of raw materials of the drug solution, and oxygen dissolved in a solvent, such as distilled water, in a case of using the solvent. Although oxygen can be removed as much as possible by strictly controlling the conditions for selection and preparation of raw materials of the drug solution, such an operation ignoring an economic aspect is unrealistic. In addition, as described above, the oxygen barrier property of the gas barrier multilayer container is insufficient, and a small amount of oxygen penetrating from outside through the wall of the container cannot be completely eliminated.

For example, the medical container made of a polyester-based resin of Patent Literature 9 has an oxygen barrier property insufficient for completely blocking oxygen and also is inferior to a container made of a polyolefin-based resin in the water vapor barrier property. In addition, since the polyester-based resin does not have oxygen-absorbing performance, the medical container has the problem of being impossible to prevent a degradation of the drug solution inside the container, if oxygen penetrates into the container from outside or if oxygen remains in the head space above the contents inside the container.

The oxygen barrier property of the prefilled syringe of Patent Literature 10 is insufficient for completely blocking oxygen. In addition, the oxygen barrier resin composition in the intermediate layer does not have oxygen-absorbing performance. Thus, prefilled syringe has the problem of being impossible to prevent a degradation of the drug solution inside the container, if oxygen penetrates into the container from the outside or if oxygen remains in the head space above the contents inside the container.

The resin composition of Patent Literature 11 has the problem of a reduction in strength due to oxidation degradation of the resin after oxygen absorption, resulting in a reduction in the strength of the packaging container itself. In addition, this resin composition also has the following problems: the oxygen-absorbing performance is still insufficient and the effect is expressed only when moisture-rich articles are stored.

The present invention has been made under the above-described circumstances, and an object thereof is to provide an oxygen-absorbing multilayer body not causing odor generation after oxygen absorption and having excellent oxygen-absorbing performance and to provide an oxygen-absorbing container including the laminate. Another object of the present invention is to provide an oxygen-absorbing multilayer body having excellent oxygen-absorbing performance under broad humidity conditions from low humidity to high humidity and to provide an oxygen-absorbing container including the laminate.

A further another object of the present invention is to provide an oxygen-absorbing multilayer injection-molded product not causing odor generation after oxygen absorption and having excellent oxygen-absorbing performance. Further another object of the present invention is to provide an oxygen-absorbing multilayer injection-molded product having excellent oxygen-absorbing performance under broad humidity conditions from low humidity to high humidity.

Further another object of the present invention is to provide an oxygen-absorbing PTP packaging body including an oxygen-absorbing multilayer body as the bottom member and exhibiting suppressed odor generation after oxygen absorption and excellent oxygen-absorbing performance.

Further another object of the present invention is to provide a method for storing cooked rice for a long period of time without degrading its flavor while maintaining the color tone.

Further another object of the present invention is to provide a method for storing an alcoholic beverage for a long period of time without degrading its flavor.

Further another object of the present invention is to provide a method for storing fruit juice and/or vegetable juice for a long period of time without degrading their flavor while maintaining the color tone.

Further another object of the present invention is to provide a method for storing a drug solution that can prevent oxidation degradation of the drug solution during storage, prevent contamination of the drug solution with impurities, and prevent a reduction in drug efficacy of the drug solution after storage.

Means for Solving the Problems

The present inventors have conducted intensive studies and have found that the above-described problems can be solved by an oxygen-absorbing multilayer body including an oxygen-absorbing layer containing at least one compound having a predetermined tetralin ring, a transition metal catalyst, and an oxygen-absorbing composition containing a thermoplastic resin; and a thermoplastic resin layer containing a thermoplastic resin, and have accomplished the present invention.

That is, the present invention relates to the following aspects.

<1>

An oxygen-absorbing multilayer body comprising:

an oxygen-absorbing layer containing an oxygen-absorbing composition and a thermoplastic resin layer containing a thermoplastic resin (b), wherein the oxygen-absorbing composition includes at least one compound having a tetralin ring represented by Formula (1), a transition metal catalyst, and a thermoplastic resin (a):

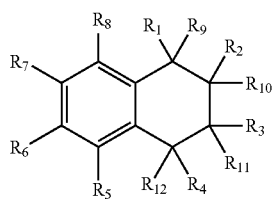
(1)

where $R_1$ to $R_{12}$ each independently represent a hydrogen atom or a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, an imide group, a substituent represented by Formula (1a), and a substituent represented by Formula (1b), which each optionally further have a substituent; two of the substituents represented by $R_1$ to $R_{12}$ are optionally bonded to each other to form a ring; and at least one hydrogen atom is bonded to a benzylic position of the tetralin ring;

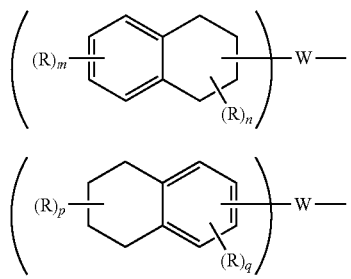
(1a)
(1b)

where each R independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide groups, which each optionally further have a substituent; two of the substituents each represented by R are optionally bonded to each other to form a ring; W represents a bond or a bivalent organic group, the bivalent organic group being at least one selected from the group consisting of an aromatic hydrocarbon group, a saturated or unsaturated alicyclic hydrocarbon group, a linear or branched saturated or unsaturated aliphatic hydrocarbon group and a heterocyclic group, —C(=O)—, —OC(=O)—, —N(H)C(=O)—, and an arbitrary combination thereof; m represents an integer of 0 to 4; n represents an integer of 0 to 7; p represents an integer of 0 to 8; and q represents an integer of 0 to 3.

<2>

The oxygen-absorbing multilayer body according to <1>, wherein the compound having a tetralin ring represented by Formula (1) includes two or more carbonyl groups.

<3>

The oxygen-absorbing multilayer body according to <2>, wherein in Formula (1), at least two of $R_1$ to $R_{12}$ are monovalent substituents represented by Formula (2):

$$—C(=O)—X \qquad (2)$$

where X represents one selected from the group consisting of a hydrogen atom, a hydroxy group, an alkyl group, an alkoxy group, a monoalkylamino group, and a dialkylamino group; and a plurality of X may be the same or different.

<4>

The oxygen-absorbing multilayer body according to any one of <1> to <3>, wherein the compound having a tetralin ring represented by Formula (1) includes two or more tetralin rings.

<5>

The oxygen-absorbing multilayer body according to any one of <1> to <4>, wherein a proportion of the amount of the compound having a tetralin ring represented by Formula (1) to the total amount of the compound having a tetralin ring represented by Formula (1) and the thermoplastic resin (a) in the oxygen-absorbing composition is 1% to 30% by mass.

<6>

The oxygen-absorbing multilayer body according to any one of <1> to <5>, wherein the thermoplastic resin (a) is at least one selected from the group consisting of a polyolefin, a polyester, a polyamide, an ethylene-vinyl alcohol copolymer, and a chlorine-containing resin.

<7>

The oxygen-absorbing multilayer body according to any one of <1> to <6>, wherein the transition metal catalyst contains at least one transition metal selected from the group consisting of manganese, iron, cobalt, nickel, and copper.

<8>

The oxygen-absorbing multilayer body according to any one of <1> to <7>, wherein the transition metal catalyst is contained in an amount of 0.001 to 10 parts by mass in terms of the transition metal amount, in the oxygen-absorbing composition, based on 100 parts by mass of the total amount of the compound having a tetralin ring represented by Formula (1) and the thermoplastic resin (a).

<9>

The oxygen-absorbing multilayer body according to any one of <1> to <8>, wherein the thermoplastic resin layer is a sealant layer; and the oxygen-absorbing multilayer body is composed of at least three layers including the sealant layer, the oxygen-absorbing layer, and a gas barrier layer containing a gas barrier material in this order.

<10>

An oxygen-absorbing paper container prepared by molding an oxygen-absorbing multilayer body being composed of at least four layers including the oxygen-absorbing multilayer body according to <9> and a paper base layer laminated to the gas barrier layer side of the oxygen-absorbing multilayer body.

<11>
An oxygen-absorbing container comprising the oxygen-absorbing multilayer body according to any one of <1> to <9>.
<12>
The oxygen-absorbing container according to <11>, being one selected from the group consisting of a pouch, a cup, a tray, and a bottle.
<13>
The oxygen-absorbing multilayer body according to any one of <1> to <9>, being an oxygen-absorbing multilayer injection-molded article.
<14>
An oxygen-absorbing sealed container comprising:
an oxygen-absorbing multilayer container body prepared by molding the oxygen-absorbing multilayer body according to any one of <1> to <9>; and
a gas barrier lid member being composed of at least two layers including an inner layer containing a thermoplastic resin (c) and a gas barrier layer containing a gas barrier material in this order, wherein
the thermoplastic resin layer in the oxygen-absorbing container body and the inner layer in the gas barrier lid member are joined to each other.
<15>
An oxygen-absorbing PTP packaging body comprising:
an oxygen-absorbing bottom member prepared by molding the oxygen-absorbing multilayer body according to any one of <1> to <9>; and
a gas barrier lid member being composed of at least two layers including an inner layer containing a thermoplastic resin (d) and a gas barrier layer containing a gas barrier material in this order, wherein
the thermoplastic resin layer in the oxygen-absorbing bottom member and the inner layer in the gas barrier lid member are joined to each other.
<16>
A storage method comprising storing at least one selected from the group consisting of cooked rice, an alcoholic beverage, fruit juice and/or vegetable juice, and a drug solution in an oxygen-absorbing container including the oxygen-absorbing multilayer body according to any one of <1> to <9>.

ADVANTAGEOUS EFFECTS OF THE INVENTION

The present invention can provide an oxygen-absorbing multilayer body not causing odor generation after oxygen absorption and having excellent oxygen-absorbing performance and an oxygen-absorbing container including the laminate. The oxygen-absorbing multilayer body and the oxygen-absorbing container including the multilayer body can absorb oxygen regardless of the presence or absence of water in the article to be stored and do not cause odor generation after oxygen absorption. They can therefore be widely used in, for example, foods, cooked foods, beverages, medicinal products, and health foods, irrespective of objects. Furthermore, according to a preferred embodiment of the present invention, an oxygen-absorbing multilayer body being not responsive to a metal detector and an oxygen-absorbing container including the laminate are achieved.

The present invention can provide an oxygen-absorbing multilayer injection-molded product not causing odor generation after oxygen absorption and having excellent oxygen-absorbing performance. This oxygen-absorbing injection-molded product can absorb oxygen regardless of the presence or absence of water in the article to be stored and does not cause odor generation after oxygen absorption. They can therefore be widely used in, for example, foods, cooked foods, beverages, medicinal products, and health foods, irrespective of objects. Furthermore, according to a preferred embodiment of the present invention, an oxygen-absorbing multilayer injection-molded product being not responsive to a metal detector is achieved.

The present invention can achieve an oxygen-absorbing PTP packaging body including, as a bottom member, an oxygen-absorbing multilayer body having excellent oxygen-absorbing performance under broad humidity conditions from low humidity to high humidity. The oxygen-absorbing PTP packaging body also has good internal visibility and can satisfactorily store an article to be stored.

The present invention can provide a method for storing cooked rice for a long period of time without degrading its flavor and without causing odor generation while maintaining the color tone.

The present invention can provide a method for storing an alcoholic beverage for a long period of time without degrading its flavor and without causing odor generation.

The present invention can provide a method for storing fruit juice and/or vegetable juice for a long period of time without degrading their flavor and without causing odor generation while maintaining the color tone.

The present invention can provide a method for storing a drug solution that can prevent oxidation degradation of the drug solution during storage, prevent contamination of the drug solution with impurities, and prevent a reduction in drug efficacy of the drug solution after storage.

MODES FOR CARRYING OUT THE INVENTION

Embodiments for implementing the present invention (hereinafter, simply referred to as "the embodiment") will now be described in detail. It should be noted that the following embodiments are merely examples for explaining the present invention and that the present invention is not limited to the following embodiments. The present invention can be implemented by being appropriately modified in a range not departing from the gist of the present invention.
<First Embodiment>
[Oxygen-Absorbing Multilayer Body]
The oxygen-absorbing multilayer body of a first embodiment includes an oxygen-absorbing layer (layer A) containing an oxygen-absorbing composition and a thermoplastic resin layer (layer B) containing a thermoplastic resin (b). The oxygen-absorbing composition contains at least one compound having a tetralin ring represented by Formula (1), a transition metal catalyst, and a thermoplastic resin (a),

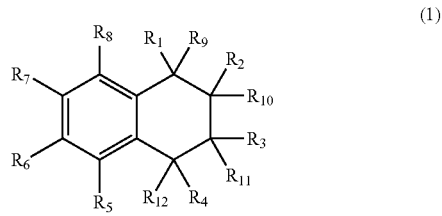

(1)

where $R_1$ to $R_{12}$ each independently represent a hydrogen atom or a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, an imide group, a substituent represented by Formula (1a), and a substituent represented by Formula (1b), which each optionally further have a substituent; two of the substituents represented by $R_1$ to $R_{12}$ are optionally bonded to each other to form a ring; and at least one hydrogen atom is bonded to a benzylic position of the tetralin ring.

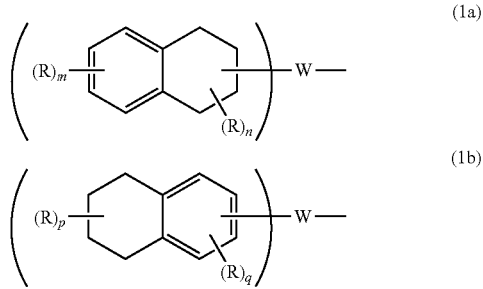

where each R independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide group, which each optionally further have a substituent; two of the substituents each represented by R are optionally bonded to each other to form a ring; W represents a bond or a bivalent organic group, the bivalent organic group being at least one selected from the group consisting of an aromatic hydrocarbon group, a saturated or unsaturated alicyclic hydrocarbon group, a linear or branched saturated or unsaturated aliphatic hydrocarbon group and a heterocyclic group, —C(=O)—, —OC(=O)—, —N(H)C(=O)—, and an arbitrary combination thereof; m represents an integer of 0 to 4; n represents an integer of 0 to 7; p represents an integer of 0 to 8; and q represents an integer of 0 to 3.

The oxygen-absorbing multilayer body of the embodiment may have any layer structure, and the number and the types of the oxygen-absorbing layer (layer A) and the thermoplastic resin layer (layer B) are not particularly limited. For example, the oxygen-absorbing multilayer body may be composed of one layer of layer A and one layer of layer B to form a structure of A/B or may be composed of one layer of layer A and two layers of layer B to form a three-layer structure of B/A/B. Alternatively, the oxygen-absorbing multilayer body may be composed of one layer of layer A and two-material four-layer multilayer B including sublayer B1 and sublayer B2 to form a five-layer structure of B1/B2/A/B2/B1 or may be composed of one layer of layer A and two-material two-layer multilayer B including sublayer B1 and sublayer B2 to form a three-layer structure of B1/A/B2. The oxygen-absorbing multilayer body of the embodiment can optionally include an arbitrary layer, such as an adhesive layer (also referred to as layer AD), to form, for example, a seven-layer structure of B1/AD/B2/A/B2/AD/B1.

[Oxygen-Absorbing Layer (Layer A)]

The oxygen-absorbing layer (layer A) in the oxygen-absorbing multilayer body of the embodiment is a layer containing an oxygen-absorbing composition that contains at least one compound having a tetralin ring represented by Formula (1) (hereinafter, also simply referred to as "tetralin compound"), a transition metal catalyst, and a thermoplastic resin (a).

<Compound Having a Tetralin Ring>

In Formula (1), examples of the monovalent substituent represented by $R_1$ to $R_{12}$ may include, but are not limited to, halogen atoms (e.g., chlorine, bromine, and iodine atoms), alkyl groups (preferably linear, branched, or cyclic alkyl groups having 1 to 15 carbon atoms, more preferably 1 to 6 carbon atoms, such as methyl, ethyl, n-propyl, isopropyl, t-butyl, n-octyl, 2-ethylhexyl, cyclopropyl, and cyclopentyl groups), alkenyl groups (preferably linear, branched, or cyclic alkenyl groups having 2 to 10 carbon atoms, more preferably 2 to 6 carbon atoms, such as vinyl and allyl groups), alkynyl groups (preferably alkynyl groups having 2 to 10 carbon atoms, more preferably 2 to 6 carbon atoms, such as ethynyl and propargyl groups), aryl groups (preferably aryl groups having 6 to 16 carbon atoms, more preferably 6 to 10 carbon atoms, such as phenyl and naphthyl groups), heterocyclic groups (preferably monovalent substituents each having one hydrogen atom removed from a five- or six-membered aromatic or non-aromatic heterocyclic compound having 1 to 12 carbon atoms, more preferably 2 to 6 carbon atoms, such as 1-pyrazolyl, 1-imidazolyl, or 2-furyl group), a cyano group, a hydroxy group, a carboxyl group, ester groups, an amide group, a nitro group, alkoxy groups (preferably linear, branched, or cyclic alkoxy groups having 1 to 10 carbon atoms, more preferably 1 to 6 carbon atoms, such as methoxy and ethoxy groups), aryloxy groups (preferably aryloxy groups having 6 to 12 carbon atoms, more preferably 6 to 8 carbon atoms, such as a phenoxy group), acyl groups (including a formyl group, preferably alkylcarbonyl groups having 2 to 10 carbon atoms, more preferably 2 to 6 carbon atoms and preferably arylcarbonyl groups having 7 to 12 carbon atoms, more preferably 7 to 9 carbon atoms, such as acetyl, pivaloyl, and benzoyl groups), amino groups (preferably alkylamino groups having 1 to 10 carbon atoms, more preferably 1 to 6 carbon atoms; preferably anilino groups having 6 to 12 carbon atoms, more preferably 6 to 8 carbon atoms; and preferably heterocyclic amino groups having 1 to 12 carbon atoms, more preferably 2 to 6 carbon atoms, such as amino, methylamino, and anilino groups), a thiol group, alkylthio groups (preferably alkylthio groups having 1 to 10 carbon atoms, more preferably 1 to 6 carbon atoms, such as methylthio and ethylthio groups), arylthio groups (preferably arylthio groups having 6 to 12 carbon atoms, more preferably 6 to 8 carbon atoms, such as a phenylthio group), heterocyclic thio groups (preferably heterocyclic thio groups having 2 to 10 carbon atoms, more preferably 1 to 6 carbon atoms, such as a 2-benzothiazolylthio group), and imide groups (preferably imide groups having 2 to 10 carbon atoms, more preferably 4 to 8 carbon atoms, such as N-succinimide and N-phthalimide groups).

The compound represented by Formula (1) has at least one hydrogen atom bonded at a benzylic position of the tetralin ring. As described below, the hydrogen atom bonded to the benzylic position of the tetralin ring and a transition metal catalyst described below act such that, for example, excellent oxygen-absorbing performance is expressed. Examples of the compound having at least one hydrogen atom bonded at the benzylic position of a tetralin ring may include compounds having a hydrogen atom at any one of $R_1$, $R_4$, $R_9$, and $R_{12}$ in Formula (1).

When the monovalent substituents $R_1$ to $R_{12}$ have a hydrogen atom, the hydrogen atom may be further substituted with a substituent T (herein, substituent T is synonymous with those described as the monovalent substituents $R_1$ to $R_{12}$). Examples of such substituents may include, but are not limited to, alkyl groups substituted with hydroxy groups (e.g., a hydroxyethyl group), alkyl groups substituted with alkoxy groups (e.g., a methoxyethyl group), alkyl groups substituted with aryl groups (e.g., a benzyl group), alkyl groups substituted with primary or secondary amino groups (e.g., an aminoethyl group), aryl groups substituted with alkyl groups (e.g., a p-tolyl group), and aryloxy groups substituted with alkyl groups (e.g., a 2-methylphenoxy group). When the monovalent substituent R has a monovalent substituent T, the number of carbon atoms of the substituent T is not included in the number of carbon atoms mentioned above. For example, a benzyl group is regarded as an alkyl group having one carbon atom substituted with a phenyl group and is not regarded as an alkyl group having 7 carbon atoms substituted with a phenyl group. Furthermore, the monovalent substituent R may have a plurality of substituents T.

Two of the monovalent substituents represented by $R_1$ to $R_{12}$ may be bonded to each other to form a ring. Examples of such a compound may include compounds having five- to eight-membered rings formed by condensation of two of $R_1$ to $R_{12}$. The ring mentioned herein may have any known ring structure and is not particularly limited, but is preferably an aromatic, aliphatic, or hetero ring having 4 to 7 carbon atoms (more preferably a cyclohexane ring, a cycloheptane ring, an acid anhydride ring (e.g., succinic anhydride ring, glutaric anhydride ring, or adipic anhydride ring), a benzene ring, or a bicyclo ring).

From the viewpoint of suppressing the loss by volatilization during use, increasing the amount of oxygen absorbed per unit mass of a compound, and other factors, the compound having a tetralin ring represented by Formula (1) is preferably a compound in which at least one of $R_1$ to $R_{12}$ is selected from the group consisting of a substituted or unsubstituted alkyl group, a substituted or unsubstituted aryl group, a hydroxy group, a carboxyl group, a substituted or unsubstituted ester group, an alkoxy groups, an acyl group, a substituted or unsubstituted amide group, and a substituted or unsubstituted imide group (hereinafter, also simply referred to as "substituent group S") or a compound in which at least two of substituents represented by $R_1$ to $R_{12}$ are condensed to each other to form a five- or six-membered ring. Among the substituent group S, more preferred are substituted or unsubstituted alkyl groups, substituted or unsubstituted aryl groups, a hydroxy group, a carboxyl group, alkoxy groups, substituted or unsubstituted ester groups, and substituted or unsubstituted amide groups.

Examples of a preferred first aspect of the compound having a tetralin ring represented by Formula (1) may include compounds having the following structure:

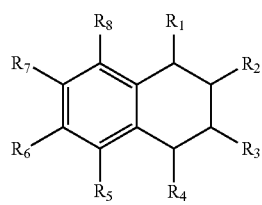

(1c)

where $R_1$ to $R_8$ each independently represent a monovalent substituent, the monovalent substituent being synonymous with $R_1$ to $R_{12}$ described above, provided that $R_1$ to $R_8$ do not form a ring by bonding of two or more thereof.

In the first aspect, at least two of $R_1$ to $R_8$ are each preferably one selected from the substituent group S, and the rest of $R_1$ to $R_8$ are each preferably a hydrogen atom. More preferably, two of $R_1$ to $R_8$ are each one selected from the substituent group S, and six of $R_1$ to $R_8$ are hydrogen atoms.

In the first aspect, there are a variety of isomers. For example, introduction of two substituents into the tetralin represented by Formula (1-1) has possibility of generating tetralin derivatives represented by, for example, Formulae (1-2) to (1-15), as structural isomers. The sites of introduction of substituents (sites of substitution) are not particularly limited.

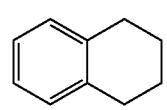

(1-1)

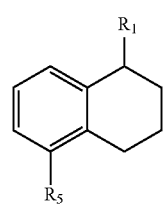

(1-2)

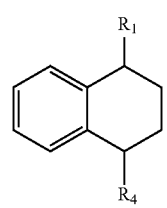

(1-3)

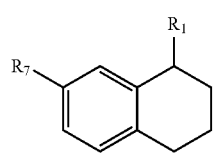

(1-4)

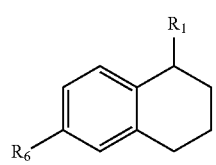

(1-5)

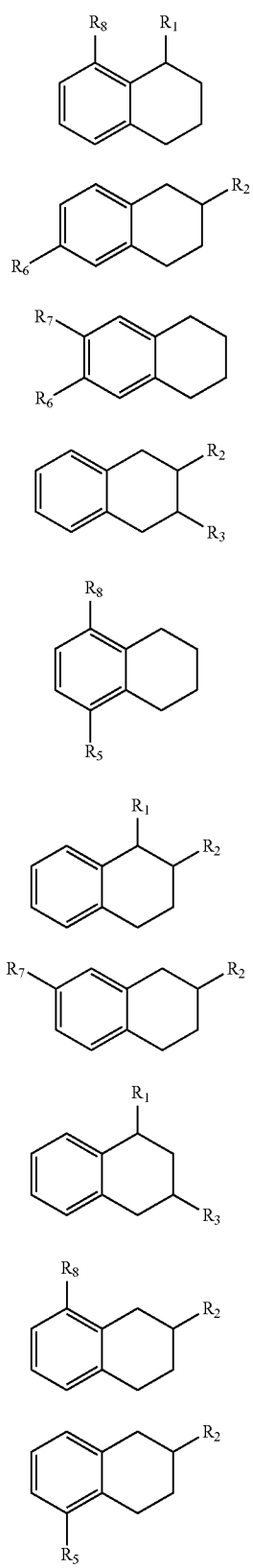
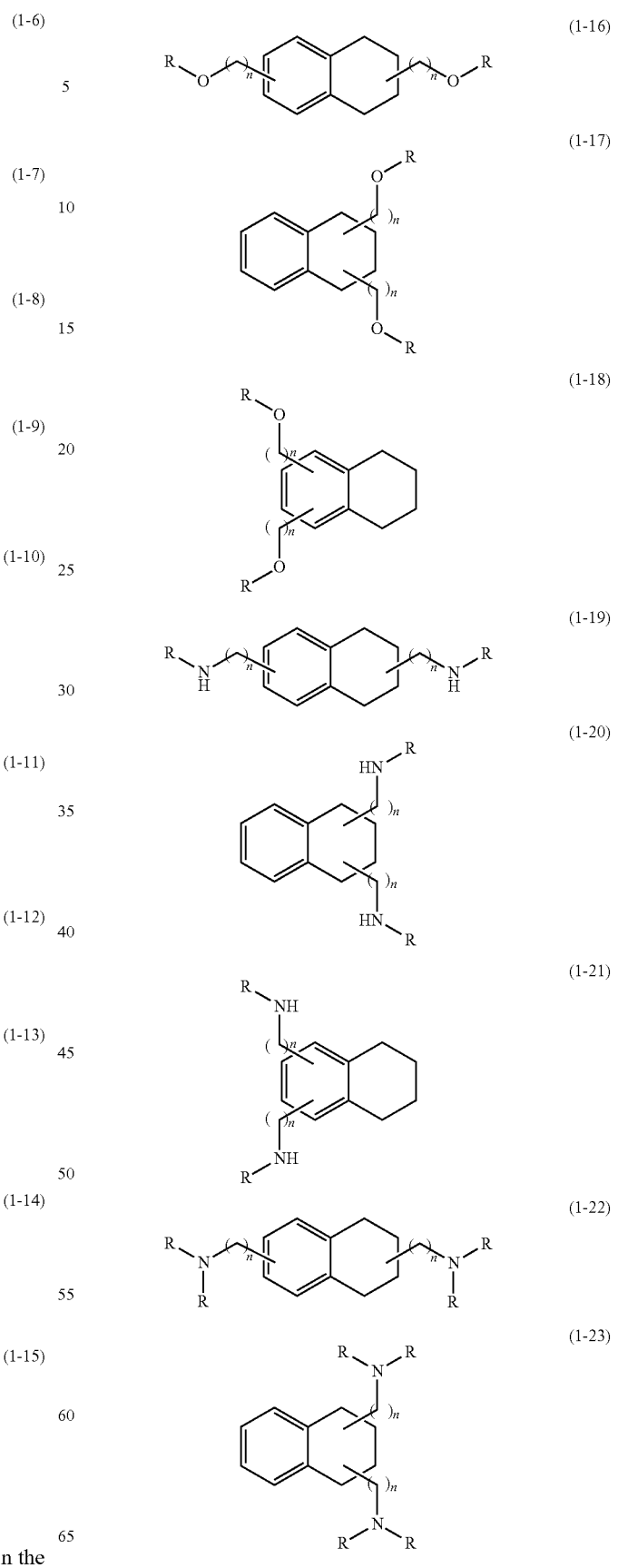
Non-limiting examples of the compounds included in the first aspect are shown in below.

(1-24)

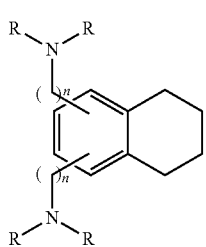

where each n independently represents an integer of 0 to 3; and each R independently represents a hydrogen atom or a monovalent substituent, the monovalent substituent being at least one selected from the group consisting of an aromatic hydrocarbon group, a saturated or unsaturated aliphatic hydrocarbon group, a linear or branched saturated or unsaturated aliphatic hydrocarbon group, and an acyl group.

Examples of the aromatic hydrocarbon group may include, but are not limited to, phenyl, tolyl, xylyl, naphthyl, anthracenyl, phenanthryl, biphenyl, and fluorenyl groups. Examples of the alicyclic hydrocarbon group may include, but are not limited to, cycloalkyl groups, such as cyclohexyl and cyclopentyl groups, and cycloalkenyl groups. Examples of the aliphatic hydrocarbon group may include, but are not limited to, linear or branched alkyl groups, such as methyl, ethyl, n-propyl, isopropyl, n-butyl, isobutyl, sec-butyl, tert-butyl, n-hexyl, n-octyl, 2-ethylhexyl, n-decyl, lauryl, stearyl, and palmityl groups; and alkenyl groups, such as ethenyl, propenyl, butenyl, octenyl, nonadenyl, and pentacosenyl groups. Examples of the acyl group may include, but are not limited to, acetyl, pivaloyl, and benzoyl groups. These substituents may further have substituents. Examples of such substituents may include halogen atoms, alkoxy groups, a hydroxy group, a carboxyl group, carboalkoxy groups, amino groups, acyl groups, thio groups (e.g., alkylthio, phenylthio, tolylthio, and pyridylthio groups), amino groups (e.g., unsubstituted amino, methylamino, dimethylamino, and phenylamino groups), a cyano group, and a nitro group.

Examples of a preferred second aspect of the compound having a tetralin ring represented by Formula (1) may include compounds having the following structures represented by any of Formulae (2-1) to (2-5):

(2-1)

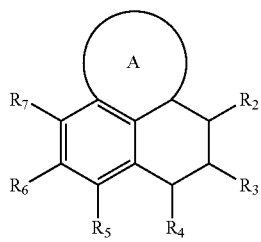

(2-2)

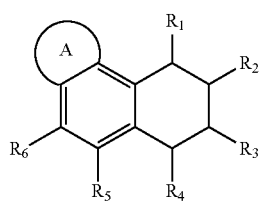

(2-3)

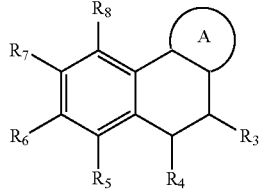

(2-4)

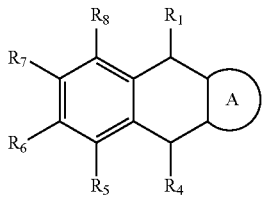

(2-5)

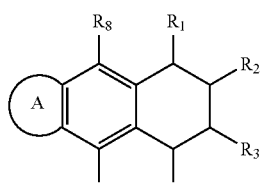

where $R_1$ to $R_8$ each independently represent a hydrogen atom or a monovalent substituent, the monovalent substituents $R_1$ to $R_8$ being synonymous with $R_1$ to $R_{12}$ described in Formula (1); and arc A represents a substituted or unsubstituted aromatic, heterocyclic, or acid anhydride ring having 4 to 7 carbon atoms.

In the second aspect, arc A is preferably an aromatic, aliphatic, or hetero ring having 4 to 7 carbon atoms. Examples of such a ring may include a benzene ring, a cyclopentane ring, a cyclohexane ring, a cycloheptane ring, and acid anhydride rings (succinic anhydride ring, glutaric anhydride ring, and adipic anhydride ring).

Examples of a preferred third aspect of the compound having a tetralin ring represented by Formula (1) may include compounds having two or more carbonyl groups.

In examples of the third aspect of the compound having two or more carbonyl groups, two or more of $R_1$ to $R_{12}$ in Formula (1) are preferably monovalent substituents represented by Formula (2):

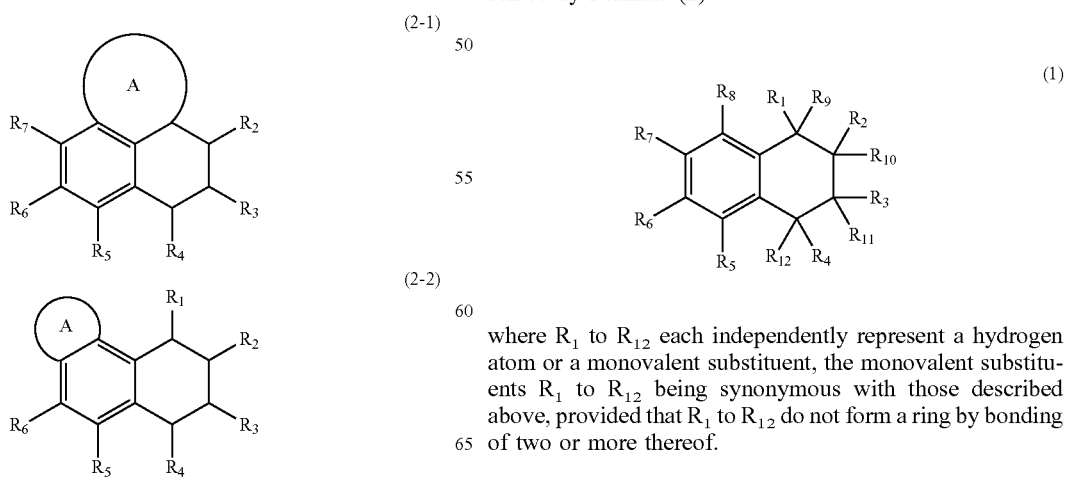

where $R_1$ to $R_{12}$ each independently represent a hydrogen atom or a monovalent substituent, the monovalent substituents $R_1$ to $R_{12}$ being synonymous with those described above, provided that $R_1$ to $R_{12}$ do not form a ring by bonding of two or more thereof.

$$—C(=O)X \qquad (2)$$

where X represents one selected from the group consisting of a hydrogen atom, a hydroxy group, an alkyl group, an alkoxy group, a monoalkylamino group, and a dialkylamino group, and a plurality of X may be the same or different.

In the third aspect, $R_1$ to $R_{12}$ more preferably satisfy any of the following requirements (A) to (C):

(A) One or more monovalent substituents represented by Formula (2) are bonded to the aromatic ring of the tetralin ring, and one or more monovalent substituents represented by Formula (2) are bonded to the aliphatic ring of the tetralin ring;

(B) Two or more monovalent substituents represented by Formula (2) are bonded to the aromatic ring of the tetralin ring; and (C) Two or more monovalent substituents represented by Formula (2) are bonded to the aliphatic ring of the tetralin ring.

In the monovalent substituent represented by Formula (2), X is preferably an alkoxy group represented by an —O—Z group or a monoalkylamino group represented by an NH—Z group, where —Z more preferably represents an aromatic hydrocarbon, saturated or unsaturated aliphatic hydrocarbon, or linear or branched saturated or unsaturated aliphatic hydrocarbon group having 1 to 10 carbon atoms. Since specific examples of these substituents are the same as those described in substituent R, the description thereof is omitted here.

Non-limiting examples of the third aspect satisfying any of the requirements (A) to (C) are shown below:

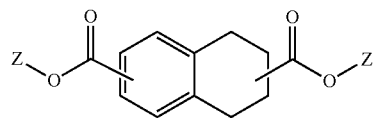
(3-1)

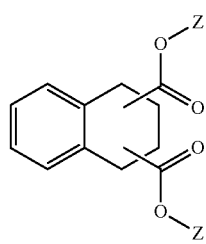
(3-2)

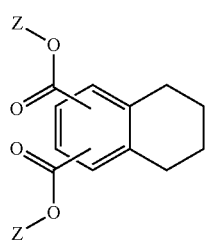
(3-3)

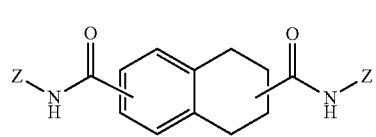
(3-4)

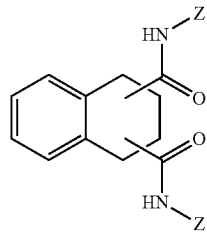
(3-5)

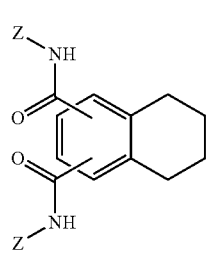
(3-6)

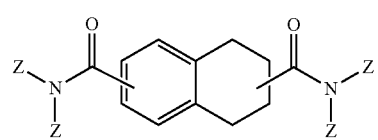
(3-7)

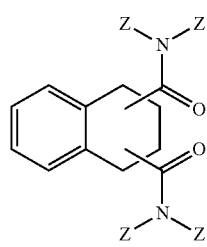
(3-8)

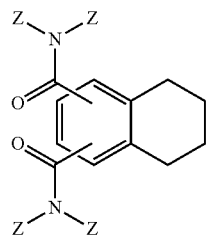
(3-9)

where each Z is synonymous with that described in Formula (2).

Among the above-mentioned examples of the third aspect, more preferred are compounds represented by any of Formulae (3-10) to (3-20):

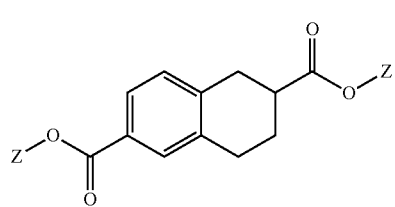
(3-10)

(3-11) 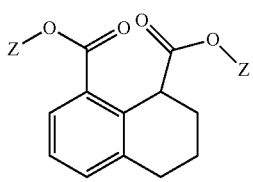
(3-12) 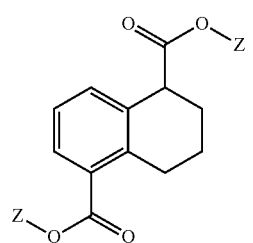
(3-13) 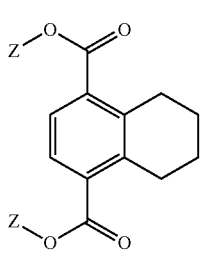
(3-14) 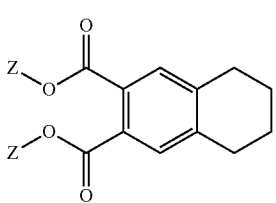
(3-15) 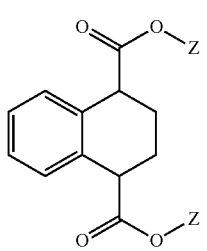
(3-16) 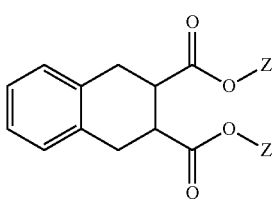
(3-17) 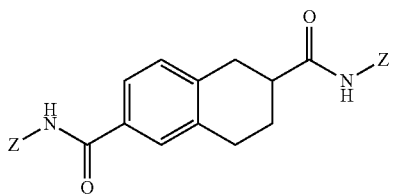
(3-18)
(3-19)
(3-20)
Non-limiting examples of the compound having a tetralin ring represented by Formula (1) are further shown below:
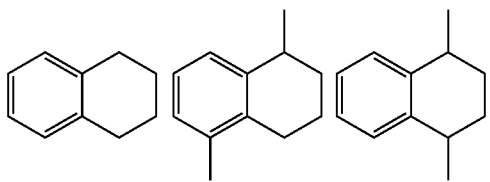

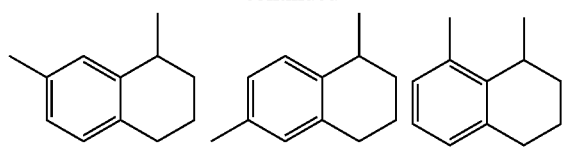
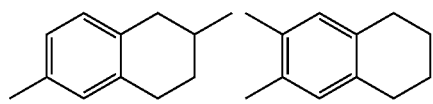
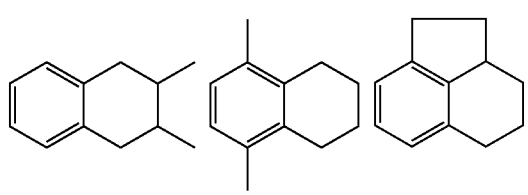
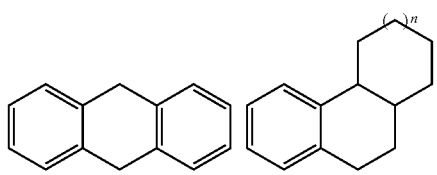
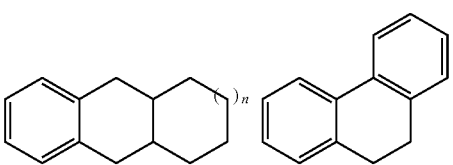
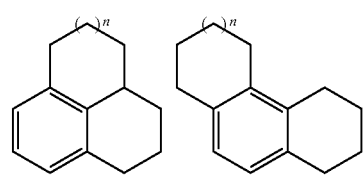
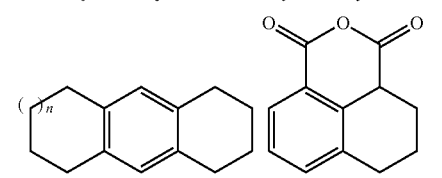
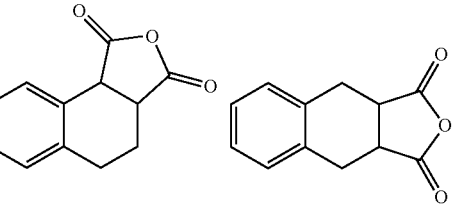
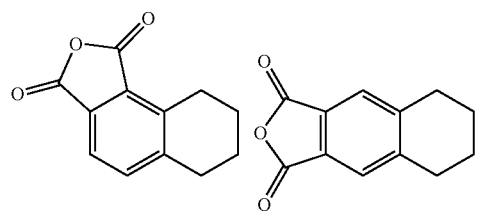
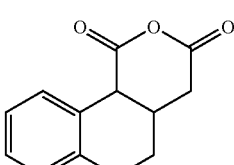
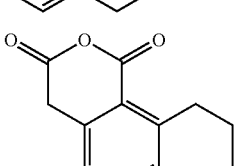
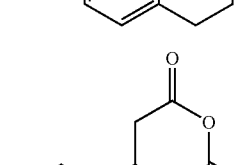
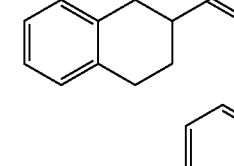
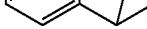
where each n represents an integer of 0 to 3,
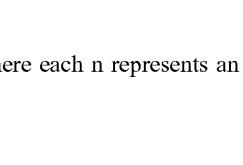
where each n independently represents an integer of 0 to 7,
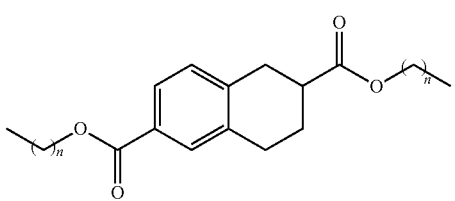
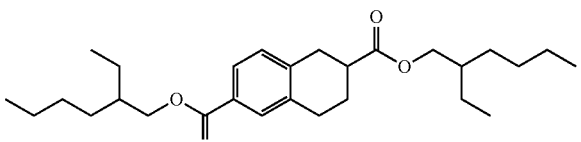
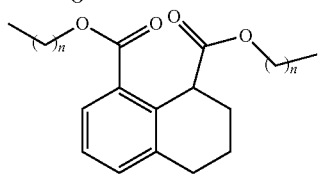
where each n independently represents an integer of 0 to 7,

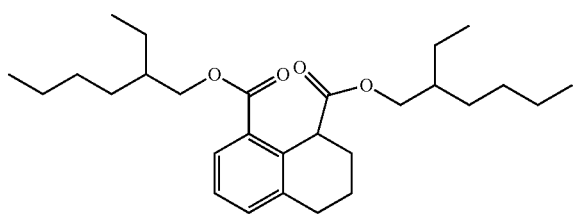

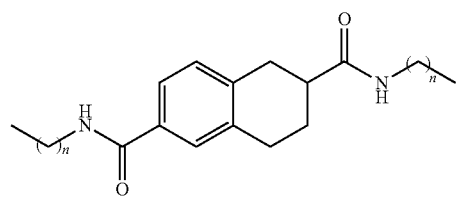

where each n independently represents an integer of 0 to 7,

Examples of a preferred fourth aspect of the compound having a tetralin ring represented by Formula (1) may include compounds having two or more tetralin rings. The upper limit of the number of the tetralin rings in a molecule is preferably 12, and the number of the tetralin rings is more preferably 3 or less, from the viewpoint of easiness of acquisition. In particular, from the viewpoint of balance among oxygen-absorbing performance, the effect of heat resistance, and easiness of acquisition, the number of tetralin rings is most preferably 2.

Examples of the compound having two or more tetralin rings in the fourth aspect are preferably compounds having structures represented by any of Formulae (4-1) to (4-6):

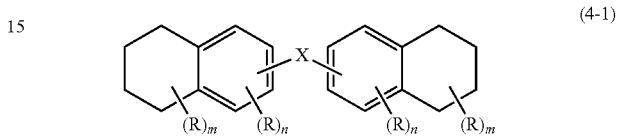

(4-1)

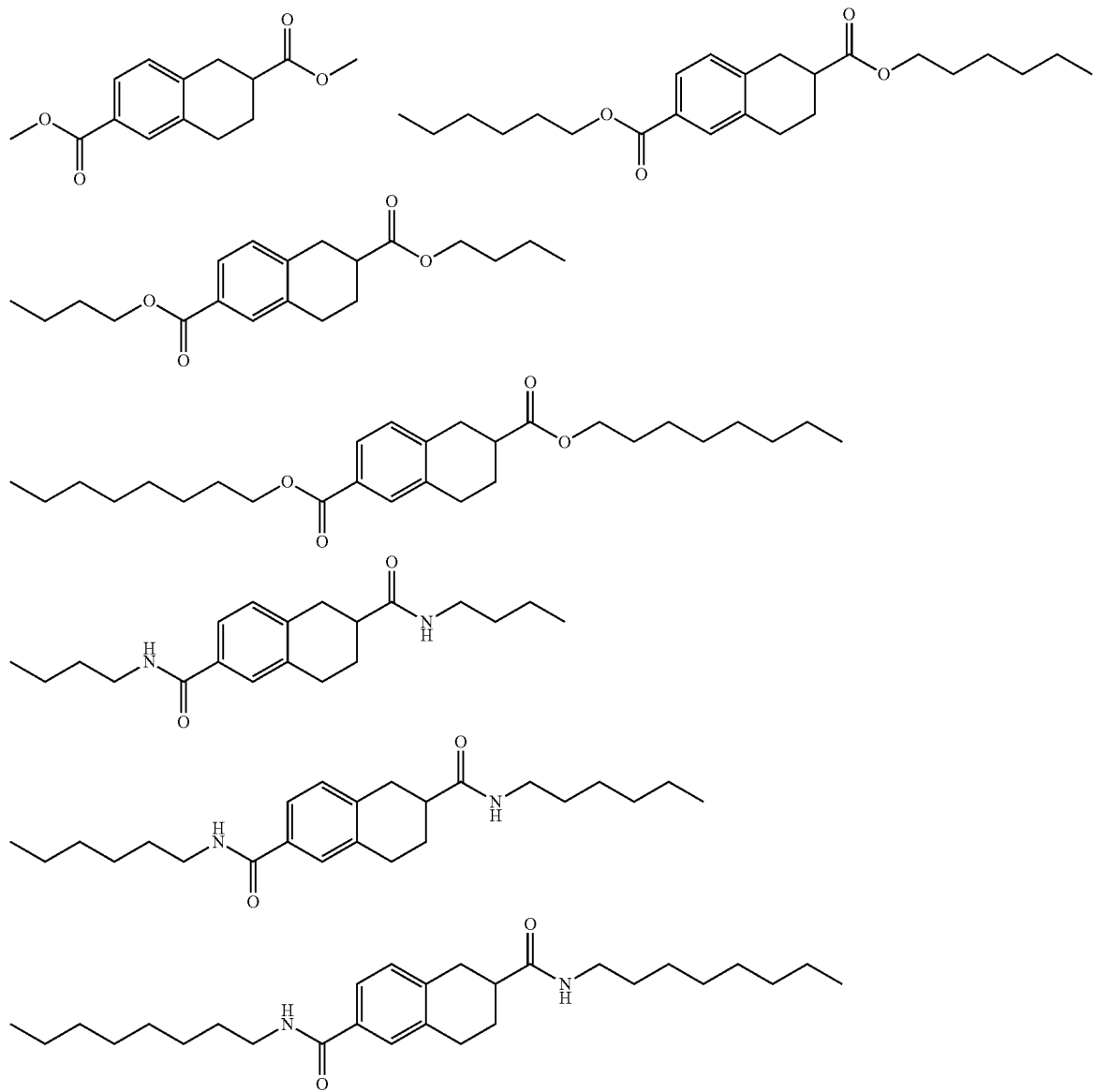

-continued

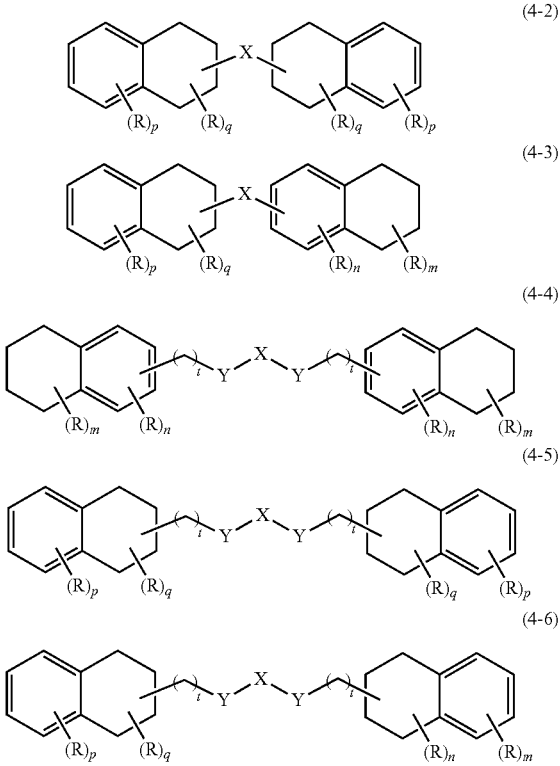

where each R independently represents a monovalent substituent, the monovalent substituent being synonymous with $R_1$ to $R_{12}$ described above; each m independently represents an integer of 0 to 7; each n independently represents an integer of 0 to 3; each p independently represents an integer of 0 to 4; each q independently represents an integer of 0 to 6; one or more hydrogen atoms are bonded to a benzylic position of the tetralin ring; each X represents a bivalent group containing at least one group selected from the group consisting of an aromatic hydrocarbon group, a saturated or unsaturated alicyclic hydrocarbon group, a linear or branched saturated or unsaturated aliphatic hydrocarbon group, and a heterocyclic group; each Y independently represents an ester group or an amide group; and each t independently represents an integer of 0 to 6.

Examples of the monovalent substituent represented by R in Formulae (4-1) to (4-6) may include those exemplified as $R_1$ to $R_{12}$. Among them, preferred are a hydrogen atom, substituted or unsubstituted alkyl group, substituted or unsubstituted aryl groups, a hydroxy group, a carboxyl group, ester groups, alkoxy groups, acyl groups, amide groups, and imide groups; more preferred are a hydrogen atom, substituted or unsubstituted alkyl groups, substituted or unsubstituted aryl groups, alkoxy groups, ester groups, and acyl groups; and most preferred are a hydrogen atom, unsubstituted alkyl groups, alkoxy groups, and ester groups.

The compound represented by any of Formulae (4-1) to (4-6) preferably has a molecular weight of 276 to 1000, more preferably 300 to 800, and most preferably 350 to 600. A compound having a molecular weight of 276 or more can further suppress the loss by volatilization during use, compared to a compound having a molecular weight less than 276. A compound having a molecular weight of 1000 or less increases the proportion of the tetralin ring portion in the compound and further increases the amount of oxygen absorbed per unit mass of the compound, compared to a compound having a molecular weight higher than 1000.

The compound represented by any of Formulae (4-1) to (4-6) preferably has a high boiling point and a low vapor pressure at the temperature during use, from the viewpoint of suppressing the loss by volatilization during use. When such a compound is used in an oxygen-absorbing composition described below, a lower vapor pressure at the temperature for kneading with a thermoplastic resin and a higher 3% weight-reduction temperature are preferred for suppressing the loss by volatilization during production of the oxygen-absorbing composition. The 3% weight-reduction temperature is preferably 150° C. or more, more preferably 200° C. or more, and most preferably 250° C. or more.

Among the functional groups mentioned above, one having a hydrogen atom may be further substituted with any of the above-mentioned substituents. Examples of such a functional group may include, but are not limited to, alkyl groups substituted with hydroxy groups (e.g., a hydroxyethyl group), alkyl groups substituted with alkoxy groups (e.g., a methoxyethyl group), alkyl groups substituted with aryl groups (e.g., a benzyl group), aryl groups substituted with alkyl groups (e.g., a p-tolyl group), and aryloxy groups substituted with alkyl groups (e.g., a 2-methylphenoxy group). When a functional group is further substituted with a substituent, the number of carbon atoms of the substituent is not included in the number of carbon atoms mentioned above. For example, a benzyl group is regarded as an alkyl group having one carbon atom substituted with a phenyl group and is not regarded as an alkyl group having 7 carbon atoms substituted with a phenyl group. Furthermore, the substituent of the tetralin may have a plurality of substituents. These compounds may be used either alone or in combination of two or more thereof.

The compounds represented by Formulae (4-1) to (4-6) are more preferably the compounds represented by any of Formulae (4-7) to (4-16) and most preferably the compounds represented by Formula (4-7), (4-10), (4-13), or (4-16).

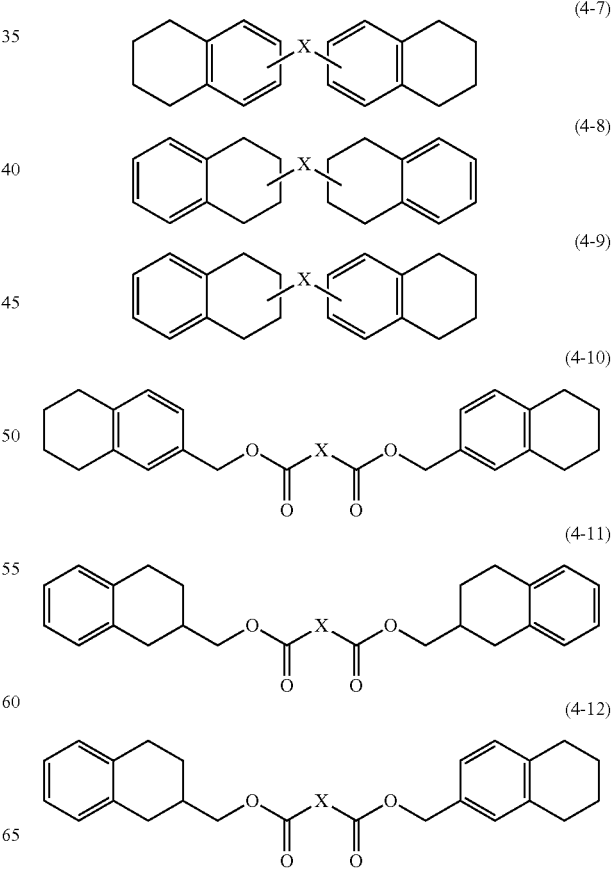

(4-13)
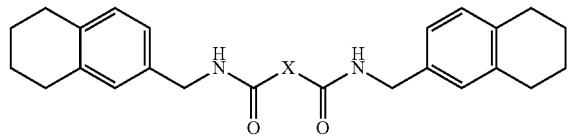

(4-14)
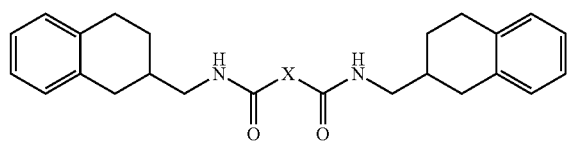

(4-15)
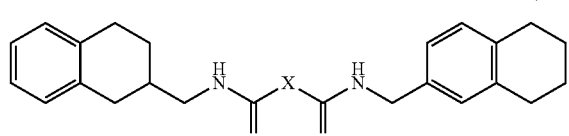

(4-16)
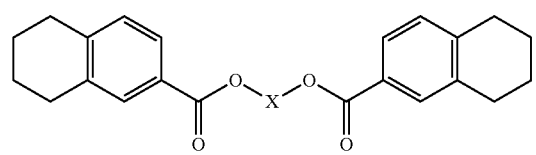

where each X represents an aromatic hydrocarbon group, a saturated or unsaturated alicyclic hydrocarbon group, or a linear or branched saturated or unsaturated aliphatic hydrocarbon group.

Preferred examples of the compound represented by Formula (4-7) are shown below, but the embodiment is not limited thereto.

(4-17)
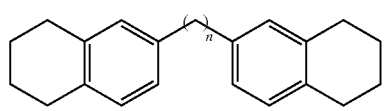

where n represents an integer of 1 to 10;

(4-18)
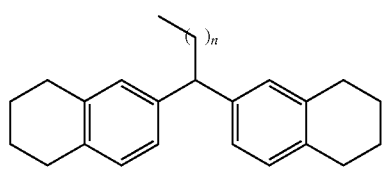

where n represents an integer of 1 to 8; and (4-19)
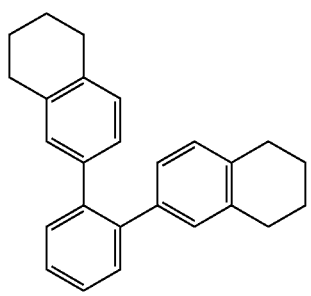

(4-20)
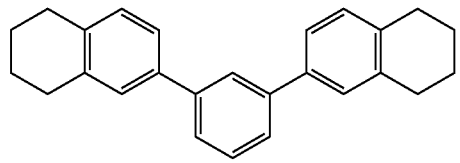

(4-21)
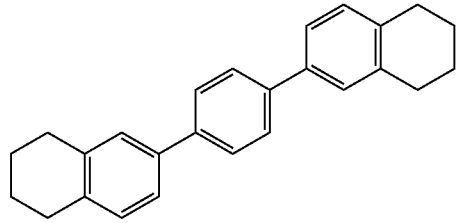

Preferred examples of the compound represented by Formula (4-10) are shown below, but the embodiment is not limited thereto.

(4-22)
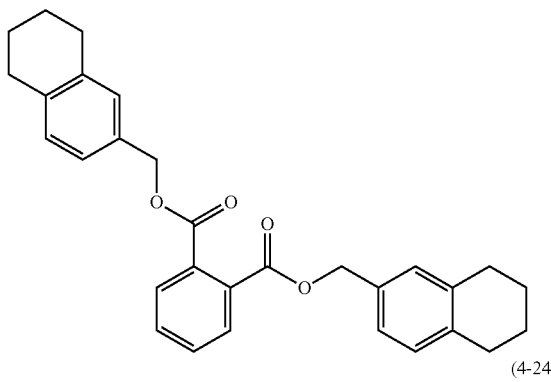

where n represents an integer of 1 to 8; and (4-23)

(4-24)

(4-25)
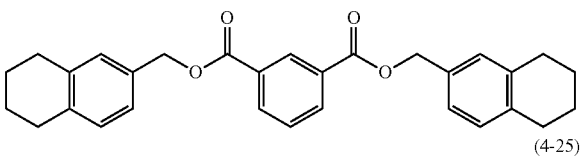

Preferred examples of the compound represented by Formula (4-13) are shown below, but the embodiment is not limited thereto.

(4-26)

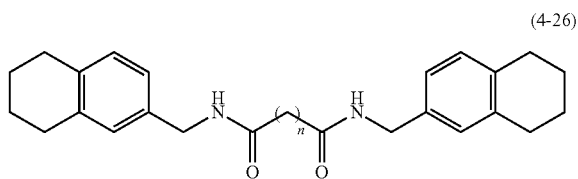

where n represents an integer of 1 to 8; and (4-27)

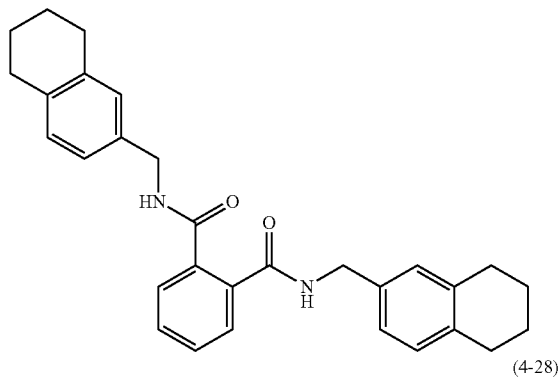

(4-28)

(4-29)

Preferred examples of the compound represented by Formula (4-16) are shown below, but the embodiment is not limited thereto.

(4-30)

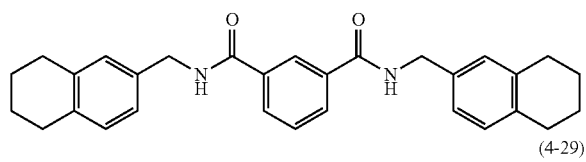

where n represents an integer of 1 to 10; and (4-31)

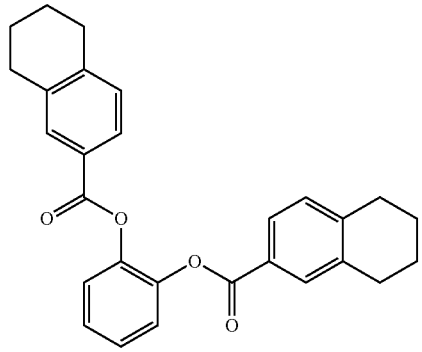

(4-32)

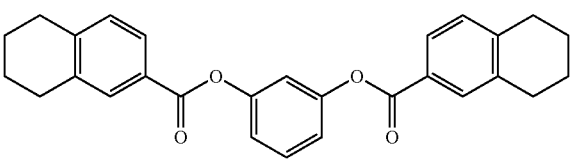

(4-33)

The compounds represented by Formulae (4-1) to (4-16) and (4-17) to (4-33) are examples of the compound having two tetralin rings in one molecule. In the embodiment, compounds having three or more tetralin rings in one molecule can also be preferably used.

The compounds represented by Formulae (4-1) to (4-6) may be produced by any method and can be produced by a known method. For example, such a compound can be preferably produced through transesterification between an ester of a polycarboxylic acid having two or more carboxyl groups and a compound having a hydroxy group and a tetralin ring, a reaction between a polyol having two or more hydroxy groups and a compound having a carboxyl group and a tetralin ring, and a reaction between an aldehyde and a compound having a tetralin ring.

Other preferred examples of the compound having two or more tetralin rings in the fourth aspect may include compounds having two or more tetralin rings at least one of which has a benzylic position to which a hydrogen atom is bonded and has two or more imide bonds.

Such a compound can have a larger number of reactive sites with oxygen due to the existence of the two or more tetralin rings and can further improve the heat resistance due to the existence of the two or more imide bonds. Preferred examples of such a compound are those represented by Formulae (4-34) to (4-37).

(4-34)

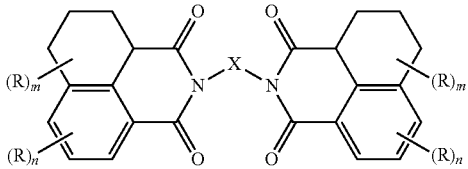

(4-35)

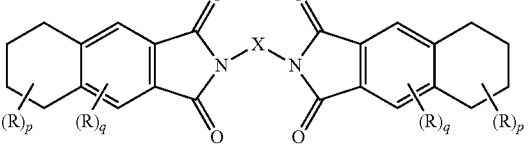

(4-36)

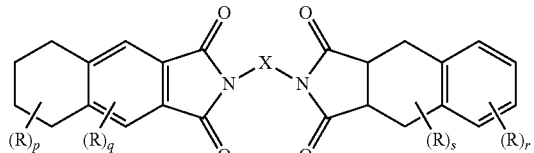

(4-37)

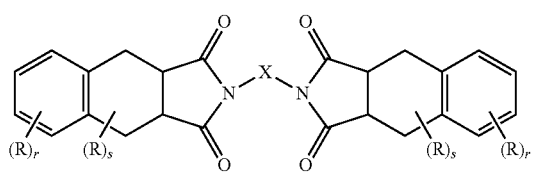

where each R independently represents a monovalent substituent, the monovalent substituent R being synonymous with $R_1$ to $R_{12}$ described above; each m independently represents an integer of 0 to 6; each n independently represents an integer of 0 to 3, each p independently represents an integer of 0 to 7, each q independently represents an integer of 0 to 2, each r independently represents an integer of 0 to 4, and each s independently represents an integer of 0 to 5; one or more hydrogen atoms are bonded to the benzylic position of at least one tetralin ring; and each X represents a bivalent substituent, the bivalent substituent being at least one selected from the group consisting of an aromatic hydrocarbon group, a saturated or unsaturated alicyclic hydrocarbon group, a linear or branched saturated or unsaturated aliphatic hydrocarbon group, and a heterocyclic group.

The compound represented by any of Formulae (4-34) to (4-37) may have any molecular weight, and the molecular weight is preferably 414 to 1000, more preferably 430 to 800, and most preferably 450 to 600. A molecular weight of 414 or more can further suppress the loss by volatilization during use. A molecular weight of 1000 or less can further improve the oxygen absorbing performance.

The compound represented by any of Formulae (4-34) to (4-37) preferably has a high boiling point and a low vapor pressure at the temperature during use, from the viewpoint of further suppressing the loss by volatilization during use. Such a compound also preferably has a lower vapor pressure at the temperature for kneading with a thermoplastic resin and also preferably has a higher 3% weight-reduction temperature. The 3% weight-reduction temperature is not specifically limited and is preferably 150° C. or more, more preferably 200° C. or more, further preferably 250° C. or more, and most preferably 270° C. or more.

The compounds represented by Formulae (4-34) to (4-37) may be produced by any method and can be produced by a known method, such as a reaction between a diamine compound and an acid anhydride compound.

The compound having a tetralin ring represented by Formula (1) has a hydrogen atom at a benzylic position of the tetralin ring and expresses excellent oxygen-absorbing performance by removing the hydrogen atom at the benzylic position through the use together with a transition metal catalyst described below (the functions according to the embodiment are not limited thereto). From these viewpoints, at least one of substituents in the group consisting of $R_1$, $R_4$, $R_9$, and $R_{12}$ in Formula (1) is preferably a hydrogen atom.

The oxygen-absorbing composition of the embodiment can prevent an increase in odor strength after oxygen absorption. Although the reason thereof is not elucidated, for example, the following oxidation reaction mechanism is presumed. That is, it is presumed that a compound having a tetralin ring represented by Formula (1) is turned into a radical by removing a hydrogen atom at a benzylic position of the tetralin ring and that the carbon atom at the benzylic position is oxidized by the reaction between the radical and an oxygen atom to generate a hydroxy group or a ketone group. Consequently, in the oxygen-absorbing composition, the molecular chain of the oxygen-absorbing base compound is not cleaved by an oxidation reaction, unlike existing technologies, and the structure of the oxygen-absorbing base compound is maintained. An organic compound having a low molecular weight causing an odor is, therefore, scarcely generated after oxygen absorption, and as a result, an increase in odor strength after oxygen absorption is presumed to be inhibited. From also these viewpoints, a compound having a larger number of tetralin rings is preferred. Such a compound has an increased number of reactive sites with oxygen and has further excellent oxygen-absorbing performance. Although at least one tetralin ring may have the benzylic position to which a hydrogen atom is bonded, for example, when a compound has a substituent represented by Formula (1a) or Formula (1b), the tetralin ring of the substituent represented by Formula (1a) or Formula (1b) also preferably has the benzylic position to which a hydrogen atom bonded, from the viewpoint described above.

The molecular weight of the compound having a tetralin ring represented by Formula (1) can be appropriately adjusted depending on the desired characteristics or the substituents $R_1$ to $R_8$ to be introduced and is not specifically limited. From the viewpoint of suppressing the loss by volatilization during use and also increasing the amount of oxygen absorbed per unit mass of the compound, the molecular weight is preferably in a range of 190 to 1500, more preferably 210 to 1200, and most preferably 250 to 1000. The above-described compounds having tetralin rings represented by Formula (1) may be used alone or in combination of two or more thereof.

Among compounds having tetralin rings represented by Formula (1), preferred is a compound having a high boiling point, i.e., having a low vapor pressure at the temperature during use, from the viewpoint of suppressing the loss by volatilization during use. For example, a compound having a lower vapor pressure at the temperature for kneading with a thermoplastic resin can suppress the loss by volatilization during production of the oxygen-absorbing composition and is therefore preferred. An index of the loss by volatilization can be, for example, the 3% weight-reduction temperature. That is, the compound preferably has a 3% weight-reduction temperature of 100° C. or more, more preferably 150° C. or more, and most preferably 200° C. or more. The upper limit of the 3% weight-reduction temperature is not specifically limited.

In the oxygen-absorbing composition, the proportion of the compound having a tetralin ring represented by Formula (1) based on the total amount of the compound having a tetralin ring represented by Formula (1) and the thermoplastic resin described below is preferably 1% to 30% by mass, more preferably 1.5% to 25% by mass, and most preferably 2% to 20% by mass. A proportion of the compound having a tetralin ring represented by Formula (1) not lower than the above-mentioned lower limit can further enhance the oxygen-absorbing performance, and a proportion not higher than the above-mentioned upper limit can further enhance the moldability.

<Transition Metal Catalyst>

The transition metal catalyst contained in the oxygen-absorbing composition can be appropriately selected from known catalysts that can function as a catalyst for the oxidation reaction of the compound having a tetralin ring and is not specifically limited.

Examples of such a transition metal catalyst may include organic acid salts, halides, phosphates, phosphites, hypophosphites, nitrates, sulfates, oxides, and hydroxides of transition metals. Examples of the transition metal contained in the transition metal catalyst may include, but are not limited to, titanium, vanadium, chromium, manganese, iron, cobalt, nickel, copper, zinc, ruthenium, and rhodium. Among these metals, preferred are manganese, iron, cobalt, nickel, and copper. Examples of the organic acid may include, but are not limited to, acetic acid, propionic acid, octanoic acid, lauric acid, stearic acid, acetylacetone, dimethyldithiocarbamic acid, palmitic acid, 2-ethylhexanoic acid, neodecanoic acid, linoleic acid, tall oil acid, oleic acid, capric acid, and naphthenic acid. The transition metal catalyst is preferably a combination of such a transition metal and an organic acid, where the transition metal is more preferably manganese, iron, cobalt, nickel, or copper; and the organic acid is more preferably acetic acid, stearic acid, 2-ethylhexanoic acid, oleic acid, or naphthenic acid. The transition metal catalysts may be used alone or in combination of two or more thereof.

The amount of the transition metal catalyst blended can be appropriately determined depending on the types of the compound having a tetralin ring, the thermoplastic resin, and the transition metal catalyst used and the desired performance and is not specifically limited. From the viewpoint of the amount of oxygen absorbed by the oxygen-absorbing composition, the amount of the transition metal catalyst blended is preferably 0.001 to 10 parts by mass, more preferably 0.005 to 2 parts by mass, and most preferably 0.01 to 1 parts by mass, as the amount of the transition metal, based on 100 parts by mass of the total amount of the compound having a tetralin ring represented by Formula (1) and the thermoplastic resin (a).

In addition, for example, a mixture of the compound and the transition metal catalyst may be molded into a powdery, granular, pellet-like, or other small-piece form by a known granulation or molding method and may be blended with the above-described thermoplastic resin to form layer A.

The oxygen-absorbing composition used in the embodiment may optionally further contain a support material. On this occasion, the oxygen-absorbing composition containing a support material can be prepared as a mixture of the above-described compound, a thermoplastic resin, a transition metal catalyst, and a support material and can be directly used as an oxygen absorber. Alternatively, the above-described compound having a tetralin ring represented by Formula (1) is supported on or impregnated in the support material, if necessary, together with the transition metal catalyst to give a supporting body composed of the support material and the compound supported on or impregnated in the support material (hereinafter, also referred to as "oxygen absorber-supporting body"). This supporting body can also be used as an oxygen absorber. Thus, the supporting or impregnation of the compound to the support material increases the contact area with oxygen and can thereby increase the oxygen absorption rate or the amount of oxygen absorbed and can simplify the handling.

The support material can be appropriately selected from those known in the art, and examples thereof may include, but are not limited to, powders of synthetic calcium silicate, calcium hydroxide, activated carbon, zeolite, perlite, diatomaceous earth, activated clay, silica, kaolin, talc, bentonite, activated alumina, gypsum, silica alumina, calcium silicate, magnesium oxide, graphite, carbon black, aluminum hydroxide, and iron oxide. Among these support materials, preferred are synthetic calcium silicate, diatomaceous earth, silica, and activated carbon. The support materials may be used alone or in combination of two or more thereof.

The amount of the support material blended can be appropriately determined depending on the types of the compound, the thermoplastic resin, and the transition metal catalyst used and the desired performance and is not specifically limited. The amount of the support material blended is preferably 10 to 1000 parts by mass, more preferably 20 to 800 parts by mass, based on 100 parts by mass of the compound having a tetralin ring represented by Formula (1).

The compound can be supported on the support material by a common method, and the method is not specifically limited. For example, a mixture containing the above-described compound having a tetralin ring represented by Formula (1) or a mixture containing the compound and a transition metal catalyst is prepared, and, for example, this mixture is applied to a support material, or a support material is immersed in this mixture. Thus, an oxygen absorber supporting body in which the compound (and optionally a transition metal catalyst) is supported on (impregnated in) the support material can be obtained. In the preparation of the mixture, a solvent may be further added to the mixture. When the compound and the transition metal catalyst are solids, the use of a solvent allows these solids to be efficiently supported on a support material. The solvent used here can be appropriately selected from known solvents with consideration of, for example, solubility of the compound and the transition metal catalyst and is not specifically limited. The solvent is preferably an organic solvent, such as methanol, 2-propanol, ethylene glycol, toluene, xylene, methyl acetate, ethyl acetate, butyl acetate, diisopropyl ether, tetrahydrofuran, methyl ethyl ketone, dichloromethane, or chloroform, and more preferably methanol, 2-propanol, ethyl acetate, or methyl ethyl ketone. These solvents may be used alone or in combination of two or more thereof.

<Thermoplastic Resin (a)>

The oxygen-absorbing composition contains a thermoplastic resin (a). On this occasion, the compound having a tetralin ring and the transition metal catalyst may be contained in the oxygen-absorbing composition in any forms. For example, the compound having a tetralin ring and the transition metal catalyst may be directly contained in the thermoplastic resin, or the compound having a tetralin ring and the transition metal catalyst supported on the above-described support material may be contained in the thermoplastic resin.

The oxygen-absorbing composition can be prepared by a common method, and the method is not specifically limited. For example, an oxygen-absorbing composition can be prepared by mixing or kneading a compound having a tetralin ring, a transition metal catalyst, and an optional support material with a thermoplastic resin.

As the thermoplastic resin (a), any known one can be appropriately used. Examples thereof may include, but are not limited to, low-density polyethylenes, medium-density polyethylenes, high-density polyethylenes, linear low-density polyethylenes, linear extremely low-density polyethylenes, polypropylene, poly-1-butene, and poly-4-methyl-1-pentene; polyolefins being random or block copolymers of α-olefins such as ethylene, propylene, 1-butene, and 4-methyl-1-pentene; acid modified polyolefins, such as maleic anhydride grafted polyethylene and maleic anhydride grafted polypropylene; ethylene-vinyl compound copolymers, such as ethylene-vinyl acetate copolymers, ethylene-vinyl alcohol copolymers, ethylene-vinyl chloride copolymers, ethylene-(meth)acrylic acid copolymers and ion crosslinked compounds thereof (ionomers), and ethylene-methyl methacrylate copolymers; styrene-based resins such as polystyrene, acrylonitrile-styrene copolymers, and α-methylstyrene-styrene copolymers; polyvinyl compounds, such as poly(methyl acrylate) and poly(methyl methacrylate); polyamides, such as nylon 6, nylon 66, nylon 610, nylon 12, and poly(metaxylylene adipamide) (MXD6); polyesters, such as poly(ethylene terephthalate) (PET), poly(butylene terephthalate) (PBT), poly(trimethylene terephthalate) (PTT), poly(ethylene naphthalate) (PEN), glycol-modified poly(ethylene terephthalate) (PETG), poly(ethylene succinate) (PES), poly(butylene succinate) (PBS), poly(lactic acid), poly(glycolic acid), polycaprolactone, and poly(hydroxy alkanoate); polycarbonate; polyethers such as polyethylene oxide; and mixtures thereof. These thermoplastic resins may be used alone or in combination of two or more thereof as the thermoplastic resin (a).

Among these thermoplastic resins, the thermoplastic resin (a) is preferably at least one selected from the group consisting of a polyolefin, a polyester, a polyamide, an ethylene-vinyl alcohol copolymer, a plant-derived resin, and a chlorine-containing resin, more preferably at least one selected from the group consisting of a polyolefin, a polyester, a polyamide, an ethylene-vinyl alcohol copolymer, and a chlorine-containing resin. These preferred thermoplastic resins will now be described in detail.

<Polyolefin>

Examples of the polyolefin contained in the oxygen-absorbing composition may include polyethylenes, such as low-density polyethylene, medium-density polyethylenes, high-density polyethylenes, linear low-density polyethylenes, and linear extremely low-density polyethylenes; olefin homopolymers, such as polypropylene, polybutene-1, and poly-4-methylpentene-1; copolymers of ethylene and α-olefin, such as ethylene-propylene random copolymers, ethylene-propylene block copolymers, ethylene-propylene-polybutene-1 copolymers, and ethylene-cyclic olefin copolymers; ethylene-α,β-unsaturated carboxylic acid copolymers, such as ethylene-(meth)acrylic acid copolymers; ethylene-α,β-unsaturated carboxylic acid ester copolymers, such as ethylene-ethyl (meth)acrylate copolymers; other ethylene copolymers, such as ion crosslinked compounds of ethylene-α,β-unsaturated carboxylic acid copolymers and ethylene-vinyl acetate copolymers; and ring-opened polymers of cyclic olefins and hydrogen-added products thereof, cyclic olefin-ethylene copolymers, and graft-modified polyolefins prepared by graft modification of these polyolefins with acid anhydrides such as maleic anhydride.

<Polyester>

The polyester contained in the oxygen-absorbing composition is, for example, composed of one or two or more selected from polyvalent carboxylic acids including dicarboxylic acids and their ester-forming derivatives and one or two or more selected from polyhydric alcohols including glycols; composed of a hydroxycarboxylic acid and its ester-forming derivative; or composed of a cyclic ester. The ethylene terephthalate-based thermoplastic polyester is mainly composed of ester repeating units, in general, occupied by ethylene terephthalate units in 70 mol % or more thereof and preferably has a glass transition temperature (Tg) of 50° C. to 90° C. and a melting point (Tm) within a range of 200° C. to 275° C. Polyethylene terephthalate is, as an ethylene terephthalate-based thermoplastic polyester, excellent in, for example, pressure resistance, heat resistance, and heat and pressure resistance. In addition to ethylene terephthalate units, copolymer polyesters composed of dicarboxylic acids, such as isophthalic acid or naphthalenedicarboxylic acid, and a small amount of ester units of diols, such as propylene glycol, can be used.

Examples of the dicarboxylic acid may include saturated aliphatic dicarboxylic acids, such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimer acid, and ester-forming derivatives thereof; unsaturated aliphatic dicarboxylic acids, such as fumaric acid, maleic acid, and itaconic acid, and ester-forming derivatives thereof; naphthalenedicarboxylic acids, such as orthophthalic acid, isophthalic acid, terephthalic acid, 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid; aromatic dicarboxylic acids, such as 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, and anthracenedicarboxylic acid, and ester-forming derivatives thereof; and metal sulfonate group-containing aromatic dicarboxylic acids, such as 5-sodium sulfo-isophthalic acid, 2-sodium sulfo-terephthalic acid, 5-lithium sulfo-isophthalic acid, 2-lithium sulfo-terephthalic acid, 5-potassium sulfo-isophthalic acid, and 2-potassium sulfo-terephthalic acid, and lower alkyl ester derivatives thereof.

Among the above-mentioned dicarboxylic acids, terephthalic acid, isophthalic acid, and naphthalenedicarboxylic acids are particularly preferred, from the viewpoint of, for example, the physical properties resulting from the polyesters. The carboxylic acid may be optionally copolymerized with another dicarboxylic acid.

Examples of polyvalent carboxylic acids other than these dicarboxylic acids may include ethanetricarboxylic acid, propanetricarboxylic acid, butanetetracarboxylic acid, pyromellitic acid, trimellitic acid, trimesic acid, and 3,4,3',4'-biphenyltetracarboxylic acid, and ester-forming derivatives thereof.

Examples of the glycol may include aliphatic glycols, such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecanediol, poly(ethylene glycol), poly(trimethylene glycol), and poly(tetramethylene glycol); and aromatic glycols, such as hydroquinone, 4,4'-dihydroxy bisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, and 2,5-naphthalene diol, and glycols formed by adding an ethylene oxide to these glycols.

Among the above-mentioned glycols, in particular, ethylene glycol, 1,3-propyleneglycol, 1,4-butylene glycol, or 1,4-cyclohexane dimethanol can be preferably used as a main component.

Examples of polyhydric alcohols other than these glycols may include trimethylol methane, trimethylol ethane, trimethylol propane, pentaerythritol, glycerol, and hexane triol.

Examples of the hydroxycarboxylic acid may include lactic acid, citric acid, malic acid, tartaric acid, hydroxyacetic acid, 3-hydroxybutyric acid, p-hydroxybenzoic acid, p-(2-hydroxyethoxy)benzoic acid, and 4-hydroxycyclohexanecarboxylic acid, and ester-forming derivatives thereof.

Examples of the cyclic ester may include ε-caprolactone, β-propiolactone, β-methyl-β-propiolactone, δ-valerolactone, glycolide, and lactide.

Examples of the ester-forming derivatives of polyvalent carboxylic acid and hydroxycarboxylic acid may include alkyl esters, acid chlorides, and acid anhydrides thereof.

Among them, preferred are polyesters having terephthalic acid or its ester-forming derivative or naphthalenedicarboxylic acid or its ester-forming derivative as the main acid component and alkylene glycol as the main glycol component.

The polyester having terephthalic acid or its ester-forming derivative as the main acid components preferably contains the terephthalic acid or its ester-forming derivative in a total amount of 70 mol % or more, more preferably 80 mol % or more, and most preferably 90 mol % or more, based on the total amount of the acid components. Similarly, the polyester having naphthalenedicarboxylic acid or its ester-forming derivative as the main acid components contains the naphthalenedicarboxylic acid or its ester-forming derivative in a total amount of 70 mol % or more, more preferably 80 mol % or more, and most preferably 90 mol % or more, based on the total amount of the acid components.

Among the above-mentioned naphthalenedicarboxylic acids and ester-forming derivatives thereof, preferred are 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid, and ester-forming derivatives thereof exemplified as the dicarboxylic acids.

The polyester having alkylene glycol as the main glycol component contains the alkylene glycol in a total amount of 70 mol % or more, more preferably 80 mol % or more, and most preferably 90 mol % or more, based on the total amount of the glycol components. The alkylene glycol herein may contain a substituent or an alicyclic structure in the molecular chain.

The copolymer component other than the above-mentioned terephthalic acid/ethylene glycol is, from the viewpoint of achieving transparency and moldability simultaneously, preferably at least one selected from the group consisting of isophthalic acid, 2,6-naphthalenedicarboxylic acid, diethylene glycol, neopentylglycol, 1,4-cyclohexane dimethanol, 1,2-propanediol, 1,3-propanediol, and 2-methyl-1,3-propanediol, and more preferably at least one selected from the group consisting of isophthalic acid, diethylene glycol, neopentylglycol, and 1,4-cyclohexane dimethanol.

A preferred example of the polyester contained in the oxygen-absorbing composition is a polyester having a main repeating unit of ethylene terephthalate, more preferably a linear polyester containing 70 mol % or more of ethylene terephthalate units, further preferably a linear polyester containing 80 mol % or more of ethylene terephthalate units, and most preferably a linear polyester containing 90 mol % or more of ethylene terephthalate units.

Another preferred example of the polyester contained in the oxygen-absorbing composition is a polyester having a main repeating unit of ethylene-2,6-naphthalate, more preferably a linear polyester containing 70 mol % or more of ethylene-2,6-naphthalate units, further preferably a linear polyester containing 80 mol % or more of ethylene-2,6-naphthalate units, and most preferably a linear polyester containing 90 mol % or more of ethylene-2,6-naphthalate units.

Another preferred example of the polyester contained in the oxygen-absorbing composition is a linear polyester containing 70 mol % or more of propylene terephthalate units, a linear polyester containing 70 mol % or more of propylene naphthalate units, a linear polyester containing 70 mol % or more of 1,4-cyclohexanedimethylene terephthalate units, a linear polyester containing 70 mol % or more of butylene naphthalate units, or a linear polyester containing 70 mol % or more of butylene terephthalate units.

From the viewpoint of achieving transparency and moldability simultaneously, particularly preferred combinations of whole polyesters are a combination of terephthalic acid/isophthalic acid/ethylene glycol, a combination of terephthalic acid/ethylene glycol/1,4-cyclohexane dimethanol, and a combination of terephthalic acid/ethylene glycol/neopentylglycol. Understandably, the above-mentioned polyesters may contain a small amount (5 mol % or less) of diethylene glycol generated by dimerization of ethylene glycol during esterification (transesterification) reaction or polycondensation reaction.

Other preferred examples of the polyester contained in the oxygen-absorbing composition may include poly(glycolic acid) prepared by polycondensation of glycolic acid or methyl glycolate or by ring-opening polycondensation of glycolide. The poly(glycolic acid) may one copolymerized with another component such as lactide.

<Polyamide>

Examples of the polyamide contained in the oxygen-absorbing composition may include a polyamide having a main constitutional unit derived from a lactam or an aminocarboxylic acid, an aliphatic polyamide having a main constitutional unit derived from an aliphatic diamine and an aliphatic dicarboxylic acid, a partially aromatic polyamide having a main constitutional unit derived from an aliphatic diamine and an aromatic dicarboxylic acid, and a partially aromatic polyamide having a main constitutional unit derived from an aromatic diamine and an aliphatic dicarboxylic acid. The polyamide herein may be optionally copolymerized with a monomer unit other than the main constitutional unit.

Examples of the lactam or aminocarboxylic acid may include lactams, such as ε-caprolactam and laurolactam; aminocarboxylic acids, such as aminocaproic acid and aminoundecanoic acid; and aromatic aminocarboxylic acids, such as para-aminomethylbenzoic acid.

Examples of the aliphatic diamine may include aliphatic diamines having 2 to 12 carbon atoms and functional derivatives thereof, and alicyclic diamines. The aliphatic diamine may be a linear aliphatic diamine or a branched linear aliphatic diamine. Examples of the linear aliphatic diamine may include aliphatic diamines, such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine.

Examples of the alicyclic diamine may include cyclohexanediamine, 1,3-bis(aminomethyl)cyclohexane, and 1,4-bis(aminomethyl)cyclohexane.

Examples of the aliphatic dicarboxylic acid may include linear aliphatic dicarboxylic acids and alicyclic dicarboxylic acids. In particular, linear aliphatic dicarboxylic acids including alkylene groups having 4 to 12 carbon atoms are preferred. Examples of the linear aliphatic dicarboxylic acid may include adipic acid, sebacic acid, malonic acid, succinic acid, glutaric acid, pimelic acid, suberic acid, azelaic acid, undecanoic acid, undecanedioic acid, dodecanedioic acid, and dimer acid, and functional derivatives thereof. Examples of the alicyclic dicarboxylic acid may include 1,4-cyclohexanedicarboxylic acid, hexahydroterephthalic acid, and hexahydroisophthalic acid.

Examples of the aromatic diamine may include meta-xylylenediamine, para-xylylenediamine, and para-bis(2-aminoethyl)benzene.

Examples of the aromatic dicarboxylic acid may include terephthalic acid, isophthalic acid, phthalic acid, 2,6-naphthalenedicarboxylic acid, diphenyl-4,4'-dicarboxylic acid, and diphenoxyethanedicarboxylic acid, and functional derivatives thereof.

Examples of the polyamide may include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly(meta-xylylene adipamide) (polyamide MXD6), isophthalic acid copolymerized poly(meta-xylylene adipamide) (polyamide MXD6I), poly(meta-xylylene sebacamide) (polyamide MXD10), poly(meta-xylylene dodecanamide) (polyamide MXD12), poly(1,3-bis aminocyclohexane adipamide) (polyamide BAC6), and poly(para-xylylene sebacamide) (polyamide PXD10). Preferred examples of the polyamide may include polyamide 6, polyamide MXD6, and polyamide MXD6I.

The copolymer component that may be copolymerized with the polyamide is a polyether having at least one terminal amino group or terminal carboxyl group and having a number-average molecular weight of 2000 to 20000, an organic carboxylate of a polyether having a terminal amino group, or an amino salt of a polyether having a terminal carboxyl group. Examples thereof may include bis(aminopropyl)poly(ethylene oxide) (polyethylene glycol having a number-average molecular weight of 2000 to 20000).

The partially aromatic polyamide may contain a constitutional unit derived from a tri- or more-basic polyvalent carboxylic acid, such as trimellitic acid or pyromellitic acid, within a range of being substantially linear.

<Ethylene-Vinyl Alcohol Copolymer>

The ethylene-vinyl alcohol copolymer contained in the oxygen-absorbing composition preferably has an ethylene content of 15 to 60 mol % and includes a vinyl acetate component having a degree of saponification of 90 mol % or more. The ethylene content is preferably 20 to 55 mol % and more preferably 29 to 44 mol %. The degree of saponification of the vinyl acetate component is preferably 95 mol % or more. The ethylene-vinyl alcohol copolymer may further contain a small amount of comonomer of α-olefin, such as propylene, isobutene, α-octene, α-dodecene, or α-octadecene, an unsaturated carboxylic acid or its salt, a partial alkyl ester, a complete alkyl ester, nitrile, an amide, an anhydride, or an unsaturated sulfonic acid or its salt.

<Plant-Derived Resin>

The plant-derived resin contained in the oxygen-absorbing composition may be any resin containing a plant-derived material, and the plant for the raw material is not specifically limited. Examples of the plant-derived resin may include aliphatic polyester-based biodegradable resins. Examples of the aliphatic polyester-based biodegradable resin may include poly(α-hydroxy acid), such as poly(glycolic acid) (PGA) and poly(lactic acid) (PLA); and polyalkylene alkanoate, such as poly(butylene succinate) (PBS) and poly(ethylene succinate) (PES).

<Chlorine-Containing Resin>

The chlorine-containing resin contained in the oxygen-absorbing composition may be any resin containing chlorine in its constitutional unit and can be a known resin. Examples of the chlorine-containing resin may include poly(vinyl chloride), poly(vinylidene chloride), and their copolymers with vinyl acetate, a maleic acid derivative, or higher alkyl vinyl ether.

Among the thermoplastic resins exemplified above, linear low-density polyethylene (LLDPE), ethylene-vinyl alcohol copolymer (EVOH), nylon 6 (PA6), polyethylene terephthalate (PET), and poly(vinyl chloride) (PVC) are preferably used as packaging materials for food.

The oxygen-absorbing composition may further optionally contain a radical generator or a photoinitiator for facilitating the oxygen absorption reaction. Examples of the radical generator may include a variety of N-hydroxyimide compounds, for example, but not limited to, N-hydroxysuccinimide, N-hydroxymaleimide, N,N'-dihydroxycyclohexanetetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy HET acid imide, N-hydroxy High Mick acid imide, N-hydroxytrimellitic acid imide, and N,N-dihydroxypyromellitic acid dimide. Examples of the photoinitiator may include, but are not limited to, benzophenone and derivatives thereof, thiazine dyes, metal porphyrin derivatives, and anthraquinone derivatives. These radical generators and photoinitiators may be used alone or in combination of two or more thereof.

The oxygen-absorbing composition may contain a variety of additives known in the art within a range that does not impair the effects of the embodiments. Examples of such optional components may include, but are not limited to, fillers, such as calcium carbonate, clay, mica, and silica, desiccants, pigments, dyes, antioxidants, slipping agents, antistatic agents, stabilizers, plasticizers, and deodorants.

[Thermoplastic Resin Layer (Layer B)]

The thermoplastic resin layer (layer B) of the oxygen-absorbing multilayer body of the embodiment contains a thermoplastic resin (b). The content proportion of the thermoplastic resin (b) in layer B can be appropriately determined and is not specifically limited, and is preferably 70% to 100% by mass, more preferably 80% to 100% by mass, and most preferably 90% to 100% by mass, based on the total amount of layer B.

The oxygen-absorbing multilayer body of the embodiment may include a plurality of layers of layer B, and the plurality of layers of layer B may have the same or different structures. The thickness of layer B of the oxygen-absorbing multilayer body of the embodiment can be appropriately determined depending on the use and the desired performance. Although the thickness is not specifically limited, from the viewpoint of securing various physical properties, i.e., the strength, such as drop resistance, and flexibility, required in the multilayer body, the thickness is preferably 5 to 1000 µm, more preferably 10 to 800 µm, and most preferably 20 to 500 µm.

The thermoplastic resin (b) of layer B of the oxygen-absorbing multilayer body of the embodiment may be any thermoplastic resin without specific limitation and, for example, may be the same as or different from the thermoplastic resin (a) used in layer A described above. Layer B of the embodiment preferably contains at least one selected from the group consisting of a polyolefin, a polyester, a polyamide, an ethylene-vinyl alcohol copolymer, a plant-derived resin, and a chlorine-containing resin. The content of the thermoplastic resin (b) used in layer B of the embodiment is preferably 50% to 100% by mass, more preferably 70% to 100% by mass, and most preferably 90% to 100% by mass, based on the total amount of layer B.

The exemplified thermoplastic resin (b) that can be used in layer B, i.e., polyolefins, polyesters, polyamides, ethylene-vinyl alcohol copolymers, plant-derived resins, and chlorine-containing resins, may be those exemplified as the thermoplastic resin (a) that can be used in layer A.

Layer B of the oxygen-absorbing multilayer body of the embodiment may contain a variety of additives known in the art, in addition to the above-mentioned thermoplastic resins. Examples of such optional components may include, but are not limited to, desiccants, color pigments such as titanium oxide, dyes, antioxidants, slipping agents, antistatic agents, plasticizers, stabilizers, additives such as lubricants, fillers such as calcium carbonate, clay, mica, and silica, and deodorants. In particular, in the viewpoint of recycling and reprocessing offcuts generated during production, it is preferable to add an antioxidant to layer B.

[Other Layer]

The oxygen-absorbing multilayer body of the embodiment may further include an arbitrary layer, in addition to the above-described oxygen-absorbing layer (layer A) and the resin layer (layer B), depending on desired performance and other factors. Examples of such an arbitrary layer may include adhesive layers, metal foil, metal vapor deposition layers, and organic-inorganic films.

For example, from the viewpoint of further increasing the interlayer adhesion strength between adjacent two layers, an adhesive layer (layer AD) is preferably disposed between the two layers. The adhesive layer preferably contains a thermoplastic resin having adhesiveness. Examples of the thermoplastic resin having adhesiveness may include acid-modified polyolefin resins obtained by modifying polyolefin-based resins, such as polyethylene and polypropylene, with unsaturated carboxylic acids, such as acrylic acid, methacrylic acid, maleic acid, maleic anhydride, fumaric acid, and itaconic acid; and polyester-based thermoplastic elastomers mainly composed of polyester-based block copolymers. In addition, from the viewpoint of enhancing the adhesiveness to the above-described resin layer (layer B), preferred is a resin prepared by modifying a resin of the same type as the thermoplastic resin (b) used in layer B. The adhesive layer may have any thickness, but from the viewpoint of securing molding processability while maintaining practical adhesion strength, the thickness is preferably 2 to 100 µm, more preferably 5 to 90 µm, and most preferably 10 to 80 µm.

In addition, from the viewpoint of further enhancing the gas barrier property and light shielding property, one surface of layer A or layer B is preferably provided with, for example, metal foil, a metal vapor deposition layer, or an organic-inorganic film. The metal foil is not specifically limited, and preferred is aluminum foil. The thickness of the metal foil is preferably 3 to 50 µm, more preferably 3 to 30 µm, and most preferably 5 to 15 µm, from the viewpoint of, for example, the gas barrier property, light shielding property, and bending resistance. The metal vapor deposition layer is not specifically limited, and preferred is, for example, a film of a metal, such as aluminum or alumina, or an oxide thereof deposited on a resin film. Examples of the method for forming the vapor deposition film may include, but are not limited to, physical vapor deposition, such as vacuum vapor deposition, sputtering, or ion plating; and chemical vapor deposition, such as PECVD, and a known method can be employed. The vapor deposition film preferably has a thickness of 5 to 500 nm and more preferably 5 to 200 nm, from the viewpoint of, for example, the gas barrier property, light shielding property, and bending resistance. The organic-inorganic film layer is not specifically limited, and is preferably, for example, a resin film coated with a silica-poly(vinyl alcohol) hybrid film prepared by a sol-gel method. The coating film preferably has a thickness of 100 nm to 50 µm and more preferably 1 to 15 µm, from the viewpoint of, for example, the gas barrier property, light shielding property, and bending resistance.

Furthermore, when the oxygen-absorbing multilayer body of the embodiment is used as, for example, a container described below, in order to allow easy opening of the oxygen-absorbing container, the container may include an easy-peel layer or an easy-tear layer. As the easy-peel layer, for example, a film having a sealing strength and a peeling strength controlled by blending two or more different polyolefins is commonly known. As the easy-tear layer, for example, an easily tearable film composed of nylon 6 and nylon MXD6 is commonly known.

The oxygen-absorbing multilayer body of the embodiment can be produced by a known method, such as a coextrusion process or a variety of laminating or coating processes, depending on the properties of raw materials, processing purposes, processing steps, and other factors. The production process is not specifically limited. For example, a film or a sheet can be molded by extrusion of a molten resin composition from an extruder equipped with a T die, a circular die, or other equipment or by applying an adhesive to an oxygen-absorbing film or sheet separately formed and pasting it to another film or sheet. If necessary, for example, pretreatment, such as corona treatment or ozone treatment, can be applied to such a film or sheet. Furthermore, a known anchor coating agent or adhesive can also be used, for example, an anchor coating agent (e.g., isocyanate-based anchor coating agent (urethane-based anchor coating agent), polyethylene imine-based anchor coating agent, polybutadiene-based anchor coating agent, or organic titanium-based anchor coating agent) or an adhesive for lamination (e.g., polyurethane-based adhesive, polyacryl-based adhesive, polyester-based adhesive, epoxy-based adhesive, poly(vinyl acetate)-based adhesive, cellulose-based adhesive, or another adhesive) can be used.

[Oxygen-Absorbing Container]

In the oxygen-absorbing container of the embodiment, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The oxygen-absorbing container of the embodiment may have any shape. The shape can be appropriately determined depending on the article to be stored and stored. Such a container can be suitably used as a pouch, cup, tray, or bottle.

Furthermore, for example, the film-form or sheet-form oxygen-absorbing multilayer body can be formed into a bag, such as a three-side sealed flat bag, a standing pouch, a gusset packaging bag, a pillow packaging bag, a multi-chamber pouch composed of a main chamber and a sub chamber and having an easy-peel wall between the main chamber and the sub chamber, or a shrink film package. The multilayer body can also be thermoformed into a container having an arbitrary shape.

More specifically, the film-form or sheet-form oxygen-absorbing multilayer body can be molded into an oxygen-absorbing container having a predetermined shape, such a tray, cup, bottle, tube, or press-through pack (PTP), by a method, such as vacuum molding, pressure molding, or plug assist molding. Furthermore, a multilayer container having a predetermined shape can be molded at a time with an injector by coinjection or sequential injection of a molten resin into an injection mold through a multilayer multiplex die.

In a case of thermoforming a container having a flange portion, a special machining for imparting an easy-peel function to the flange portion may be carried out. Furthermore, an oxygen-absorbing function can be provided to such a container by using the above-described oxygen-absorbing multilayer body in a member, such as a lid member or a top seal, of the container.

In the use of the oxygen-absorbing multilayer body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The oxygen-absorbing multilayer body of the embodiment does not require water in oxygen absorption, in other words, the multilayer body can absorb oxygen regardless of the presence or absence of water in the article to be stored and can, therefore, be applied to a wide variety of uses regardless of the type of the article to be stored. In particular, the multilayer body causes no odor after oxygen absorption and can be particularly suitably used in, for example, foods, cooked foods, beverages, health foods, and medicinal product. That is, the oxygen-absorbing composition and various molded products, such as multilayer bodies, formed from the composition have excellent oxygen-absorption performance under broad humidity conditions from low humidity to high humidity (relative humidity: 0% to 100%) and have excellent flavor retention properties to retain the flavor of the contents and are therefore suitable for packaging various articles.

Examples of the article to be stored may include, but are not limited to, beverages, such as milk, juice, coffee, tea, and alcoholic beverages; liquid seasonings, such as sauce, soy sauce, noodle broth, and dressing; cooked foods, such as soup, stew, and curry; paste foods, such as jam and mayonnaise; seafood products, such as tuna and fish and shellfish; processed milk products and processed egg products, such as cheese, butter, and eggs; processed meat products, such as meat, salami sausage, sausage, and ham; vegetables, such as carrot, potato, asparagus, and shiitake mushroom; fruits; egg; noodles; rice, such as rice and polished rice; cereals, such as beans; processed rice foods and processed cereal foods, such as cooked rice, rice boiled with red beans, rice cake, and rice gruel; confectioneries, such as adzuki-bean jelly, pudding, cake, and steamed bean-jam buns; dry foods (foods having low water activity), such as powdered seasoning, powdered coffee, coffee beans, tea, powdered milk for infants, cooked food for infants, powdered dietary foods, nursing care cooked food, dry vegetables, Japanese cracker, and rice cracker; chemical products, such as adhesives, gluing agents, agrichemicals, and pesticides; medicinal products; health foods, such as vitamin supplements; pet foods; sundry articles, such as cosmetics, shampoos, conditioners, and detergents; and other various articles. In particular, the oxygen-absorbing multilayer body of the embodiment is suitable for packaging articles that are easily degraded in the presence of oxygen, for example, beverages, such as beer, wine, rice wine (Japanese sake), distilled spirit (shochu), fruit juice beverages, fruit juice, vegetable juice, and carbonated drinks and teas; foods, such as fruits, nuts, vegetables, meat products, infant foods, coffee, jam, mayonnaise, ketchup, edible oil, dressing, sauce, foods boiled in soy sauce, and milk products; and other articles, such as medicinal products and cosmetics. Incidentally, the term "water activity" refers to a scale showing the content of free water in an article and represented by a numeral from 0 to 1. An article containing no water has an water activity of 0 and pure water has a water activity of 1. That is, the water activity $A_W$ of an article is defined as follows:

$$A_W = P/P_0 = RH/100$$

where P represents the water vapor pressure in a space, in which the article is sealed, after arrival at the equilibrium; $P_0$ represents the water vapor pressure of pure water; and RH (%) represents the relative humidity in the space.

The container and the article to be stored can be sterilized by a method suitable for the article before and after storing (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with a gas such as ethylene oxide, and sterilization with a chemical agent such as hydrogen peroxide or hypochlorous acid.

<Second Embodiment>

[Oxygen-Absorbing Multilayer Body]

The oxygen-absorbing multilayer body of the embodiment includes an oxygen-absorbing layer (layer A) containing an oxygen-absorbing composition and a thermoplastic resin layer (layer B) containing a thermoplastic resin (b), where the oxygen-absorbing composition contains at least one compound having a tetralin ring represented by Formula (1), a transition metal catalyst, and an ethylene-vinyl alcohol copolymer. This oxygen-absorbing multilayer body is the same as that in first embodiment except that the ethylene-vinyl alcohol copolymer is used instead of the thermoplastic resin (a).

The oxygen-absorbing multilayer body of the embodiment may have any layer structure, and the number and the types of the oxygen-absorbing layer (layer A) and the thermoplastic resin layer (layer B) are not specifically limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body of the embodiment is a layer containing an oxygen-absorbing composition containing at least one compound having a tetralin ring represented by Formula (1), a transition metal catalyst, and an ethylene-vinyl alcohol copolymer.

<Tetralin Compound>

The compound having a tetralin ring described in the first embodiment can be appropriately used, unless specifically indicated otherwise.

The compound represented by any of Formulae (4-34) to (4-37) having a high boiling point and a low vapor pressure at the temperature during use can further suppress the loss by volatilization during use and is therefore preferred. Such a compound also preferably has a lower vapor pressure at the temperature for kneading with an ethylene-vinyl alcohol copolymer. In addition, a compound having a higher 3% weight-reduction temperature is preferred. The 3% weight-reduction temperature is not specifically limited and is preferably 150° C. or more, more preferably 200° C. or more, further preferably 250° C. or more, and most preferably 270° C. or more.

Among the compounds having tetralin rings represented by Formula (1), from the viewpoint of suppressing the loss by volatilization during use, preferred are compounds having a higher boiling point, i.e., a lower vapor pressure at the temperature during use. For example, a compound having a lower vapor pressure at the temperature for kneading with an ethylene-vinyl alcohol copolymer can suppress the loss by volatilization during the production of the oxygen-absorbing composition and is therefore preferred. An index of the loss by volatilization can be, for example, the 3% weight-reduction temperature. That is, the compound preferably has a 3% weight-reduction temperature of 100° C. or more, more preferably 150° C. or more, and most preferably 200° C. or more. The upper limit of the 3% weight-reduction temperature is not specifically limited.

The proportion of the compound having a tetralin ring represented by Formula (1) is preferably 1% to 30% by mass, more preferably 1.5% to 25% by mass, and most preferably 2% to 20% by mass, based on the total amount of the compound having a tetralin ring represented by Formula (1) and the ethylene-vinyl alcohol copolymer described below in the oxygen-absorbing composition. A proportion of the compound having a tetralin ring represented by Formula (1) not lower than the above-mentioned lower limit can further enhance the oxygen-absorbing performance, and a proportion not higher than the above-mentioned upper limit can further enhance the moldability.

<Transition Metal Catalyst>

The transition metal catalyst described in the first embodiment can be appropriately used, unless specifically indicated otherwise.

The amount of the transition metal catalyst blended can be appropriately determined depending on the types of the compound having a tetralin ring, the ethylene-vinyl alcohol copolymer, and the transition metal catalyst used and the desired performance and is not specifically limited. From the viewpoint of the amount of oxygen absorbed by the oxygen-absorbing composition, the amount of the transition metal catalyst blended is preferably 0.001 to 10 parts by mass, more preferably 0.005 to 2 parts by mass, and most preferably 0.01 to 1 parts by mass, as the amount of the transition metal, based on 100 parts by mass of the total amount of the compound having a tetralin ring represented by Formula (1) and the ethylene-vinyl alcohol copolymer.

In addition, for example, a mixture of the compound and the transition metal catalyst may be molded into a powdery, granular, pellet-like, or other small-piece form by a known granulation or molding method and may be blended with the above-described ethylene-vinyl alcohol copolymer to form layer A.

The oxygen-absorbing composition used in the embodiment may optionally further contain a support material. On this occasion, the oxygen-absorbing composition containing a support material can be prepared as a mixture of the above-described compound, ethylene-vinyl alcohol copolymer, transition metal catalyst, and support material and can be directly used as an oxygen absorber. Alternatively, the above-described compound having a tetralin ring represented by Formula (1) is supported on or impregnated in the support material, if necessary, together with the transition metal catalyst to give a supporting body composed of the support material and the compound supported on or impregnated in the support material (hereinafter, also referred to as "oxygen absorber-supporting body"). This supporting body can also be used as an oxygen absorber. Thus, the supporting or impregnation of the compound to the support material increases the contact area with oxygen and can thereby increase the oxygen absorption rate or the amount of oxygen absorbed and can simplify the handling.

The amount of the support material blended can be appropriately determined depending on the types of the compound, the ethylene-vinyl alcohol copolymer, and the transition metal catalyst used and the desired performance and is not specifically limited. The amount of the support material blended is preferably 10 to 1000 parts by mass, more preferably 20 to 800 parts by mass, based on 100 parts by mass of the compound having a tetralin ring represented by Formula (1).

<Ethylene-Vinyl Alcohol Copolymer>

The oxygen-absorbing composition contains an ethylene-vinyl alcohol copolymer. On this occasion, the compound having a tetralin ring and the transition metal catalyst may be contained in the oxygen-absorbing composition in any form. For example, the compound having a tetralin ring and the transition metal catalyst may be directly contained in the ethylene-vinyl alcohol copolymer, or the compound having a tetralin ring and the transition metal catalyst supported on the above-described support material may be contained in the ethylene-vinyl alcohol copolymer.

The ethylene-vinyl alcohol copolymer contained in the oxygen-absorbing composition preferably has an ethylene content of 15 to 60 mol % and includes a vinyl acetate component having a degree of saponification of 90 mol % or more. The ethylene content is preferably 20 to 55 mol % and more preferably 29 to 44 mol %. The degree of saponification of the vinyl acetate component is preferably 95 mol % or more. The ethylene-vinyl alcohol copolymer may further contain a small amount of comonomer of α-olefin, such as propylene, isobutene, α-octene, α-dodecene, or α-octadecene, an unsaturated carboxylic acid or its salt, a partial alkyl ester, a complete alkyl ester, nitrile, an amide, an anhydride, or an unsaturated sulfonic acid or its salt.

The oxygen-absorbing composition can be prepared by a common method, and the method is not specifically limited. For example, an oxygen-absorbing composition can be prepared by mixing or kneading a compound having a tetralin ring, a transition metal catalyst, and an optional support material with an ethylene-vinyl alcohol copolymer.

The oxygen-absorbing composition can contain a thermoplastic resin, in addition to the ethylene-vinyl alcohol copolymer. Any known thermoplastic resin can be appropriately used as the resin other than the ethylene-vinyl alcohol copolymer without any limitation. Examples thereof may include low-density polyethylenes, medium-density polyethylenes, high-density polyethylenes, linear low-density polyethylenes, linear extremely low-density polyethylenes, polypropylene, poly-1-butene, poly-4-methyl-1-pentene, polyolefins being random or block copolymers of α-olefins such as ethylene, propylene, 1-butene, and 4-methyl-1-pentene; acid modified polyolefins, such as maleic anhydride grafted polyethylene and maleic anhydride grafted polypropylene; ethylene-vinyl compound copolymers, such as ethylene-vinyl acetate copolymers, ethylene-vinyl chloride copolymers, ethylene-(meth)acrylic acid copolymers and ion crosslinked compounds thereof (ionomers), and ethylene-methyl methacrylate copolymers; styrene-based resins, such as polystyrene, acrylonitrile-styrene copolymers, and α-methylstyrene-styrene copolymers; polyvinyl compounds, such as poly(methyl acrylate) and poly(methyl methacrylate); polyamides, such as nylon 6, nylon 66, nylon 610, nylon 12, and poly(metaxylylene adipamide) (MXD6); polyesters, such as poly(ethylene terephthalate) (PET), poly(butylene terephthalate) (PBT), poly(trimethylene terephthalate) (PTT), poly(ethylene naphthalate) (PEN), glycol-modified poly(ethylene terephthalate) (PETG), poly(ethylene succinate) (PES), poly(butylene succinate) (PBS), poly(lactic acid), poly(glycolic acid), polycaprolactone, and poly(hydroxy alkanoate); polycarbonate; polyethers, such as polyethylene oxide; and mixtures thereof. These thermoplastic resins may be used alone or in combination of two or more thereof.

The oxygen-absorbing composition may further optionally contain a radical generator or a photoinitiator for facilitating the oxygen absorption reaction. The radical generators and the photoinitiators described in the first embodiment can be appropriately used.

The oxygen-absorbing composition may contain a variety of additives known in the art within a range that does not impair the effects of the embodiments. Examples of such optional components may include, but are not limited to, fillers, such as calcium carbonate, clay, mica, and silica, desiccants, pigments, dyes, antioxidants, slipping agents, antistatic agents, stabilizers, plasticizers, and deodorants.

[Thermoplastic Resin Layer (Layer B)]

The thermoplastic resin layer (layer B) of the oxygen-absorbing multilayer body of the embodiment contains a thermoplastic resin (b). The thermoplastic resin layer (layer B) described in the first embodiment can be used, unless specifically indicated otherwise.

[Other Layer]

The oxygen-absorbing multilayer body of the embodiment may further include an arbitrary layer, in addition to the above-described oxygen-absorbing layer (layer A) and resin layer (layer B), depending on desired performance and other factors. Examples of such an arbitrary layer may include adhesive layers, metal foil, metal vapor deposition layers, and organic-inorganic films. As these layers, the layers described in the paragraph "other layer" of the first embodiment can be appropriately used, unless specifically indicated otherwise.

Furthermore, when the oxygen-absorbing multilayer body of the embodiment is used as, for example, a container described below, in order to allow easy opening of the oxygen-absorbing container, the container may include an easy-peel layer or an easy-tear layer. As the easy-peel layer, for example, a film having a sealing strength and a peeling strength controlled by blending two or more different polyolefins is generally known. As the easy-tear layer, for example, an easily tearable film composed of nylon 6 and nylon MXD6 is generally known.

The oxygen-absorbing multilayer body of the embodiment can be produced by a known method, such as a coextrusion process or a variety of laminating or coating processes, depending on the properties of raw materials, processing purposes, processing steps, and other factors. The production process is not specifically limited. For example, the method for producing the multilayer body is the same as that described in the first embodiment, and duplicated description is omitted.

[Oxygen-Absorbing Multilayer Container]

In the oxygen-absorbing multilayer container of the embodiment, the above-described oxygen-absorbing multilayer body is included in the entire or a part of the packaging container. The oxygen-absorbing multilayer container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing multilayer container of the embodiment are the same as those described in the first embodiment, and duplicated description is omitted.

A sealed container can be produced by thermoforming the above-described oxygen-absorbing multilayer body into the body of a packaging container and joining the body to a top film (lid member) including a gas barrier layer containing a gas barrier material. The gas barrier material contained in the gas barrier layer of the top film (lid member) may be a known gas barrier material. The top film (lid member) preferably has an oxygen transmission rate of 100 mL/($m^2$·day·atm) or less, more preferably 80 mL/($m^2$·day·atm) or less, and most preferably 50 mL/($m^2$·day·atm) or less, when measured for a film having a thickness of 20 μm under conditions of a temperature of 23° C. and a relative humidity of 60%. The sealed container can also be produced by preparing the top film (lid member) as a multilayer body, using the thermoplastic resin used in layer B of the above-described oxygen-absorbing multilayer body as the inner layer, and heat-sealing layer B and the inner layer of the top film (lid member).

In the use of the oxygen-absorbing multilayer body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The oxygen-absorbing multilayer body of the embodiment does not require water in oxygen absorption, in other words, the multilayer body can absorb oxygen regardless of the presence or absence of water in the article to be stored and can, therefore, be applied to a wide variety of uses regardless of the type of the article to be stored. The details of the article to be stored and the sterilization treatment are the same as those in the first embodiment, and duplicated description is omitted.

<Third Embodiment>

[Oxygen-Absorbing Multilayer Body]

The oxygen-absorbing multilayer body of the embodiment at least includes three layers including a sealant layer (layer C) containing a thermoplastic resin, an oxygen-absorbing layer (layer A) of an oxygen-absorbing composition, and a gas barrier layer (layer D) containing a gas barrier material in this order. The oxygen-absorbing multilayer body of the embodiment may further optionally include a layer other than these three layers at any position. Accordingly, the oxygen-absorbing multilayer body of the embodiment is the same as that in the first embodiment except that the thermoplastic resin layer is the sealant layer and includes at least three layers including a sealant layer, an oxygen-absorbing layer, and a gas barrier layer containing a gas barrier material in this order. An example of such an oxygen-absorbing multilayer body may be a laminate of at least three layers including a sealant layer (layer C) containing a thermoplastic resin, an oxygen-absorbing layer (layer A) of an oxygen-absorbing composition, and a gas barrier layer (layer D) containing a gas barrier material.

The oxygen-absorbing multilayer body of the embodiment is included in a part or the entire of the packaging container for sealing such that layer C is at the inner side and absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

[Sealant Layer (Layer C)]

The sealant layer (layer C) of the oxygen-absorbing multilayer body of the embodiment contains a thermoplastic resin. This layer C has, in addition to the function as a sealant, the function of transmitting oxygen inside the container to the oxygen-absorbing layer and also the function of isolating between the oxygen-absorbing layer (layer A) and the contents (article to be stored) (preventing physical contact between layer A and an article to be stored). Herein, layer C preferably has an oxygen permeability of 300 mL/(m$^2$·day·atm) or more, more preferably 400 mL/(m$^2$·day·atm) or more, and most preferably 500 mL/(m$^2$·day·atm) or more, when measured for a film having a thickness of 20 μm under conditions of a temperature of 23° C. and a relative humidity of 60%. A case of an oxygen permeability of not less than the preferred value can further enhance the rate of absorbing oxygen by layer A, compared to a case of outside the range.

Examples of the thermoplastic resin used in layer C of the oxygen-absorbing multilayer body of the embodiment may include a variety of polyethylenes, such as high-density polyethylenes, medium-density polyethylenes, low-density polyethylenes, linear low-density polyethylenes, linear extremely low-density polyethylenes, and polyethylenes obtained in the presence of metallocene catalyst; polystyrenes; polymethylpentenes; polypropylenes, such as propylene homopolymers, propylene-ethylene block copolymers, and propylene-ethylene random copolymers; polyesters having heat sealing properties, such as PET, A-PET, PETG, and PBT; and amorphous nylon. These thermoplastic resins may be used alone or in a combination. Layer C may optionally contain, in addition to such a thermoplastic resin, an ethylene-vinyl acetate copolymer, an ethylene-methyl acrylate copolymer, an ethylene-ethyl acrylate copolymer, an ethylene-acrylic acid copolymer, an ethylene-methacrylic acid copolymer, an ethylene-methyl methacrylate copolymer, or a thermoplastic elastomer. The thermoplastic resin used in layer C of the oxygen-absorbing multilayer body of the embodiment preferably has an MFR of 1 to 35 g/10 min at 200° C. or an MFR of 2 to 45 g/10 min at 240° C., in light of moldability and processability of the multilayer body.

In addition, layer C of the oxygen-absorbing multilayer body of the embodiment may contain a variety of additives known in the art, in addition to the above-mentioned thermoplastic resin. Examples of such an arbitrary component may include, but are not limited to, desiccants, color pigments such as titanium oxide, dyes, antioxidants, slipping agents, antistatic agents, plasticizers, stabilizers, additives such as lubricants, fillers such as calcium carbonate, clay, mica, and silica, and deodorants. In particular, in the viewpoint of recycling and reprocessing offcuts generated during production, it is preferable to add an antioxidant to layer C.

The content proportion of the thermoplastic resin in layer C can be appropriately determined and is not specifically limited, and is preferably 70% to 100% by mass, more preferably 80% to 100% by mass, and most preferably 90% to 100% by mass, based on the total amount of layer C. The thermoplastic resin used in layer C of the embodiment preferably contains another thermoplastic resin in an amount of 50% to 100% by mass, more preferably 70% to 100% by mass, and most preferably 90% to 100% by mass, based on the total amount.

[Oxygen-Absorbing Layer (Layer A)]

The oxygen-absorbing layer (layer A) of the oxygen-absorbing multilayer body of the embodiment contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Gas Barrier Layer (Layer D)]

The gas barrier layer (layer D) of the oxygen-absorbing multilayer body of the embodiment contains a gas barrier material. Layer D preferably has an oxygen transmission rate of 100 mL/(m$^2$·day·atm) or less, more preferably 80 mL/(m$^2$·day·atm) or less, and most preferably 50 mL/(m$^2$·day·atm) or less, when measured for a film having a thickness of 20 μm under conditions of a temperature of 23° C. and a relative humidity of 60%.

The gas barrier material used in layer D of the oxygen-absorbing multilayer body of the embodiment can be a gas barrier thermoplastic resin, a gas barrier thermosetting resin, a vapor deposition film of, for example, silica, alumina, or aluminum, or metal foil such as aluminum foil. The gas barrier thermoplastic resin can be, for example, an ethylene-vinyl alcohol copolymer, MXD6, or poly(vinylidene chloride). The gas barrier thermosetting resin can be a gas barrier epoxy resin and may be a commercially available one, such as "MAXIVE" manufactured by Mitsubishi Gas Chemical Company, Inc.

In a case of using a thermoplastic resin as the gas barrier material, the gas barrier layer (layer D) preferably has a thickness of 5 to 200 μm and more preferably 10 to 100 μm. In a case of using a thermosetting resin, such as an amine-epoxy hardening agent, as the gas barrier material or the gas barrier adhesive layer, layer D preferably has a thickness of 0.1 to 100 μm and more preferably 0.5 to 20 μm. A thickness within such a preferable range tends to further enhance the gas barrier property and also can maintain the processability and profitability at high levels, compared to the case of a thickness outside the range.

[Other Layer]

The oxygen-absorbing multilayer body of the embodiment may further include an arbitrary layer depending on, for example, the desired performance, in addition to the oxygen-absorbing layer (layer A), the sealant layer (layer C), and the gas barrier layer (layer D). Examples of such an arbitrary layer may include adhesive layers. As these layers, the layers described in the paragraph "other layer" of the first embodiment can be appropriately used, unless specifically indicated otherwise.

For example, from the viewpoint of further increasing the interlayer adhesion strength between adjacent two layers, an adhesive layer (layer AD) is preferably disposed between the two layers. The adhesive layer preferably contains a thermoplastic resin having adhesiveness. Examples of the thermoplastic resin having adhesiveness may include acid-modified polyolefin resins obtained by modifying polyolefin-based resins, such as polyethylene and polypropylene, with unsaturated carboxylic acids, such as acrylic acid, methacrylic acid, maleic acid, maleic anhydride, fumaric acid, and itaconic acid; and polyester-based thermoplastic elastomers mainly composed of polyester-based block copolymers. In addition, from the viewpoint of enhancing the adhesiveness to the above-described sealant layer (layer C), preferred is a resin prepared by modifying a resin of the same type as the thermoplastic resin used in layer C. The adhesive layer may have any thickness, but from the viewpoint of securing molding processability while maintaining the practical adhesion strength, the thickness is preferably 2 to 100 µm, more preferably 5 to 90 µm, and most preferably 10 to 80 µm.

Furthermore, when the oxygen-absorbing multilayer body of the embodiment is used as, for example, a container described below, in order to allow easy opening of the oxygen-absorbing container, the container may include an easy-peel layer or an easy-tear layer. As the easy-peel layer, for example, a film having a sealing strength and a peeling strength controlled by blending two or more different polyolefins is commonly known. As the easy-tear layer, for example, an easily tearable film composed of nylon 6 and nylon MXD6 is commonly known.

The oxygen-absorbing multilayer body of the embodiment can be produced by a known method, such as a coextrusion process or a variety of laminating or coating processes, depending on the properties of raw materials, processing purposes, processing steps, and other factors. The production process is not specifically limited. The method for producing the multilayer body is the same as that described in the first embodiment, and duplicated description is omitted.

[Oxygen-Absorbing Container]

In the oxygen-absorbing container of the embodiment, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing container of the embodiment are the same as those described in the first embodiment, and duplicated description is omitted.

[Oxygen-Absorbing Paper Container]

The oxygen-absorbing paper container of the embodiment is a paper container prepared by molding an oxygen-absorbing multilayer body composed of at least four layers including the oxygen-absorbing multilayer body and further a paper base layer laminated to the gas barrier layer side of the oxygen-absorbing multilayer body (hereinafter, also simply referred to as "paper base layer-including oxygen-absorbing multilayer body"). More specifically, the oxygen-absorbing multilayer body for constituting the paper container includes at least four layers including a sealant layer (layer C) containing a thermoplastic resin, an oxygen-absorbing layer (layer A) of the above-described oxygen-absorbing composition, a gas barrier layer (layer D) containing a gas barrier material, and a paper base layer (layer E) in this order. An example of such an oxygen-absorbing multilayer body may be a laminate of at least four layers including a sealant layer (layer C) containing a thermoplastic resin, an oxygen-absorbing layer (layer A) of an oxygen-absorbing composition, a gas barrier layer (layer D) containing a gas barrier material, and an a paper base layer (layer E) in this order. In addition, the paper base layer-including oxygen-absorbing multilayer body of the embodiment may optionally include a layer other than these four layers at any position.

The oxygen-absorbing paper container of the embodiment includes the paper base layer-including oxygen-absorbing multilayer body in a part or the entire of the packaging container for sealing such that layer C is at the inner side and absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The oxygen-absorbing paper container of the embodiment includes the above-described paper base layer-including oxygen-absorbing multilayer body in a part or the entire of the components of the container. A paper container entirely composed of the paper base layer-including oxygen-absorbing multilayer body refers to a paper container constituted of only the paper base layer-including oxygen-absorbing multilayer body. A paper container partially composed of the paper base layer-including oxygen-absorbing multilayer body refers to a paper container a part of which is constituted of the paper base layer-including oxygen-absorbing multilayer body and the other part of which is constituted of other component(s). Examples of the latter may include a paper container partially constituted of a transparent material (e.g., a material prepared by removing the paper base from the paper base layer-including oxygen-absorbing multilayer body), in order to observe the contents (article to be stored) accommodated in the container from the outside.

The usage and the shape of the oxygen-absorbing paper container of the embodiment are not specifically limited and can be appropriately determined depending on the articles to be stored and stored. Examples of the shape of the oxygen-absorbing paper container of the embodiment may include gable-top type, brick type, and flat top type shapes.

[Paper Base Layer (Layer E)]

In the oxygen-absorbing paper container of the embodiment, the paper base layer (layer E) is a base material constituting a container and preferably has, for example, excellent shaping property, bending resistance, rigidity, elasticity, and strength. The paper base material included in layer E can be, for example, a bleached or unbleached paper base material extremely stable in size, pure white roll paper, craft paper, cardboard, processed paper, or another paper material. The basis weight of layer E can be appropriately determined and is not specifically limited. The basis weight is preferably within a range of about 80 to 600 $g/m^2$ and more preferably 100 to 450 g/m². In the embodiment, for example, the paper base layer may have a desired print pattern, such as a letter, a figure, a picture, or a symbol, arbitrarily printed thereon by a common printing system.

In the use of the oxygen-absorbing multilayer body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The oxygen-absorbing multilayer body of the embodiment does not require water in oxygen absorption, in other words, the multilayer body can absorb oxygen regardless of the presence or absence of water in the article to be stored and can, therefore, be applied to a wide variety of uses regardless of the type of the article to be stored. The details of the article to be stored and the sterilization treatment are the same as those in the first embodiment, and duplicated description is omitted.

<Fourth Embodiment>
[Oxygen-Absorbing Multilayer Injection-Molded Product]

The oxygen-absorbing multilayer injection-molded product of the embodiment includes an oxygen-absorbing layer containing an oxygen-absorbing composition and a thermoplastic resin layer containing a thermoplastic resin (b), where the oxygen-absorbing composition contains at least one compound having a tetralin ring represented by Formula (1), a transition metal catalyst, and a thermoplastic resin (a). Accordingly, the oxygen-absorbing multilayer injection-molded product of the embodiment is the same as that in the first embodiment except that the oxygen-absorbing multilayer body is an oxygen-absorbing multilayer injection-molded product.

The oxygen-absorbing multilayer injection-molded product of the embodiment can be used as, for example, a container for storing contents (article to be stored). In this case, the multilayer injection-molded product absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The oxygen-absorbing multilayer injection-molded product of the embodiment may have any layer structure, and the number and the types of the oxygen-absorbing layer (layer A) and the resin layer (layer B) are not specifically limited. For example, the oxygen-absorbing multilayer injection-molded product may be composed of one layer of layer A and one layer of layer B to form a structure of A/B or may be composed of one layer of layer A and two layers of layer B to form a three-layer structure of B/A/B. Alternatively, the multilayer injection-molded product may be composed of one layer of layer A, two layers of layer B1, and two layers of layer B2 to form a five-layer structure of B1/B2/A/B2/B1 or may be composed of one layer of layer A, layer B1, and layer B2 to form a three-layer structure of B1/A/B2 composed of two-material two-layer. The oxygen-absorbing multilayer injection-molded product of the embodiment can optionally include an arbitrary layer, such as an adhesive layer (layer AD), to form, for example, a seven-layer structure of B1/AD/B2/A/B2/AD/B1.

[Oxygen-Absorbing Layer (Layer A)]

The oxygen-absorbing layer (layer A) of the oxygen-absorbing multilayer injection-molded product of the embodiment is a layer containing at least one compound having a tetralin ring represented by Formula (1), such as one described above, a transition metal catalyst, and an oxygen-absorbing composition containing a thermoplastic resin (a).

<Compound Having a Tetralin Ring>

The compound having a tetralin ring described in the first embodiment can be appropriately used.

<Transition Metal Catalyst>

The transition metal catalyst described in the first embodiment can be appropriately used.

<Thermoplastic Resin (a)>

The thermoplastic resin (a) described in the first embodiment can be appropriately used.

[Thermoplastic Resin Layer (Layer B)]

The thermoplastic resin (b) described in the first embodiment can be appropriately used.

[Other Layer]

The oxygen-absorbing multilayer injection-molded product of the embodiment may further include an arbitrary layer, in addition to the above-described oxygen-absorbing layer (layer A) and the resin layer (layer B), depending on desired performance and other factors. Examples of such an arbitrary layer may include adhesive layers.

For example, from the viewpoint of further increasing the interlayer adhesion strength between adjacent two layers, an adhesive layer (layer AD) is preferably disposed between the two layers. The adhesive layer preferably contains a thermoplastic resin having adhesiveness. Examples of the thermoplastic resin having adhesiveness may include acid-modified polyolefin resins obtained by modifying polyolefin-based resins, such as polyethylene and polypropylene, with unsaturated carboxylic acids, such as acrylic acid, methacrylic acid, maleic acid, maleic anhydride, fumaric acid, and itaconic acid; and polyester-based thermoplastic elastomers mainly composed of polyester-based block copolymers. In addition, from the viewpoint of enhancing the adhesiveness to the above-described resin layer (layer B), preferred is a resin prepared by modifying a resin of the same type as the thermoplastic resin used in layer B. The adhesive layer may have any thickness, but from the viewpoint of securing molding processability while maintaining practical adhesion strength, the thickness is preferably 2 to 100 μm, more preferably 5 to 90 μm, and most preferably 10 to 80 μm.

[Production Process and Other Items]

The oxygen-absorbing multilayer injection-molded product of the embodiment can be produced by a known method depending on, for example, the properties of each material and the desired shapes, and the method is not specifically limited. The multilayer injection-molded product can be produced by a variety of types of injection molding processes.

For example, a multilayer injection-molded product having a two-layer structure of A/B having a shape along the shape of the cavity of an injection mold can be produced with a molding apparatus equipped with two or more extruders and dies by injecting a material for forming layer A and a material for forming layer B into the cavity from the respective injection cylinders through a mold hot runner. A multilayer injection-molded product having a three-layer structure of B/A/B can be produced by first injecting a material for forming layer B from an injection cylinder, subsequently injecting a material for forming layer A from another injection cylinder simultaneously with the material for forming layer B, and then injecting the material for forming layer B in an amount necessary for filling the cavity.

A multilayer injection-molded product having a five-layer structure of B/A/B/A/B can be produced by first injecting a material for forming layer B, subsequently injecting a material for forming layer A alone, and lastly injecting the material for forming layer B in an amount necessary for filling the cavity. A multilayer injection-molded product having a five-layer structure of B1/B2/A/B2/B1 can be produced by first injecting a material for forming layer B1 from an injection cylinder, subsequently injecting a material for forming layer B2 from another injection cylinder, simultaneously with the material for forming layer B1, then injecting a material for forming layer A, simultaneously with the materials for forming layer B1 and layer B2, and then injecting the material for forming layer B1 in an amount necessary for filling the cavity.

The shape of the oxygen-absorbing multilayer injection-molded product of the embodiment may be appropriately determined depending on the usage and is not specifically limited. In a case of injection molding using a mold as described above, an arbitrary shape along the shape of the cavity of the mold can be formed.

The oxygen-absorbing multilayer injection-molded product of the embodiment may have any thickness without specific limitation and is preferably 3 to 5000 μm, more preferably 5 to 4500 μm, and most preferably 10 to 4000 μm, from the viewpoint of enhancing the oxygen-absorbing performance and securing various physical properties, such as flexibility, required in the injection molded product.

The oxygen-absorbing multilayer injection-molded product of the embodiment used in a part of the components of a container for sealing absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen. On this occasion, the injection molded product of the embodiment itself may be molded into the shape of a container. Considering that the oxygen-absorbing multilayer injection-molded product of the embodiment expresses oxygen-absorbing performance, preferred is a storage container, such as a cup-shaped container (injection cup) or a bottle-shaped container.

Alternatively, the oxygen-absorbing multilayer injection-molded product of the embodiment can be further fabricated into an oxygen-absorbing multilayer container by secondary processing. For example, in a case of secondary processing into a container such as a PET bottle, the oxygen-absorbing multilayer injection-molded product of the embodiment is preferably a test tube-like preform (parison). The container prepared by secondary processing of the oxygen-absorbing multilayer injection-molded product of the embodiment can absorb oxygen inside the container and can also absorb oxygen from the outside of the container, if oxygen passes through or penetrates the wall of the container, even if the amount of the oxygen is small, and can thereby prevent the contents (article to be stored) from, for example, being deteriorated by oxygen. The shape of the container after secondary processing is, for example, a cup or a bottle.

A preferred method of secondary processing of the oxygen-absorbing multilayer injection-molded product of the embodiment is, for example, blow molding, but the method is not specifically limited, and a known molding method can be used. The blow molding may be, for example, stretching blow molding.

For example, in injection blow molding, a test tube-like preform (parison) is first formed as the oxygen-absorbing multilayer injection-molded product of the embodiment, and the mouth part of the heated preform is then fixed with a jig to fit the preform into a final-shape mold. Subsequently, air is fed from the mouth part to inflate the preform such that the preform comes into close contact with the mold. The preform is cooled and solidified to mold a bottle.

For example, in injection stretching blow molding, a test tube-like preform (parison) is first formed as the oxygen-absorbing multilayer injection-molded product of the embodiment, and the mouth part of the heated preform is then fixed with a jig to fit the preform into a final-shape mold. Subsequently, air is fed from the mouth part while stretching the preform with a stretching rod to stretch the preform by blow-molding such that the preform comes into close contact with the mold. The preform is cooled and solidified to mold a bottle.

Here, in general, the injection stretching blow molding is roughly divided into a hot parison system and a cold parison system. The former performs blow molding in a softening state without completely cooling the preform, whereas the latter forms a bottomed preform having a size considerably smaller than the size of the final shape and being in a supercooled state giving an amorphous resin, preheats the preform to the elongation temperature, and simultaneously performs tensile-stretching in the axial direction in a final-shape mold and blow-stretching in the circumferential direction. Consequently, the latter is suitable for mass production. In both systems, the preform is heated to an elongation temperature higher than the glass transition temperature (Tg) and is stretched in a final-shape mold heated to heat treatment (heat set) temperature with a stretching rod in the machine direction and with blow air in the transverse direction. Here, the stretching ratio of the final blow molded product is not specifically limited and is preferably 1.2 to 6 times in the machine direction and 1.2 to 4.5 times in the transverse direction.

In a general method of injection blow molding, the final-shape mold is heated to a temperature for facilitating crystallization of a resin, for example, 120° C. to 230° C., preferably 130° C. to 210° C., for a PET resin. In the subsequent blowing, heat treatment is performed by bringing the outer surface of the wall of the molded product into contact with the inner surface of the mold for a predetermined time. After the heat treatment for a predetermined time, the inner layer is cooled by switching the fluid for blowing to a fluid for cooling the inside. The heat treatment time on this occasion varies depending on the thickness and temperature of the blow molded product and is usually 1.5 to 30 sec, preferably 2 to 20 sec, in a PET resin. The cooling time also varies depending on the heat treatment temperature and the type of the fluid for cooling and is usually 0.1 to 30 sec, preferably 0.2 to 20 sec. This heat treatment crystallizes each part of the molded product.

Here, the fluid for cooling that can be used is, for example, air of normal temperature, a cooled gas, such as nitrogen, air, or carbon dioxide of −40° C. to +10° C., a chemically inert liquefied gas, such as liquid nitrogen, liquefied carbon dioxide, liquid trichlorofluoromethane, or liquid dichlorodifluoromethane, or other liquid aliphatic hydrocarbon. This fluid for cooling may be used together with liquid mist having a large vaporization heat, such as water. The use of such fluid for cooling can provide a cooling temperature at a significantly high degree. In the stretching blow molding, two molds may be used. After heat treatment with a first mold within predetermined ranges of temperature and time, the blow molded product is transferred to a second mold for cooling and is cooled while being blown again. The outer layer of the blow molded product taken out from the mold can be cooled by natural cooling or blowing with cold blast.

Another example of blow molding is two-step blow molding by processing a preform into a primary blow molded product having a size larger than that of a final blow molded product with a primary stretching blow mold, subsequently heat contracting this primary blow molded product, and performing stretching blow molding with a secondary mold into a final blow molded product. In this blow molding, the bottom of the blow molded product is sufficiently stretched and thinned to give a blow molded product having less deformation of the bottom during hot filling or heat sterilization and having excellent shock resistance.

The oxygen-absorbing multilayer injection-molded product of the embodiment and a container produced by secondary processing thereof may be coated with, for example, a vapor deposition film of an inorganic material or inorganic oxide or an amorphous carbon film.

Examples of the inorganic material or inorganic oxide of the vapor deposition film may include, but are not limited to, aluminum, alumina, and silicon oxide. The coating with the vapor deposition film of an inorganic material or inorganic oxide can prevent a low-molecular-weight organic compound from liquating out from the oxygen-absorbing multilayer injection-molded product of the embodiment and the container produced by secondary processing of the multilayer injection-molded product. Examples of the method that can be employed for molding a vapor deposition film may include, but are not limited to, physical vapor deposition, such as vacuum vapor deposition, sputtering, and ion plating; and chemical vapor deposition, such as PECVD, and various known methods. The thickness of the vapor deposition film is not specifically limited and is preferably 5 to 500 nm, more preferably 5 to 200 nm, from the viewpoint of, for example, the gas barrier property, light shielding property, and bending resistance.

The amorphous carbon film is known as a diamond-like carbon film and is a hard carbon film also referred to as a carbon film or amorphous hydrogenated carbon film. For example, this amorphous carbon film can be formed by a method, including, but not limited to, a method involving vacuuming the inside of a hollow molded product by exhaustion, supplying a carbon source gas to the inside, and supplying energy for plasma generation thereto to generate plasma of the carbon source gas. Thus, an amorphous carbon film can be formed on the inner surface of the container. The coating with an amorphous carbon film not only can significantly reduce the oxygen permeability of low-molecular-weight inorganic gas, such as oxygen and carbon dioxide, but also can suppress adsorption of various low-molecular-weight organic compounds having odors to the oxygen-absorbing multilayer injection-molded product. The thickness of the amorphous carbon film is not specifically limited and is preferably 50 to 5000 nm from the viewpoint of the effect of suppressing adsorption of low-molecular-weight organic compounds, the effect of enhancing the gas barrier property, close adhesion to plastics, durability, and transparency.

In the use of the oxygen-absorbing multilayer injection-molded product of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The oxygen-absorbing multilayer injection-molded product of the embodiment does not require water in oxygen absorption, in other words, the multilayer injection-molded product can absorb oxygen regardless of the presence or absence of water in the article to be stored and can, therefore, be applied to a wide variety of uses regardless of the type of the article to be stored. The details of the article to be stored and the sterilization treatment are the same as those in the first embodiment, and duplicated description is omitted.

<Fifth Embodiment>

The oxygen-absorbing PTP packaging material of the embodiment includes an oxygen-absorbing bottom member prepared by molding an oxygen-absorbing multilayer body and a gas barrier lid member composed of at least two layers including an inner layer containing a thermoplastic resin (d) and a gas barrier layer containing a gas barrier material in this order, and is an oxygen-absorbing PTP packaging body formed by joining the thermoplastic resin layer of the oxygen-absorbing bottom member to the inner layer of the gas barrier lid member. An example of such an oxygen-absorbing PTP packaging body may be composed of an oxygen-absorbing bottom member prepared by molding the oxygen-absorbing multilayer body, an inner layer containing a thermoplastic resin (d), and a gas barrier layer containing a gas barrier material laminated in this order. The PTP (press-through package) packaging body is also referred to as blister package.

[Oxygen-Absorbing Multilayer Body]

The oxygen-absorbing multilayer body includes an oxygen-absorbing layer (layer A) containing an oxygen-absorbing composition and a thermoplastic resin layer (layer B) containing a thermoplastic resin (b). The oxygen-absorbing composition contains at least one compound having a tetralin ring represented by Formula (1), a transition metal catalyst, and a thermoplastic resin (a). Accordingly, the oxygen-absorbing PTP packaging body of the embodiment includes a gas barrier lid member in the first embodiment at least including an inner layer containing a thermoplastic resin (d) and a gas barrier layer containing a gas barrier material in this order, where the thermoplastic resin layer of the oxygen-absorbing bottom member and the inner layer of the gas barrier lid member are joined to each other. An example of such an oxygen-absorbing PTP packaging body includes an inner layer containing a thermoplastic resin (d) and a gas barrier layer containing a gas barrier material laminated in this order.

The oxygen-absorbing multilayer body of the embodiment may have any layer structure, and the number and the types of the oxygen-absorbing layer (layer A) and the thermoplastic resin layer (layer B) are not particularly limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body of the embodiment contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Thermoplastic Resin Layer (Layer B)]

The thermoplastic resin layer (layer B) described in the first embodiment can be appropriately used, unless specifically indicated otherwise.

[Other Layer]

The oxygen-absorbing multilayer body of the embodiment may further include an arbitrary layer, in addition to the above-described oxygen-absorbing layer (layer A) and the resin layer (layer B), depending on desired performance and other factors. Examples of such an arbitrary layer may include gas barrier layers and adhesive layers. As these layers, the layers described as "other layer" in the first embodiment can be appropriately used, unless specifically indicated otherwise.

<Gas Barrier Layer (Layer D)>

The oxygen-absorbing multilayer body of the embodiment preferably includes a gas barrier layer containing a gas barrier material (layer D), from the viewpoint of further enhancing the oxygen barrier property. A gas barrier layer (layer D) disposed on the outer side of the oxygen-absorbing layer (layer A) can reduce the amount of oxygen from the outside of the container due to permeation or penetration of the oxygen through the wall of the container. In addition, a gas barrier layer (layer D) disposed on the inner side of the oxygen-absorbing layer (layer A) can further reduce the amount of oxygen from the outside of the container due to permeation or penetration of the oxygen through the wall of the container and can also maintain the oxygen-absorbing performance of layer A for a long time.

Layer D preferably has an oxygen transmission rate of 100 mL/(m$^2$·day·atm) or less, more preferably 80 mL/(m$^2$·day·atm) or less, and most preferably 50 mL/(m$^2$·day·atm) or less, when measured for a film having a thickness of 20 μm under conditions of a temperature of 23° C. and a relative humidity of 60%.

The gas barrier material used in layer D of the oxygen-absorbing multilayer body of the embodiment can be a gas barrier thermoplastic resin, a gas barrier thermosetting resin, a vapor deposition film of, for example, silica, alumina, or aluminum, or metal foil such as aluminum foil. The gas barrier thermoplastic resin can be, for example, an ethylene-vinyl alcohol copolymer, MXD6, or poly(vinylidene chloride). The gas barrier thermosetting resin can be a gas barrier epoxy resin and may be a commercially available one, such as "MAXIVE", manufactured by Mitsubishi Gas Chemical Company, Inc.

In a case of using a thermoplastic resin as the gas barrier material, the gas barrier layer (layer D) preferably has a thickness of 5 to 200 μm and more preferably 10 to 100 μm. In a case of using a thermosetting resin, such as an amine-epoxy hardening agent, as the gas barrier material or the gas barrier adhesive layer, layer D preferably has a thickness of 0.1 to 100 μm and more preferably 0.5 to 20 μm. A thickness within such a preferable range tends to further enhance the gas barrier property and also can maintain the processability and profitability at high levels, compared to the case of a thickness outside the range.

In addition, from the viewpoint of further increasing the interlayer adhesion strength between adjacent two layers, an adhesive layer (layer AD) is preferably disposed between the two layers. The adhesive layer preferably contains a thermoplastic resin having adhesiveness. Examples of the thermoplastic resin having adhesiveness may include acid-modified polyolefin resins obtained by modifying polyolefin-based resins, such as polyethylene or polypropylene, with unsaturated carboxylic acids, such as acrylic acid, methacrylic acid, maleic acid, maleic anhydride, fumaric acid, or itaconic acid; and polyester-based thermoplastic elastomers mainly composed of polyester-based block copolymers. In addition, from the viewpoint of enhancing the adhesiveness to the above-described resin layer (layer B), preferred is a resin prepared by modifying a resin of the same type as the thermoplastic resin used in layer B. The adhesive layer may have any thickness, but from the viewpoint of securing molding processability while maintaining practical adhesion strength, the thickness is preferably 2 to 100 μm, more preferably 5 to 90 μm, and most preferably 10 to 80 μm.

Furthermore, when the oxygen-absorbing multilayer body of the embodiment is used as, for example, a container described below, in order to allow easy opening of the oxygen-absorbing container, the container may include an easy-peel layer or an easy-tear layer. A commonly known easy-peel layer is, for example, a film having a sealing strength and a peeling strength controlled by blending two or more different polyolefins. A commonly known easy-tear layer is, for example, an easily tearable film composed of nylon 6 and nylon MXD6.

The oxygen-absorbing multilayer body of the embodiment can be produced by a known method, such as a coextrusion process or a variety of laminating or coating processes, depending on the properties of raw materials, processing purposes, processing steps, and other factors. The production process is not specifically limited. The method for producing the multilayer body is the same as that described in the first embodiment, and duplicated description is omitted.

[Oxygen-Absorbing Bottom Member]

The oxygen-absorbing bottom member can be obtained by molding the above-described oxygen-absorbing multilayer body. The oxygen-absorbing bottom member may have any shape. A container having an arbitrary shape can be thermoformed depending on the article to be stored and stored.

More specifically, the film-form or sheet-form oxygen-absorbing multilayer body is molded by a method, such as vacuum molding, pressure molding, or plug assist molding, to produce an oxygen-absorbing bottom member having a space for accommodating an article to be stored, such as a tablet.

In a case of producing an oxygen-absorbing bottom member having a flange portion, a special machining for imparting an easy-peel function to the flange portion may be carried out. Furthermore, an oxygen-absorbing function can be provided to such a container by using the above-described oxygen-absorbing multilayer body in a member, such as a lid member or a top seal of the container.

[Gas Barrier Lid Member]

The gas barrier lid member is composed of at least two layers including an inner layer containing a thermoplastic resin and a gas barrier layer containing a gas barrier material in this order, and can reduce the amount of oxygen in the oxygen-absorbing PTP packaging body due to permeation or penetration of the oxygen from the outside through the gas barrier lid member. Such an oxygen-absorbing PTP packaging body may be a laminate of, for example, an inner layer containing a thermoplastic resin and a gas barrier layer containing a gas barrier material laminated in this order. Furthermore, the gas barrier molded article of the embodiment may optionally include a layer other than these two layers at any position. In particular, the lid member can also be imparted with an oxygen-absorbing function by disposing the above-described oxygen-absorbing layer (layer A) between these two layers. As this oxygen-absorbing layer, for example, the layer described in the first embodiment can also be appropriately used.

The thermoplastic resin used in the inner layer of the gas barrier lid member is not specifically limited, and examples thereof may include those exemplified as thermoplastic resins that can be suitably used in the above-described thermoplastic resin layer of the oxygen-absorbing multilayer body.

The inner layer of the gas barrier lid member may contain a variety of additives known in the art, in addition to the above-mentioned thermoplastic resin. Examples of the additives may also include those exemplified as additives that can be suitably used in the above-described thermoplastic resin layer of the oxygen-absorbing multilayer body.

The content proportion of the thermoplastic resin in the inner layer can be appropriately determined and is not specifically limited, and is preferably 70% to 100% by mass, more preferably 80% to 100% by mass, and most preferably 90% to 100% by mass, based on the total amount of the inner layer. The thickness of the inner layer can be appropriately determined depending on the use and the desired performance and is not specifically limited, and is preferably 1 to 50 μm and more preferably 5 to 20 μm.

The thermoplastic resin used in the inner layer of the gas barrier lid member is preferably a resin of the same type as the thermoplastic resin used in the thermoplastic resin layer of the oxygen-absorbing multilayer body, from the viewpoint of securing the heat sealing strength of the oxygen-absorbing PTP packaging body.

The gas barrier layer of the gas barrier lid member contains a gas barrier material. The gas barrier layer has an oxygen transmission rate of 100 mL/(m$^2$·day·atm) or less, more preferably 80 mL/(m$^2$·day·atm) or less, and most preferably 50 mL/(m$^2$·day·atm) or less, when measured for a film having a thickness of 20 μm under conditions of a temperature of 23° C. and a relative humidity of 60%.

Examples of the gas barrier material used in the gas barrier layer of the gas barrier lid member may include those exemplified as the gas barrier material that can be suitably used in the above-described gas barrier layer (layer D) of the oxygen-absorbing multilayer body. In particular, in the oxygen-absorbing PTP packaging body, since the article stored is taken out by squeezing, aluminum foil is most preferable. The gas barrier layer of the gas barrier lid member preferably has a thickness of 1 to 100 μm and more preferably 5 to 20 μm.

[Oxygen-Absorbing PTP Packaging Body]

The oxygen-absorbing PTP packaging body of the embodiment absorbs oxygen inside the container and also absorbs oxygen from the outside of the container, if oxygen penetrates into the container, even if the amount of the oxygen is small, and can thereby prevent the contents (article to be stored) from, for example, being deteriorated by oxygen.

In the use of the oxygen-absorbing multilayer body and the oxygen-absorbing PTP packaging body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The containers and the articles to be stored can be sterilized by a method suitable for the articles before and after storing (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with a gas such as ethylene oxide, and sterilization with a chemical agent such as hydrogen peroxide or hypochlorous acid.

[Article to be Stored]

The article that is stored in the oxygen-absorbing PTP packaging body of the embodiment is not specifically limited. The packaging body can store, for example, health foods, such as vitamin C and vitamin E; and a variety of medicinal products, such as oral tablets and orally disintegrating tablets (OD tablets).

Furthermore, the embodiment can also provide a method for storing any one selected from the group consisting of cooked rice, an alcoholic beverage, fruit juice and/or vegetable juice, and a drug solution in an oxygen-absorbing container including the above-described oxygen-absorbing multilayer body. The method will now be described by some embodiments.

<Sixth Embodiment>

This embodiment relates to a method for storing cooked rice in an oxygen-absorbing container including the above-described oxygen-absorbing multilayer body.

[Cooked Rice]

The cooked rice in the embodiment is, for example, sterilized cooked rice cooked in a sterile environment or sterilized cooked rice cooked by filling an oxygen-absorbing container with rice and water, sealing the container, and heating rice cooking with an autoclave pot. In order to maintain the flavor, cooked rice cooked at a heating temperature of 110° C. or less is packed in the oxygen-absorbing container of the present invention, and the container is hermetically closed. The oxygen concentration inside the container may be reduced by purging the inside of the container with an inert gas, such as nitrogen gas or carbon dioxide, during the packing.

[Oxygen-Absorbing Multilayer Body]

The oxygen-absorbing multilayer body includes an oxygen-absorbing layer (layer A) containing an oxygen-absorbing composition and a thermoplastic resin layer (layer B) containing a thermoplastic resin (b), where the oxygen-absorbing multilayer body may include the oxygen-absorbing composition containing at least one compound having a tetralin ring represented by Formula (1), a transition metal catalyst, and a thermoplastic resin (a).

The oxygen-absorbing multilayer body may have any layer structure, and the number and the types of the oxygen-absorbing layer (layer A) and the thermoplastic resin layer (layer B) are not specifically limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Thermoplastic Resin Layer (Layer B)]

The thermoplastic resin layer (layer B) described in the first embodiment can be appropriately used, unless specifically indicated otherwise.

[Other Layer]

The oxygen-absorbing multilayer body of the embodiment may further include an arbitrary layer, in addition to the above-described oxygen-absorbing layer (layer A) and the resin layer (layer B), depending on desired performance and other factors. Examples of such an arbitrary layer may include adhesive layers, metal foil, metal vapor deposition layers, and organic-inorganic films. As these layers, the layers described as "other layer" in the first embodiment can be appropriately used, unless specifically indicated otherwise.

[Oxygen-Absorbing Container]

In the oxygen-absorbing container of the embodiment, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing container of the embodiment are the same as those described in the first embodiment, and duplicated description is omitted.

In the use of the oxygen-absorbing multilayer body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The containers and the articles to be stored can be sterilized by a method suitable for the articles before and after filling (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with gas such as ethylene oxide, and sterilization with a chemical agent such as hydrogen peroxide or hypochlorous acid.

<Seventh Embodiment>

The embodiment relates to a method for storing an alcoholic beverage in an oxygen-absorbing container including the above-described oxygen-absorbing multilayer body.

[Alcoholic Beverage]

The alcoholic beverage of the embodiment may be any drink containing ethyl alcohol and may have any alcohol concentration. Examples of the alcoholic beverage may include low-alcohol beverages such as cocktails; distilled alcoholic beverages (whiskey, rum, cachaca, vodka, gin, tequila, brandy, raki, arrack, ouzo, white sake, distilled spirit (shochu), and millet brandy (awamori)); brewages (wine, beer, fruit wine, Shaoxing wine, and rice wine (Japanese sake)); mixed liquors (liqueur and seasoning liquor (mirin)); and beverages containing these alcoholic beverages.

An example of the oxygen-absorbing multilayer body that is used in the method for storing an alcoholic beverage of the embodiment will now be described.

[Oxygen-Absorbing Multilayer Body]

The oxygen-absorbing multilayer body of the embodiment includes an oxygen-absorbing layer (layer A) containing an oxygen-absorbing composition and a thermoplastic resin layer (layer B) containing a thermoplastic resin (b), where the oxygen-absorbing composition contains at least one compound having a tetralin ring represented by Formula (1), a transition metal catalyst, and a thermoplastic resin (a).

The oxygen-absorbing multilayer body of the embodiment may have any layer structure, and the number and the types of the oxygen-absorbing layer (layer A) and the thermoplastic resin layer (layer B) are not specifically limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body of the embodiment contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Thermoplastic Resin Layer (Layer B)]

The thermoplastic resin layer (layer B) described in the first embodiment can be appropriately used, unless specifically indicated otherwise.

[Other Layer]

The oxygen-absorbing multilayer body may further include an arbitrary layer, in addition to the above-described oxygen-absorbing layer (layer A) and the resin layer (layer B), depending on desired performance and other factors. Examples of such an arbitrary layer may include adhesive layers, metal foil, metal vapor deposition layers, and organic-inorganic films. As these layers, the layers described as "other layer" in the first embodiment can be appropriately used, unless specifically indicated otherwise.

[Oxygen-Absorbing Container]

In the oxygen-absorbing container of the embodiment, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing container of the embodiment are the same as those described in the first embodiment, and duplicated description is omitted.

In the use of the oxygen-absorbing multilayer body of the embodiment, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The containers and the articles to be stored can be sterilized by a method suitable for the articles before and after filling (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with gas such as ethylene oxide, and sterilization with a chemical agent such as hydrogen peroxide or hypochlorous acid.

<Eighth Embodiment>

The embodiment relates to a method for storing vegetables and/or vegetable juice in an oxygen-absorbing container including the above-described oxygen-absorbing multilayer body.

[Fruit Juice and/or Vegetable Juice]

The fruit juice and/or vegetable juice of the embodiment refers to a liquid prepared by mashing or squeezing fruit and/or vegetables as a raw material and may contain a solid of the raw material. The fruit and/or vegetables as a raw material are not specifically limited. Examples thereof may include fruit vegetables, such as orange, mandarin orange, apple, peach, pear, grape, blueberry, grapefruit, pineapple, *Citrus depressa*, guava, acerola, prune, papaya, mango, melon, kiwi fruit, candleberry, banana, *Citrus junos*, lemon, tomato, eggplant, pumpkin, green pepper, bitter gourd, Nabera, wax gourd, okra, green soybean, podded peas, green bean, fava bean, red pepper, corn, and cucumber; root vegetables, such as carrot, burdock, onion, bamboo shoot, lotus root, radish, Japanese radish, potato, sweet potato, taro, rakkyo, garlic, and ginger; and leaf vegetables, such as molokheiya, asparagus, celery, kale, qing-geng-cai, spinach, Chinese cabbage, cabbage, lettuce, Chinese cabbage, broccoli, cauliflower, Japanese hornwort, parsley, welsh onion, crown daisy, and Chinese chive. Fruit juice and/or vegetable juice prepared by applying heat treatment, such as boiling, baking, warming, or steaming, or a non-heat treatment, such as sufficient wash with water, immersion in water, or chemical treatment, before or after squeezing can be used as a raw material. In addition, fruit juice and/or vegetable juice prepared by removal of specific component(s) from fruit juice and/or vegetable juice by passing the fruit juice and/or vegetable juice through a specific resin can also be used as a raw material. Furthermore, these types of fruit juice and/or vegetable juice may be used alone or as a blend of two or more types thereof.

Regarding the flavor components of fruit juice and/or vegetable juice, for example, citrus fruit juice contains terpenes, such as d-limonene, γ-terpinene, myrcene, α-pinene, β-pinene, citronellol, or linalool; and aldehydes, such as n-octylaldehyde or n-decylaldehyde; apple juice contains esters, such as amyl butyrate or amyl acetate; and aldehydes, such as hexanal or trans-2-hexanal; grape juice contains esters, such as methyl anthranilate or ethyl crotonate; and terpenes, such as linalool or geraniol; and vegetable juice including tomato as a raw material contains terpenes, such as α-pinene, myrcene, or d-limonene; and aldehydes, such as hexanal or heptanal. These flavor components are oxidatively decomposed by oxygen to degrade the flavor and color tone.

In addition, the fruit juices and/or vegetable juices may contain sugars and sweeteners, such as sugar, glucose, fructose, fructose glucose liquid sugar syrup, glucose fructose liquid sugar syrup, high-fructose liquid sugar syrup, oligosaccharide, trehalose, xylitol, sucralose, stevia extract, sorbitol, sweetroot extract, and *Momordica grosvenori* extract; thickening stabilizers, such as pectin, gelatin, collagen, agar, carrageenan, sodium alginate, soybean polysaccharides, gum Arabic, guar gum, xanthan gum, Tamarindus seed gum, and gellan gum; acidulants, such as citric acid, malic acid, tartaric acid, lactic acid, and gluconic acid; antioxidants, such as L-ascorbic acid and sodium L-ascorbate; pH adjusters, such as sodium hydrogen carbonate; emulsifiers, such as glycerin fatty acid ester and sucrose fatty acid ester; nutritional enhancements, such as dietary fiber, calcium salt, magnesium salt, niacin, and pantothenic acid; spices such as turmeric; and flavoring agents.

[Oxygen-Absorbing Multilayer Body]

The oxygen-absorbing multilayer body includes an oxygen-absorbing layer (layer A) containing an oxygen-absorbing composition and a thermoplastic resin layer (layer B) containing a thermoplastic resin (b), where the oxygen-absorbing multilayer body may include the oxygen-absorbing composition containing at least one compound having a tetralin ring represented by Formula (1), a transition metal catalyst, and a thermoplastic resin (a).

The oxygen-absorbing multilayer body may have any layer structure, and the number and the types of the oxygen-absorbing layer (layer A) and the thermoplastic resin layer (layer B) are not specifically limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Thermoplastic Resin Layer (Layer B)]

The thermoplastic resin (layer B) described in the first embodiment can be appropriately used, unless specifically indicated otherwise.

[Other Layer]

The oxygen-absorbing multilayer body may further include an arbitrary layer, in addition to the above-described oxygen-absorbing layer (layer A) and the resin layer (layer B), depending on desired performance and other factors. Examples of such an arbitrary layer may include adhesive layers, metal foil, metal vapor deposition layers, and organic-inorganic films. As these layers, the layers described in the paragraph "other layer" of the first embodiment can be appropriately used, unless specifically indicated otherwise.

[Oxygen-Absorbing Container]

In the oxygen-absorbing container of the embodiment, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing container are the same as those described in the first embodiment, and duplicated description is omitted.

In the use of the oxygen-absorbing multilayer body, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The containers and the articles to be stored can be sterilized by a method suitable for the articles before and after filling (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with gas such as ethylene oxide, and sterilization with a chemical agent such as hydrogen peroxide or hypochlorous acid.

<Ninth Embodiment>

The embodiment relates to a method for storing a drug solution in an oxygen-absorbing container including the above-described oxygen-absorbing multilayer body.

[Drug Solution]

Examples of the drug solution in the embodiment may include glucose, amino acid, vitamins, dobutamine, morphine hydrochloride, insulin, epinephrine, and elcatonin; injection solutions of biopharmaceuticals, such as protein medicinal products and nucleic acid medicinal products; electrolytes, such as sorbitol-lactated Ringer's solution and maltose-lactated Ringer's solution; and eye drops containing various medicinal ingredients, such as vitamins, amino acids, dipotassium glycyrrhizinate, epsilon-aminocaproic acid, naphazoline hydrochloride, and tetrahydrozoline hydrochloride.

[Oxygen-Absorbing Multilayer Body]

The oxygen-absorbing multilayer body includes an oxygen-absorbing layer (layer A) containing an oxygen-absorbing composition and a thermoplastic resin layer (layer B) containing a thermoplastic resin (b), where the oxygen-absorbing composition contains at least one compound having a tetralin ring represented by Formula (1), a transition metal catalyst, and a thermoplastic resin (a).

The oxygen-absorbing multilayer body of the embodiment may have any layer structure, and the number and the types of the oxygen-absorbing layer (layer A) and the thermoplastic resin layer (layer B) are not specifically limited. The details of the layer structure are the same as those in the first embodiment, and duplicated description is omitted.

[Oxygen-Absorbing Layer (Layer A)]

The oxygen-absorbing layer (layer A) of the oxygen-absorbing multilayer body of the embodiment contains an oxygen-absorbing composition containing at least one compound having a tetralin ring represented by Formula (1), such as one described above, a transition metal catalyst, and a thermoplastic resin (a).

<Tetralin Compound>

The compound having a tetralin ring described in the first embodiment can be appropriately used, unless specifically indicated otherwise.

<Transition Metal Catalyst>

The transition metal catalyst described in the first embodiment can be appropriately used, unless specifically indicated otherwise.

<Thermoplastic Resin (a)>

The thermoplastic resin (a) described in the first embodiment can be appropriately used, unless specifically indicated otherwise.

[Thermoplastic Resin Layer (Layer B)]

The thermoplastic resin layer (layer B) of the first embodiment can be appropriately used, unless specifically indicated otherwise.

[Oxygen-Absorbing Container]

In the oxygen-absorbing container, the above-described oxygen-absorbing multilayer body is included in the entire or a part of the packaging container. The oxygen-absorbing container of the embodiment absorbs oxygen inside the container and also absorbs oxygen from the outside of the container, if oxygen passes through or penetrates the wall of the container, even if the amount of the oxygen is small, and can thereby prevent the contents (article to be stored) from, for example, being deteriorated by oxygen.

The shape and the usage of the oxygen-absorbing container are the same as those described in the first embodiment, and duplicated description is omitted.

In the use of the oxygen-absorbing multilayer body, energy ray irradiation can facilitate the initiation of an oxygen absorption reaction and can increase the oxygen-absorbing rate. Usable examples of the energy ray may include visible rays, UV rays, X-rays, electron rays, and γ rays. The amount of irradiation energy can be appropriately selected depending on the type of energy ray to be used.

The containers and the articles to be stored can be sterilized by a method suitable for the articles before and after filling (packaging) the articles. Examples of the sterilizing method may include treatment with hot water of 100° C. or less, treatment with pressurized hot water of 100° C. or more, heat sterilization such as ultra-high temperature treatment at 130° C. or more, sterilization with electromagnetic wave such as UV rays, micro waves, or gamma rays, treatment with gas such as ethylene oxide, and sterilization with a chemical agent such as hydrogen peroxide or hypochlorous acid.

EXAMPLES

The present invention will now be more specifically described by Examples and Comparative Examples, but is not limited to the following Examples. Incidentally, the NMR measurement was performed at room temperature unless specifically indicated otherwise.

First Experiment

Synthesis Example 1

Diester Compound A Having a Tetralin Ring

A reactor equipped with a thermometer, a partial condenser, a total condenser, and a stirrer was charged with 248 g (1.0 mol) of dimethyl 1,2,3,4-tetrahydronaphthalene-2,6-dicarboxylate, 409 g (4.0 mol) of n-hexyl alcohol, and 0.34 g of tetrabutyl titanate and was heated to 150° C. in a nitrogen atmosphere while removing the generated methanol to the outside of the reaction system to promote the reaction. After the completion of the generation of methanol, the reaction system was cooled to room temperature, and the unreacted n-hexyl alcohol was removed under reduced pressure to obtain diester compound A. The 3% weight-reduction temperature of the resulting compound was measured with a thermogravimetric/differential thermal analyzer (manufactured by Shimadzu Corporation, trade name "DTG-60"). The structural formula, molecular weight, and 3% weight-reduction temperature of the resulting compound are shown in Table 1. The results of NMR analysis were as follows.

$^1$H-NMR (400 MHz CDCl$_3$) δ 7.73-7.79 (2H m), 7.16 (1H d), 4.29 (2H t), 4.10 (2H t), 3.01-3.08 (2H m), 2.82-2.97 (2H m), 2.70-2.78 (1H m), 2.18-2.24 (1H m), 1.84-1.94 (1H m), 1.71-1.79 (2H m), 1.58-1.68 (2H m), 1.25-1.48 (12H m), 0.90 (6H t).

Synthesis Example 2

Diester Compound B Having a Tetralin Ring

Diester compound B was prepared by the same procedure as that in Synthesis Example 1 except that 521 g (4.0 mol) of n-octyl alcohol was used instead of n-hexyl alcohol and that the reaction temperature was 190° C. The structural formula of the resulting compound is shown in Table 1. The results of NMR analysis were as follows.

$^1$H-NMR (400 MHz CDCl$_3$) δ 7.68-7.74 (2H m), 7.10 (1H d), 4.23 (2H t), 4.04 (2H t), 2.92-3.00 (2H m), 2.72-2.89 (2H m), 2.63-2.70 (1H m), 2.10-2.18 (1H m), 1.76-1.85 (1H m), 1.63-1.72 (2H m), 1.50-1.59 (2H m), 1.09-1.40 (20H m), 0.90 (6H t).

Synthesis Example 3

Diester Compound C Having a Tetralin Ring

Diester compound C was prepared by the same procedure as that in Synthesis Example 2 except that dimethyl 1,2,3,4-tetrahydronaphthalene-1,8-dicarboxylate was used instead of dimethyl 1,2,3,4-tetrahydronaphthalene-2,6-dicarboxylate. The structural formula of the resulting compound is shown in Table 1. The results of NMR analysis were as follows.

$^1$H-NMR (400 MHz CDCl$_3$) δ 7.78 (1H d), 7.17-7.29 (2H m), 4.50 (1H t), 4.22 (2H t), 3.98-4.12 (2H m), 2.76-2.93 (2H m), 2.21-2.30 (1H m), 1.89-1.99 (1H m), 1.67-1.83 (4H m), 1.50-1.63 (3H m), 1.18-1.44 (19H m), 0.89 (6H t).

Synthesis Example 4

Diester Compound D Having a Tetralin Ring

A reactor equipped with a thermometer, a partial condenser, a total condenser, and a stirrer was charged with 108 g (0.62 mmol) of dimethyl adipate and 300 g (1.85 mmol) of 6-hydroxymethyl-1,2,3,4-tetrahydronaphthalene and was heated to 130° C. To the mixture added was 0.58 g of titanium tetrabutoxide. The temperature was raised to 200° C., and the reaction was performed while removing the generated methanol to the outside of the reaction system to promote the reaction. After the completion of the generation of methanol, the reaction system was cooled to room temperature. The unreacted 6-hydroxymethyl-1,2,3,4-tetrahydronaphthalene was removed under reduced pressure, and diester compound D was obtained by recrystallization. The structural formula of the resulting compound is shown in Table 1. The results of NMR analysis were as follows.

$^1$H-NMR (400 MHz CDCl$_3$) δ 7.00 (6H m), 5.02 (4H s), 2.70-2.79 (8H m), 2.34 (4H t), 1.74-1.83 (8H m), 1.64-1.70 (4H m).

Synthesis Example 5

Diamide Compound E Having a Tetralin Ring

A 2000-mL autoclave equipped with a thermometer and a stirrer was charged with 248 g (1.0 mol) of dimethyl 1,2,3,4-tetrahydronaphthalene-2,6-dicarboxylate and 607 g (6.0 mol) of n-hexylamine, was purged with nitrogen, was then heated to 220° C., and was stirred at this temperature for 5 hours. After cooling to room temperature, diamide compound E was obtained through filtration and recrystallization. The structural formula of the resulting compound is shown in Table 1. The results of NMR analysis were as follows.

$^1$H-NMR (400 MHz CDCl$_3$) δ 7.42 (1H s), 7.37 (1H d), 7.04 (1H d), 5.99 (1H m), 5.53 (1H m), 3.32-3.41 (2H m), 3.15-3.24 (2H m), 2.68-3.03 (4H m), 2.35-2.43 (1H m), 1.97-2.05 (1H m), 1.76-1.87 (1H m), 1.17-1.58 (12H m), 0.83 (6H t).

Synthesis Example 6

Acid Anhydride F Having a Tetralin Ring

An autoclave having an internal volume of 18 L was charged with 1.8 kg of 1,8-naphthalic anhydride, 300 g of a 5 wt % palladium on activated carbon catalyst (dried product), and 7.5 kg of ethyl acetate. The inside of the autoclave was purged with nitrogen of 1 MPa twice and then with hydrogen of 1 MPa twice at room temperature. Subsequently, the pressure was decreased to ordinary pressure, the internal temperature was increased to 80° C., the pressure was then increased to 5 MPa with hydrogen, and the mixture was stirred at 500 rpm for 2 hours at the same temperature and the same pressure. After the reaction, the autoclave was cooled to room temperature, and the hydrogen was released. After purge with nitrogen of 1 MPa twice, the catalyst was collected by filtration and was washed with 1.0 kg of acetone three times. The solvent in the resulting mother liquor was removed by an evaporator under reduced pressure to obtain a crude product. The resulting crude product was recrystallized to obtain acid anhydride F. The results of NMR analysis were as follows.

$^1$H-NMR (400 MHz CDCl$_3$) δ 7.98 (1H d), 7.47 (1H d), 7.38 (1H dd), 3.93 (1H t), 2.80-3.00 (2H m), 2.55-2.64 (1H m), 2.14-2.24 (1H m), 1.77-1.94 (2H m).

TABLE 1
| Compound having tetralin ring | | Molecular weight | 3% weight-reduction temperature (° C.) |
|---|---|---|---|
| Diester compound A | 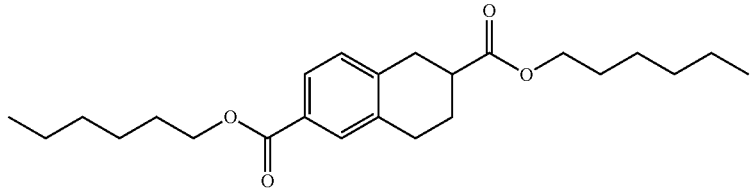 | 388.6 | 237 |
| Diester compound B | 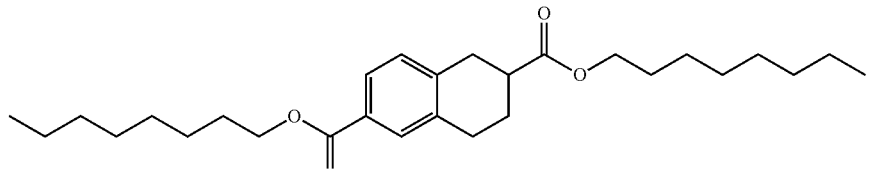 | 444.7 | 262 |
| Diester compound C | 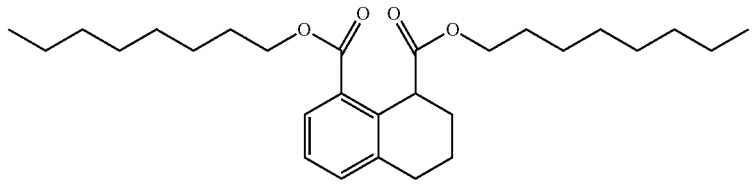 | 444.7 | 250 |
| Diester compound D | 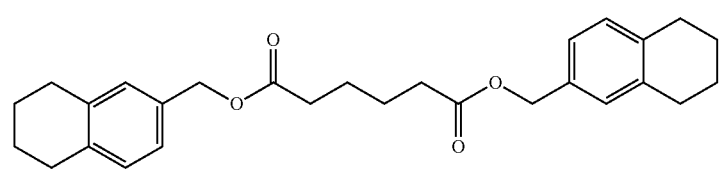 | 434.6 | 263 |
| Diamide compound E | 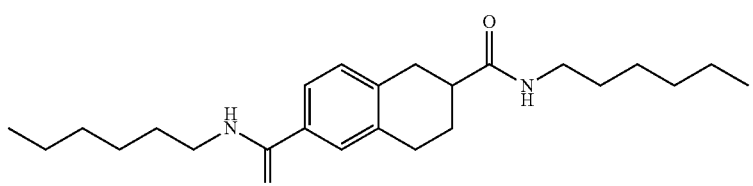 | 386.6 | 290 |
| Acid anhydride F | 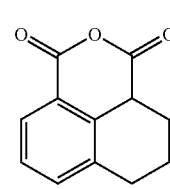 | 202.2 | 170 |

Example 1-1

95 parts by mass of an ethylene-vinyl alcohol copolymer (product name: "EVAL L171B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain an oxygen-absorbing composition.

Subsequently, an oxygen-absorbing multilayer sheet was formed with a three-material five-layer multilayer sheet molding apparatus equipped with first to third extruders, a feed block, a T-die, a cooling roll, and a sheet take-up unit by extruding polypropylene (product name: "NOVATEC PP FY6C", hereinafter also abbreviated to "PP", manufactured by Japan Polypropylene Corporation) from the first extruder, the oxygen-absorbing composition from the second extruder, and adhesive polypropylene (product name: "MODIC P604V", hereinafter also abbreviated to "adhesive PP", manufactured by Mitsubishi Chemical Corporation) from the third extruder and supplying the extrudates to the feed block. The multilayer sheet had a layer structure composed of PP (250 μm)/adhesive PP (15 μm)/oxygen-absorbing layer (100 μm)/adhesive PP (15 μm)/PP (250 μm) in this order from the inner layer. The resulting oxygen-absorbing multilayer sheet was evaluated as follows.

(1) Amount of Oxygen Absorbed by Oxygen-Absorbing Multilayer Sheet

Two gas barrier bags made of an aluminum foil laminate film were prepared. Two test pieces (length: 10 cm, width: 10 cm) of the resulting oxygen-absorbing multilayer sheet were put in the two gas barrier bags, respectively, together with 500 cc of air, respectively. The relative humidity of one of the bags was adjusted to be 100%, and that of the other bag was adjusted to be 30%. Both bags were sealed and were stored in an atmosphere of a temperature of 40° C. for 30 days. The total amount of oxygen absorbed during the storage was measured.

(2) Odor of Oxygen-Absorbing Multilayer Sheet after Oxygen Absorption

Sealed bags stored at a temperature of 40° C. and a relative humidity of 100% for 30 days, as in the measurement of the amount of oxygen absorbed, were opened, and the odor in each bag was verified.

The odor was evaluated for whether the sheet itself has an odor or not and for whether the odor changed or not after oxygen absorption. When the sheet itself had no odor and when the odor did not change after oxygen absorption, the sheet was considered "no odor after oxygen absorption".

(3) Oxygen Transmission Rate of Oxygen-Absorbing Multilayer Sheet

The oxygen transmission rate was measured on the 30th day from the start of the measurement in an atmosphere of a temperature of 23° C. and a relative humidity of 60% with an oxygen transmission rate measurement apparatus ("OX-TRAN 2-61", manufactured by MOCON, Inc.). A lower measurement value indicates a higher oxygen barrier property. The oxygen transmission rate was measured in accordance with ASTM D3985.

Example 1-2

An oxygen-absorbing multilayer sheet was formed as in Example 1-1 except that diester compound B was used instead of diester compound A and was evaluated as in Example 1-1.

Example 1-3

An oxygen-absorbing multilayer sheet was formed as in Example 1-1 except that diester compound C was used instead of diester compound A and was evaluated as in Example 1-1.

Example 1-4

An oxygen-absorbing multilayer sheet was formed as in Example 1-1 except that diester compound D was used instead of diester compound A and was evaluated as in Example 1-1.

Example 1-5

An oxygen-absorbing multilayer sheet was formed as in Example 1-1 except that diamide compound E was used instead of diester compound A and was evaluated as in Example 1-1.

Example 1-6

An oxygen-absorbing multilayer sheet was formed as in Example 1-1 except that acid anhydride F was used instead of diester compound A and was evaluated as in Example 1-1.

Comparative Example 1-1

A multilayer sheet was formed as in Example 1-1 except that diester compound A and cobalt(II) stearate were not used and was evaluated as in Example 1-1.

Comparative Example 1-2

A multilayer sheet was formed as in Example 1-1 except that diester compound A was not used and was evaluated as in Example 1-1.

Comparative Example 1-3

A multilayer sheet was formed as in Example 1-1 except that cobalt(II) stearate was not used and was evaluated as in Example 1-1.

The following table shows the conditions and results of each Example and each Comparative Example.

TABLE 2

|  | Oxygen-absorbing layer composition (parts by mass) | | | Amount of oxygen absorbed[1] (cc/200 cm$^2$) | | Odor after oxygen absorption[2] | Oxygen transmission rate[3] (cc/m$^2$ · day · atm) |
| --- | --- | --- | --- | --- | --- | --- | --- |
|  | Thermoplastic resin | Compound having tetralin ring | Transition metal | Relative humidity 100% | Relative humidity 30% |  |  |
| Example 1-1 | EVOH (95) | Diester compound A (5) | Co (0.05) | 5.6 | 1.5 | No | 0.01 |

TABLE 2-continued

| | Oxygen-absorbing layer composition (parts by mass) | | | Amount of oxygen absorbed[1] (cc/200 cm$^2$) | | Odor after oxygen absorption[2] | Oxygen transmission rate[3] (cc/m$^2$ · day · atm) |
|---|---|---|---|---|---|---|---|
| | Thermoplastic resin | Compound having tetralin ring | Transition metal | Relative humidity 100% | Relative humidity 30% | | |
| Example 1-2 | EVOH (95) | Diester compound B (5) | Co (0.05) | 5.2 | 1.4 | No | 0.02 |
| Example 1-3 | EVOH (95) | Diester compound C (5) | Co (0.05) | 5.3 | 1.5 | No | 0.01 |
| Example 1-4 | EVOH (95) | Diester compound D (5) | Co (0.05) | 5.8 | 1.6 | No | 0.01 |
| Example 1-5 | EVOH (95) | Diamide compound E (5) | Co (0.05) | 3.4 | 0.9 | No | 0.04 |
| Example 1-6 | EVOH (95) | Acid anhydride F (5) | Co (0.05) | 4.3 | 1.0 | No | 0.03 |
| Comparative Example 1-1 | EVOH (100) | — | — | 0 | 0 | No | 0.1 |
| Comparative Example 1-2 | EVOH (100) | — | Co (0.05) | 0 | 0 | No | 0.1 |
| Comparative Example 1-3 | EVOH (95) | Diester compound A (5) | — | 0 | 0 | No | 0.1 |

[1] Total amount of oxygen absorbed for 30 days from the start of test at 40° C.
[2] Odor after storage for 30 days at 40° C. and a relative humidity of 100%
[3] Measured at 23° C. and a relative humidity of 60%

As obvious from the table, the oxygen-absorbing multilayer sheets of the Examples absorbed oxygen by the oxygen-absorbing layers and could reduce the oxygen transmission rates, compared to those in the Comparative Examples. It was also observed that the oxygen-absorbing multilayer sheets of the Examples not only did not have any odor by themselves but also did not have any odor after oxygen absorption.

Example 1-7

95 parts by mass of polyethylene terephthalate (product name: "1101E", also abbreviated to "PET", manufactured by Invista), 5 parts by mass of diester compound A, and cobalt(II) stearate giving 0.05 parts by mass of cobalt were melt-kneaded with a twin-screw extruder having two 37-mm diameter screws at 260° C., extruded into a strand from the extruder head, cooled, and then pelletized to obtain an oxygen-absorbing composition.

An oxygen-absorbing multilayer sheet was formed with a two-material three-layer multilayer sheet molding apparatus equipped with first to third extruders, a feed block, a T-die, a cooling roll, and a sheet take-up unit by extruding polyethylene terephthalate from the first and third extruders and the oxygen-absorbing composition prepared above from the second extruder and supplying the extrudates to the feed block. The multilayer sheet had a layer structure composed of PET (100 μm)/oxygen-absorbing layer (300 μm)/PET (100 μm).

The oxygen transmission rate of the resulting oxygen-absorbing multilayer sheet was measured in an atmosphere of a temperature of 23° C. and a relative humidity of 60% or 90%. The oxygen transmission rate 30 days after the start of the measurement is shown in Table 3. The oxygen transmission rate was measured with an oxygen transmission rate measurement apparatus as in Example 1-1. The odor of the multilayer sheet after the measurement of the oxygen transmission rate was verified as in Example 1-1.

Example 1-8

An oxygen-absorbing multilayer sheet was formed as in Example 1-7 except that diester compound B was used instead of diester compound A and was evaluated as in Example 1-7.

Example 1-9

An oxygen-absorbing multilayer sheet was formed as in Example 1-7 except that diester compound C was used instead of diester compound A and was evaluated as in Example 1-7.

Example 1-10

An oxygen-absorbing multilayer sheet was formed as in Example 1-7 except that diester compound D was used instead of diester compound A and was evaluated as in Example 1-7.

Example 1-11

An oxygen-absorbing multilayer sheet was formed as in Example 1-7 except that diester compound E was used instead of diester compound A and was evaluated as in Example 1-7.

Comparative Example 1-4

A multilayer sheet was formed as in Example 1-7 except that diester compound A and cobalt(II) stearate were not used and was evaluated as in Example 1-7.

Comparative Example 1-5

A multilayer sheet was formed as in Example 1-7 except that diester compound A was not used and was evaluated as in Example 1-7.

Comparative Example 6

A multilayer sheet was formed as in Example 1-7 except that cobalt(II) stearate was not used and was evaluated as in Example 1-7.

TABLE 3

| | Oxygen-absorbing layer composition (parts by mass) | | | Oxygen transmission rate (cc/m$^2$ · day · atm) | | Odor after measurement of oxygen transmission rate | |
|---|---|---|---|---|---|---|---|
| | Thermoplastic resin | Compound having tetralin ring | Transition metal | Relative humidity 60% | Relative humidity 90% | Relative humidity 60% | Relative humidity 90% |
| Example 1-7 | PET (95) | Diester compound A (5) | Co (0.05) | 4.2 | 4.0 | No | No |
| Example 1-8 | PET (95) | Diester compound B (5) | Co (0.05) | 4.8 | 5.0 | No | No |
| Example 1-9 | PET (95) | Diester compound C (5) | Co (0.05) | 4.2 | 4.2 | No | No |
| Example 1-10 | PET (95) | Diester compound D (5) | Co (0.05) | 4.0 | 4.0 | No | No |
| Example 1-11 | PET (95) | Diamide compound E (5) | Co (0.05) | 5.6 | 5.8 | No | No |
| Comparative Example 1-4 | PET (100) | — | — | 7.5 | 7.6 | No | No |
| Comparative Example 1-5 | PET (100) | — | Co (0.05) | 7.6 | 7.4 | No | No |
| Comparative Example 1-6 | PET (95) | Diester compound A (5) | — | 7.6 | 7.5 | No | No |

1)Measured at 23° C.

As obvious from the table, the oxygen-absorbing multilayer sheets of the Examples absorbed oxygen by the oxygen-absorbing layers and could reduce the oxygen transmission rates, compared to those in the Comparative Examples. It was also observed that the oxygen-absorbing multilayer sheets of the Examples not only did not have any odor by themselves but also did not have any odor after oxygen absorption.

Example 1-12

95 parts by mass of polyamide 6 (product name: "UBE nylon 1024B", hereinafter also abbreviated to "PA6", manufactured by Ube Industries, Ltd.), 5 parts by mass of diester compound A, and cobalt(II) stearate giving 0.05 parts by mass of cobalt were melt-kneaded with a twin-screw extruder having two 37-mm diameter screws at 250° C., extruded into a strand from the extruder head, cooled, and then pelletized to obtain an oxygen-absorbing composition.

An oxygen-absorbing multilayer film was formed with a two-material three-layer multilayer film molding apparatus equipped with two extruders, a feed block, a T-die, a cooling roll, and a sheet take-up unit by extruding PA6 from the first extruder and the oxygen-absorbing composition prepared above from the second extruder and supplying the extrudates to the feed block. The multilayer sheet had a layer structure composed of PA6 (90 µm)/oxygen-absorbing layer (180 µm)/PA6 (90 µm). The resulting multilayer film was stretched three times in the MD and three times in the TD at an elongation temperature of 80° C. with a batch-type biaxial stretching apparatus (manufactured by Toyo Seiki Co., Ltd., center stretch-type biaxial stretching apparatus) and was thermally fixed at 210° C. for 30 seconds to obtain a biaxial stretched film. The thicknesses of the individual layers after stretching were 10/20/10 (µm).

The oxygen transmission rate of the resulting oxygen-absorbing multilayer film was measured in an atmosphere of a temperature of 23° C. and a relative humidity of 60%. The oxygen transmission rate 30 days after the start of the measurement is shown in Table 4. The oxygen transmission rate was measured with an oxygen transmission rate measurement apparatus as in Example 1-1. The odor of the multilayer film after the measurement of the oxygen transmission rate was verified as in Example 1-1.

Example 1-13

An oxygen-absorbing multilayer film was formed as in Example 1-12 except that diester compound B was used instead of diester compound A and was evaluated as in Example 1-12.

Example 1-14

An oxygen-absorbing multilayer film was formed as in Example 1-12 except that diester compound C was used instead of diester compound A and was evaluated as in Example 1-12.

Example 1-15

An oxygen-absorbing multilayer film was formed as in Example 1-12 except that diester compound D was used instead of diester compound A and was evaluated as in Example 1-12.

Example 1-16

An oxygen-absorbing multilayer film was formed as in Example 1-12 except that diamide compound E was used instead of diester compound A and was evaluated as in Example 1-12.

Example 1-17

An oxygen-absorbing multilayer film was formed as in Example 1-12 except that the amount of the polyamide compound was 90 parts by mass and that the amount of diamide compound E was 10 parts by mass and was evaluated as in Example 1-12.

Comparative Example 1-7

A multilayer film was formed as in Example 1-12 except that diester compound A and cobalt(II) stearate were not used and was evaluated as in Example 1-12.

Comparative Example 1-8

A multilayer film was formed as in Example 1-12 except that diester compound A was not used and was evaluated as in Example 1-12.

Comparative Example 1-9

A multilayer film was formed as in Example 1-12 except that cobalt(II) stearate was not used and was evaluated as in Example 1-12.

The following table shows the conditions and the evaluation results of the Examples and the Comparative Examples.

TABLE 4

| | Oxygen-absorbing layer composition (parts by mass) | | | Oxygen transmission rate[1] ($cc/m^2 \cdot day \cdot atm$) | Odor after measurement of oxygen transmission rate |
|---|---|---|---|---|---|
| | Thermoplastic resin | Compound having tetralin ring | Transition metal | | |
| Example 1-12 | Polyamide 6 (95) | Diester compound A (5) | Co (0.05) | 15 | No |
| Example 1-13 | Polyamide 6 (95) | Diester compound B (5) | Co (0.05) | 16 | No |
| Example 1-14 | Polyamide 6 (95) | Diester compound C (5) | Co (0.05) | 15 | No |
| Example 1-15 | Polyamide 6 (95) | Diester compound D (5) | Co (0.05) | 13 | No |
| Example 1-16 | Polyamide 6 (95) | Diamide compound E (5) | Co (0.05) | 17 | No |
| Example 1-17 | Polyamide 6 (90) | Diamide compound E (10) | Co (0.05) | 15 | No |
| Comparative Example 1-7 | Polyamide 6 (100) | — | — | 21 | No |
| Comparative Example 1-8 | Polyamide 6 (100) | — | Co (0.05) | 20 | No |
| Comparative Example 1-9 | Polyamide 6 (95) | Diester compound A (5) | — | 21 | No |

[1]Measured at 23° C. and a relative humidity of 60%

As obvious from the table, the oxygen-absorbing multilayer films of the Examples absorbed oxygen by the oxygen-absorbing layers and could reduce the oxygen transmission rates, compared to those in the Comparative Examples. It was also observed that the oxygen-absorbing multilayer films of the Examples not only did not have any odor by themselves but also did not have any odor after oxygen absorption.

Example 1-18

95 parts by mass of a linear low-density polyethylene (product name: "UMERIT 140HK", hereinafter also abbreviated to "LLDPE1", manufactured by Ube-Maruzen Polyethylene Co., Ltd.), 5 parts by mass of diester compound A, and cobalt(II) stearate giving 0.05 parts by mass of cobalt were melt-kneaded with a twin-screw extruder having two 37-mm diameter screws at 200° C., extruded into a strand from the extruder head, cooled, and was then pelletized to obtain an oxygen-absorbing composition.

A two-material three-layer film was formed with a two-material three-layer multilayer film molding apparatus equipped with two extruders, a feed block, a T-die, a cooling roll, a corona discharge unit, a winding unit, and other equipment by extruding linear low-density polyethylene (product name: "ELITE 5220G", hereinafter also abbreviated to "LLDPE2", manufactured by The Dow Chemical Company) from the first extruder and the oxygen-absorbing composition prepared above from the second extruder and supplying the extrudates to the feed block. The surface of one of the LLDPE2 layers was treated with corona discharge at a rate of 60 m/min to produce a film roll. The multilayer film had a layer structure composed of LLDPE2 (20 μm)/oxygen-absorbing layer (40 μm)/LLDPE2 (20 μm).

Subsequently, on the corona treated surface, nylon 6 film (product name: "N1202", manufactured by Toyobo Co., Ltd.) and alumina-deposited PET film (product name: "GL-ARH-F", manufactured by Toppan Printing Co., Ltd.) were dry-laminated using a urethane-based dry-lamination adhesive (product name: "TM251/CAT-RT88", manufactured by Toyo-Morton, Ltd.) to prepare a transparent oxygen-absorbing multilayer film of an oxygen-absorbing multilayer body composed of alumina-deposited PET film (12 μm)/urethane-based dry-lamination adhesive (3 μm)/nylon 6 film (15 μm)/urethane-based dry-lamination adhesive (3 μm)/LLDPE2 (20 μm)/oxygen-absorbing layer (40 μm)/LLDPE2 (20 μm). The resulting oxygen-absorbing multilayer film was evaluated as follows.

(1) Amount of Oxygen Absorbed by Oxygen-Absorbing Multilayer Film

Two gas barrier bags made of an aluminum foil laminate film were prepared. Two test pieces (length: 10 cm, width: 10 cm) of the resulting oxygen-absorbing multilayer film were put in the two gas barrier bags, respectively, together with 500 cc of air. The relative humidity of one of the bags was adjusted to be 100%, and that of the other bag was adjusted to be 30%. Both bags were sealed and were stored in an atmosphere of a temperature of 40° C. for 30 days. The total amount of oxygen absorbed during the storage was measured.

(2) Odor of Oxygen-Absorbing Multilayer Film after Oxygen Absorption

The sealed bags after the measurement of the amount of oxygen absorbed were opened, and the odor in the bags was verified.

(3) Sealing Strength

The resulting oxygen-absorbing multilayer film was formed into a three-side sealed bag of 10 cm×18 cm such that the LLDPE2 layer was the inside surface. The bag was stored at a temperature of 40° C. and a relative humidity of 90% for 100 days, and the sealing strength of the bag was then measured. In the measurement of the sealing strength, the sealing strength of the short side portion of the three-side sealed bag was measured in accordance with JIS 20238.

Example 1-19

An oxygen-absorbing multilayer film was formed as in Example 1-18 except that diester compound B was used instead of diester compound A. Subsequently, measurement of the amount of oxygen absorbed, verification of the odor after oxygen absorption, and measurement of the sealing strength of the bag were performed as in Example 1-18.

Example 1-20

An oxygen-absorbing multilayer film was formed as in Example 1-18 except that diester compound C was used instead of diester compound A. Subsequently, measurement of the amount of oxygen absorbed, verification of the odor after oxygen absorption, and measurement of the sealing strength of the bag were performed as in Example 1-18.

Example 1-21

An oxygen-absorbing multilayer film was formed as in Example 1-18 except that diester compound D was used instead of diester compound A. Subsequently, measurement of the amount of oxygen absorbed, verification of the odor after oxygen absorption, and measurement of the sealing strength of the bag were performed as in Example 1-18.

Example 1-22

An oxygen-absorbing multilayer film was formed as in Example 1-18 except that diamide compound E was used instead of diester compound A. Subsequently, measurement of the amount of oxygen absorbed, verification of the odor after oxygen absorption, and measurement of the sealing strength of the bag were performed as in Example 1-18.

Example 1-23

An oxygen-absorbing multilayer film was formed as in Example 1-18 except that acid anhydride F was used instead of diester compound A. Subsequently, measurement of the amount of oxygen absorbed, verification of the odor after oxygen absorption, and measurement of the sealing strength of the bag were performed as in Example 1-18.

Comparative Example 1-10

A multilayer film was formed as in Example 1-18 except that diester compound A and cobalt(II) stearate were not used. Subsequently, measurement of the amount of oxygen absorbed, verification of the odor after oxygen absorption, and measurement of the sealing strength of the bag were performed as in Example 1-18.

Comparative Example 1-11

A multilayer film was formed as in Example 1-18 except that diester compound A was not used. Subsequently, measurement of the amount of oxygen absorbed, verification of the odor after oxygen absorption, and measurement of the sealing strength of the bag were performed as in Example 1-18.

Comparative Example 1-12

A multilayer film was formed as in Example 1-18 except that cobalt(II) stearate was not used. Subsequently, measurement of the amount of oxygen absorbed, verification of the odor after oxygen absorption, and measurement of the sealing strength of the bag were performed as in Example 1-18.

Comparative Example 1-13

An iron powder having an average particle diameter of 30 µm and calcium chloride were mixed at a mass ratio of 100:1. The mixture and LLDPE1 were kneaded at a mass ratio of 30:70 to prepare an iron-based oxygen-absorbing composition. A two-material three-layer film was tried to be formed as in Example 1-18 except that this iron-based oxygen-absorbing composition was used instead of the oxygen-absorbing composition in Example 1-18, but the film did not have a smooth surface that can withstand the subsequent studies because of the generation of the irregularity of the film surface due to the iron powder. Accordingly, the iron-based oxygen-absorbing composition was extruded to be laminated to form an oxygen-absorbing layer having a thickness of 40 µm on a linear low-density polyethylene film (product name: "Tohcello T.U.X HC", hereinafter referred to as "LLDPE3", manufactured by Tohcello Inc.) having a thickness of 50 µm, and the surface of the iron-based oxygen-absorbing composition layer was then treated with corona discharge at a rate of 60 m/min to obtain a laminate film.

Subsequently, on the corona treated surface of the laminate film, the layers shown below were dry-laminated as in Example 1-18 to form an iron-based oxygen-absorbing multilayer film composed of alumina-deposited PET film (12 µm)/urethane-based dry-lamination adhesive (3 µm)/nylon 6 film (15 µm)/urethane-based dry-lamination adhesive (3 µm)/oxygen-absorbing layer (40 µm)/LLDPE3 (50 µm). The resulting iron-based oxygen-absorbing multilayer film was opaque because of the presence of iron.

Subsequently, the resulting iron-based oxygen-absorbing multilayer film was subjected to measurement of the amount of oxygen absorbed, verification of the odor after oxygen absorption, and measurement of the sealing strength of a bag as in Example 1-18.

Comparative Example 1-14

100 parts by mass of nylon MXD6 (product name: "MX nylon S6011", hereinafter also abbreviated to "N-MXD6", manufactured by Mitsubishi Gas Chemical Company, Inc.) and cobalt(II) stearate giving 0.05 parts by mass of cobalt were melt-kneaded with a twin-screw extruder having two 37-mm diameter screws at 260° C., extruded into a strand from the extruder head, cooled, and then pelletized to obtain an oxygen-absorbing composition.

A three-material five-layer film was formed with a three-material five-layer multilayer film molding apparatus equipped with three extruders, a feed block, a T-die, a cooling roll, a corona discharge unit, a winding unit, and other equipment by extruding LLDPE2 from the first extruder, the oxygen-absorbing composition prepared above from the second extruder, and adhesive polyethylene (product name: "MODIC M545", hereinafter also abbreviated to "adhesive PE", manufactured by Mitsubishi Chemical Corporation) from the third extruder and supplying the extrudates to the feed block. The surface of one of the LLDPE2 layers was treated with corona discharge at a rate of 60 m/min to produce a film roll. The multilayer film had a layer structure composed of LLDPE2 (10 μm)/adhesive PE (10 μm)/oxygen-absorbing layer (40 μm)/adhesive PE (10 μm)/LLDPE2 (10 μm).

Subsequently, on the corona treated surface of the laminate film, the layers shown below were dry-laminated as in Example 1-18 to prepare a nylon MXD6-based oxygen-absorbing multilayer film composed of alumina-deposited PET film (12 μm)/urethane-based dry-lamination adhesive (3 μm)/nylon 6 film (15 μm)/urethane-based dry-lamination adhesive (3 μm)/LLDPE2 (10 μm)/adhesive PE (10 μm)/oxygen-absorbing layer (40 μm)/adhesive PE (10 μm)/LLDPE2 (10 μm).

Subsequently, the resulting nylon MXD6-based oxygen-absorbing multilayer film was subjected to measurement of the amount of oxygen absorbed, verification of the odor after oxygen absorption, and measurement of the sealing strength of a bag as in Example 1-18.

The following table shows the conditions and results of the Examples and the Comparative Examples.

Example 2-1

(Production of Oxygen-Absorbing Composition)

95 parts by mass of an ethylene-vinyl alcohol copolymer (product name: "EVAL SP521B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain an oxygen-absorbing composition.

(Production of Oxygen-Absorbing Multilayer Film)

An oxygen-absorbing monolayer film being an oxygen-absorbing composition in a film form having a width of 800 mm and a thickness of 15 μm was formed from the resulting oxygen-absorbing composition with a twin-screw extruder having two 96-mm diameter screws at conditions of an extrusion temperature of 210° C., a screw rotation number of 60 rpm, a feed screw rotation number of 20 rpm, and a taking-up speed of 50 m/min.

TABLE 5

| | Oxygen-absorbing layer composition (parts by mass) | | | Amount of oxygen absorbed[1] (cc/200 cm²) | | Odor after oxygen absorption[1] | | Sealing strength[3] (kg/15 mm) | |
|---|---|---|---|---|---|---|---|---|---|
| | Thermoplastic resin | Compound having tetralin ring | Transition metal | Relative humidity 100% | Relative humidity 30% | Relative humidity 100% | Relative humidity 30% | Initial | After storage |
| Example 1-18 | LLDPE (95) | Diester compound A (5) | Co (0.05) | 5.8 | 1.5 | No | No | 7.3 | 7.4 |
| Example 1-19 | LLDPE (95) | Diester compound B (5) | Co (0.05) | 5.4 | 1.4 | No | No | 7.5 | 7.4 |
| Example 1-20 | LLDPE (95) | Diester compound C (5) | Co (0.05) | 5.4 | 1.5 | No | No | 7.6 | 7.5 |
| Example 1-21 | LLDPE (95) | Diester compound D (5) | Co (0.05) | 6.0 | 1.6 | No | No | 7.4 | 7.6 |
| Example 1-22 | LLDPE (95) | Diamide compound E (5) | Co (0.05) | 4.0 | 0.9 | No | No | 7.5 | 7.5 |
| Example 1-23 | LLDPE (95) | Acid anhydride F (5) | Co (0.05) | 4.8 | 1.0 | No | No | 7.6 | 7.4 |
| Comparative Example 1-10 | LLDPE (100) | — | — | 0 | 0 | No | No | 7.4 | 7.5 |
| Comparative Example 1-11 | LLDPE (100) | — | Co (0.05) | 0 | 0 | No | No | 7.3 | 7.4 |
| Comparative Example 1-12 | LLDPE (95) | Diester compound A (5) | — | 0 | 0 | No | No | 7.4 | 7.4 |
| Comparative Example 1-13 | Iron-based oxygen absorber + LLDPE | | | 31.7 | 0.5 | Slight iron odor | Slight iron odor | 7.2 | 7.2 |
| Comparative Example 1-14 | N-MXD6 (100) | — | Co (0.05) | 6.0 | 0.4 | No | No | 7.1 | 0.8 |

[1]Total amount of oxygen absorbed for 30 days from the start of test at 40° C.
[2]Examined by opening sealed bag after measurement of oxygen absorption
[3]Storage at 40° C. and a relative humidity of 90% for 100 days As obvious from the table, it was at least observed that the oxygen-absorbing multilayer films of the Examples exhibited oxygen-absorbing properties under high humidity and under low humidity, no odor was generated even after oxygen absorption, and the sealing strength was maintained even after oxygen absorption.

Second Experiment

Diester compounds A to D each having a tetralin ring produced in Synthesis Examples 1 to 4, diamide compound E having a tetralin ring produced in Synthesis Example 5, and acid anhydride F having a tetralin ring produced in Synthesis Example 6 were used.

The resulting oxygen-absorbing monolayer film was treated with corona discharge at a rate of 100 m/min to produce a film roll. The resulting film roll was observed to have no thickness deviation such as bumps and to have a satisfactory appearance. Subsequently, a nylon film (product name: "N1130", manufactured by Toyobo Co., Ltd.) was dry-laminated on the corona treated surface using a urethane-based dry-lamination adhesive (product name: "AD817/CAT-RT86L-60", manufactured by Toyo-Morton, Ltd.). The EVOH surface of the resulting laminate was further treated with corona discharge at a rate of 100 m/min to produce a film roll. The resulting film roll had a satisfactory appearance without thickness deviation such as bumps. An LLDPE film (product name: "L6100", manufactured by Toyobo Co., Ltd.) was dry-laminated on the corona treated surface using a urethane-based dry-lamination adhesive (product name: "AD817/CAT-RT86L-60", manufactured by Toyo-Morton, Ltd.) to obtain an oxygen-absorbing multilayer film composed of nylon film (15 µm)/adhesive (3 µm)/oxygen-absorbing monolayer film (15 µm)/adhesive (3 µm)/LLDPE film (50 µm). The numeric characters shown with a unit of µm in the parentheses refer to the thickness. The same applies to the following Examples unless specifically indicated otherwise.

(Production of Oxygen-Absorbing Multilayer Sheet)

An oxygen-absorbing multilayer sheet was formed with a three-material five-layer multilayer sheet molding apparatus equipped with first to third extruders, a feed block, a T-die, a cooling roll, and a sheet take-up unit by extruding polypropylene (product name: "NOVATEC PP FY6C", hereinafter also abbreviated to "PP1", manufactured by Japan Polypropylene Corporation) from the first extruder, the oxygen-absorbing composition from the second extruder, and adhesive polypropylene (product name: "MODIC P604V", hereinafter also abbreviated to "adhesive PP", manufactured by Mitsubishi Chemical Corporation) from the third extruder and supplying the extrudates to the feed block. The multilayer sheet had a layer structure composed of PP1 (400 µm)/adhesive PP (15 µm)/oxygen-absorbing layer (100 µm)/adhesive PP (15 µm)/PP1 (400 µm) from the inner layer.

(Production of oxygen-absorbing multilayer container)

The resulting oxygen-absorbing multilayer sheet was thermoformed into a tray-shaped oxygen-absorbing multilayer container having an internal volume of 400 cc and a surface area of 200 cm$^2$ with a vacuum molding apparatus equipped with a plug assist. The resulting oxygen-absorbing multilayer container was filled with 10 g of a humidity conditioning agent to adjust the relative humidity inside the container to 100%. Subsequently, the container was sealed by joining by heat sealing using a gas barrier film (product name: "EVAL EFCR-15", manufactured by Kuraray Co., Ltd.) as the lid member, while adjusting the initial oxygen concentration to 2 vol % by nitrogen purge to obtain an oxygen-absorbing sealed container. The heat sealing was performed with a pack-sealing apparatus manufactured by Eshin Pack Industry Co., Ltd. at a heat-sealing temperature of 240° C. for heat sealing time of 2 sec at a heat sealing pressure of 0.3 MPa.

The resulting oxygen-absorbing multilayer film, oxygen-absorbing multilayer sheet, and oxygen-absorbing multilayer container were evaluated as follows.

(1) Amount of Oxygen Absorbed by Oxygen-Absorbing Multilayer Film

Two gas barrier bags made of an aluminum foil laminate film were prepared. Two test pieces (length: 10 cm, width: 10 cm) of the resulting oxygen-absorbing multilayer film were put in the two gas barrier bags, respectively, together with 500 cc of air. The relative humidity of one of the bags was adjusted to be 100%, and that of the other bag was adjusted to be 30%. Both bags were sealed and were stored at 40° C. for 30 days. The total amount of oxygen absorbed during the storage was measured.

(2) Oxygen Transmission Rate of Oxygen-Absorbing Multilayer Film

The oxygen transmission rate was measured on the 30th day from the start of the measurement in an atmosphere of a temperature of 23° C. and a relative humidity of 90% with an oxygen transmission rate measurement apparatus ("OX-TRAN 2-61", manufactured by MOCON, Inc.). A lower measurement value indicates a higher oxygen barrier property.

(3) Amount of Oxygen Absorbed by Oxygen-Absorbing Multilayer Sheet

Two gas barrier bags made of an aluminum foil laminate film were prepared. Two test pieces (length: 10 cm, width: 10 cm) of the resulting oxygen-absorbing multilayer sheet were put in the two gas barrier bags, respectively, together with 500 cc of air. The relative humidity of one of the bags was adjusted to be 100%, and that of the other bag was adjusted to be 30%. Both bags were sealed and were stored at 40° C. for 30 days. The total amount of oxygen absorbed during the storage was measured.

(4) Odor of Oxygen-Absorbing Multilayer Sheet after Oxygen Absorption

As in the measurement of the amount of oxygen absorbed by oxygen-absorbing multilayer sheet, a sealed bag stored at a temperature of 40° C. and a relative humidity of 100% for 30 days was opened, and the odor in the bags were verified.

(5) Oxygen Transmission Rate of Oxygen-Absorbing Multilayer Container

The oxygen transmission rate was measured on the 30th day from the start of the measurement in an atmosphere of a temperature of 23° C. and relative humidities of 100% (inside the container) and 50% (outside the container) with an oxygen transmission rate measurement apparatus ("OX-TRAN 2-61", manufactured by MOCON, Inc.). A lower measurement value indicates a higher oxygen barrier property. The detection lower limit is an oxygen transmission rate of $5\times10^{-5}$ cc/(package·day·0.21 atm).

Example 2-2

An oxygen-absorbing multilayer film, an oxygen-absorbing multilayer sheet, and an oxygen-absorbing multilayer container were produced as in Example 2-1 except that diester compound B was used instead of diester compound A and were evaluated as in Example 2-1.

Example 2-3

An oxygen-absorbing multilayer film, an oxygen-absorbing multilayer sheet, and an oxygen-absorbing multilayer container were produced as in Example 2-1 except that diester compound C was used instead of diester compound A and were evaluated as in Example 2-1.

Example 2-4

An oxygen-absorbing multilayer film, an oxygen-absorbing multilayer sheet, and an oxygen-absorbing multilayer container were produced as in Example 2-1 except that diester compound D was used instead of diester compound A and were evaluated as in Example 2-1.

Example 2-5

An oxygen-absorbing multilayer film, an oxygen-absorbing multilayer sheet, and an oxygen-absorbing multilayer container were produced as in Example 2-1 except that diamide compound E was used instead of diester compound A and were evaluated as in Example 2-1.

Example 2-6

An oxygen-absorbing multilayer film, an oxygen-absorbing multilayer sheet, and an oxygen-absorbing multilayer container were produced as in Example 2-1 except that acid anhydride F was used instead of diester compound A and were evaluated as in Example 2-1.

Comparative Example 2-1

Oxygen-absorbing multilayer film, multilayer sheet, and multilayer container were prepared as in Example 2-1 except that diester compound A was not used and were evaluated as in Example 2-1.

The following table shows the conditions and results of the Examples and the Comparative Examples.

melt-kneaded with a twin-screw extruder having two 37-mm diameter screws at 200° C., extruded into a strand from the extruder head, cooled, and then pelletized to obtain oxygen-absorbing composition A.

A two-material two-layer film (thickness: oxygen-absorbing layer: 30 μm/sealant layer: 30 μm) having a width of 900 mm was formed with a multilayer film molding apparatus equipped with two extruders, a feed block, a T-die, a cooling roll, a corona discharge unit, a winding unit, and other equipment by extruding linear low-density polyethylene, a material for sealant layer, (product name: "NOVATEC LL

TABLE 6

| | Oxygen-absorbing layer composition (parts by mass) | | | Oxygen-absorbing multilayer film | | | Oxygen-absorbing multilayer sheet | | | Oxygen-absorbing multilayer container |
|---|---|---|---|---|---|---|---|---|---|---|
| | | | | Amount of oxygen absorbed[1] (cc/200 cm$^2$) | | Oxygen transmission | Amount of oxygen absorbed[1] (cc/200 cm$^2$) | | | Oxygen transmission |
| | Thermoplastic resin | Compound having tetralin ring | Transition metal | Relative humidity 100% | Relative humidity 30% | rate[2] (cc/m$^2$ · day · atm) | Relative humidity 100% | Relative humidity 30% | Odor after oxygen absorption[3] | rate[4),5)] (cc/package · day · 0.21 atm) |
| Example 2-1 | 95 (EVOH) | 5 (Diester compound A) | 0.05 (Co) | 7.0 | 1.8 | $1.5 \times 10^{-2}$ | 5.4 | 1.3 | No | Undetectable |
| Example 2-2 | 95 (EVOH) | 5 (Diester compound B) | 0.05 (Co) | 6.5 | 1.5 | $1.7 \times 10^{-2}$ | 5.0 | 1.2 | No | Undetectable |
| Example 2-3 | 95 (EVOH) | 5 (Diester compound C) | 0.05 (Co) | 4.2 | 1.2 | $2.0 \times 10^{-2}$ | 3.8 | 0.9 | No | Undetectable |
| Example 2-4 | 95 (EVOH) | 5 (Diester compound D) | 0.05 (Co) | 10.8 | 2.7 | $1.2 \times 10^{-2}$ | 6.0 | 1.9 | No | Undetectable |
| Example 2-5 | 95 (EVOH) | 5 (Diamide compound E) | 0.05 (Co) | 4.4 | 1.0 | $2.3 \times 10^{-2}$ | 3.1 | 0.6 | No | Undetectable |
| Example 2-6 | 95 (EVOH) | 5 (Acid anhydride F) | 0.05 (Co) | 4.5 | 1.2 | $2.0 \times 10^{-2}$ | 3.6 | 0.8 | No | Undetectable |
| Comparative Example 2-1 | 100 (EVOH) | — | — | 0 | 0 | 0.85 | 0 | 0 | No | $6.0 \times 10^{-4}$ |

[1)] Stored for 30 days at a temperature of 40° C. and a relative humidity of 100% or 30%
[2)] Stored for 30 days in an atmosphere of a temperature of 23° C. and a relative humidity of 90%
[3)] Stored for 30 days in an atmosphere of a temperature of 40° C. and a relative humidity of 100%
[4)] Stored for 30 days in an atmosphere of a temperature of 23° C. and a relative humidity of 100%
[5)] Detection lower limit: $5 \times 10^{-5}$ cc/package · day/0.21 atm As obvious from the table, it was observed that the oxygen-absorbing multilayer sheets and oxygen-absorbing multilayer containers of the Examples exhibited oxygen-absorbing properties; the oxygen transmission rate could be reduced compared to that in Comparative Example 1-1; and no odor was generated even after oxygen absorption.

Third Experiment

Diester compounds A to D each having a tetralin ring produced in Synthesis Examples 1 to 4, diamide compound E having a tetralin ring produced in Synthesis Example 5, and acid anhydride F having a tetralin ring produced in Synthesis Example 6 were used.

Example 3-1

95 parts by mass of a linear low-density polyethylene (product name: "UMERIT 140HK", hereinafter referred to as "LLDPE1", manufactured by Ube-Maruzen Polyethylene Co., Ltd.), 5 parts by mass of diester compound A, and cobalt(II) stearate giving 0.05 parts by mass of cobalt were UF641", hereinafter referred to as "LLDPE2", manufactured by Japan Polyethylene Corporation) from the first extruder and oxygen-absorbing composition A, a material for oxygen-absorbing layer, from the second extruder and supplying the extrudates to the feed block. Subsequently, the surface of the oxygen-absorbing layer was treated with corona discharge at a rate of 60 m/min to produce a film roll.

Subsequently, on the corona treated surface, nylon 6 film (product name: "N1202", manufactured by Toyobo Co., Ltd.) and alumina-deposited PET film (product name: "GL-ARH-F", manufactured by Toppan Printing Co., Ltd.) were dry-laminated using a urethane-based dry-lamination adhesive (product name: "TM251/CAT-RT88", manufactured by Toyo-Morton, Ltd.) to prepare an oxygen-absorbing multilayer film of an oxygen-absorbing multilayer body composed of alumina-deposited PET film (12 μm)/urethane-based dry-lamination adhesive (3 μm)/nylon 6 film (15 μm)/urethane-based dry-lamination adhesive (3 μm)/oxygen-absorbing layer (30 μm)/LLDPE2 (30 μm). The numeric characters shown with a unit of μm in the parentheses refer to the thickness.

The resulting oxygen-absorbing multilayer film was formed into a three-side sealed bag of 13 cm×18 cm such that the LLDPE2 layer was the inside surface. The bag was filled with 10 g of a humidity conditioning agent to adjust the relative humidity in the bag to 100% or 30%. Subsequently, the bag was filled with 50 cc of a gas having an initial oxygen concentration adjusted to 2 vol % by nitrogen purge and was sealed. The thus-prepared sealed bag was stored at 23° C. The oxygen concentration inside the bag was measured after storage for one month. The sealed bag stored for one month was opened, and the odor therein was verified. In addition, the sealing strength of the bag was measured before and after the storage for one month. The measurement of the sealing strength was performed for the short side portion of the three-side sealed bag in accordance with JIS Z0238.

Example 3-2

An oxygen-absorbing multilayer film was formed as in Example 3-1 except that diester compound B was used instead of diester compound A. Subsequently, a sealed bag was produced as in Example 3-1, and measurement of the oxygen concentration inside the bag, verification of odor after opening of the bag, and measurement of the sealing strength of the bag were performed as in Example 3-1.

Example 3-3

An oxygen-absorbing multilayer film was formed as in Example 3-1 except that diester compound C was used instead of diester compound A. Subsequently, a sealed bag was produced as in Example 3-1, and measurement of the oxygen concentration inside the bag, verification of odor after opening of the bag, and measurement of the sealing strength of the bag were performed as in Example 3-1.

Example 3-4

An oxygen-absorbing multilayer film was formed as in Example 3-1 except that diester compound D was used instead of diester compound A. Subsequently, a sealed bag was produced as in Example 3-1, and measurement of the oxygen concentration inside the bag, verification of odor after opening of the bag, and measurement of the sealing strength of the bag were performed as in Example 3-1.

Example 3-5

An oxygen-absorbing multilayer film was formed as in Example 3-1 except that diamide compound E was used instead of diester compound A. Subsequently, a sealed bag was produced as in Example 3-1, and measurement of the oxygen concentration inside the bag, verification of odor after opening of the bag, and measurement of the sealing strength of the bag were performed as in Example 3-1.

Example 3-6

An oxygen-absorbing multilayer film was formed as in Example 3-1 except that acid anhydride F was used instead of diester compound A. Subsequently, a sealed bag was produced as in Example 3-1, and measurement of the oxygen concentration inside the bag, verification of odor after opening of the bag, and measurement of the sealing strength of the bag were performed as in Example 3-1.

Comparative Example 3-1

A multilayer film was formed as in Example 3-1 except that diester compound A and cobalt stearate were not used. A sealed bag was then produced as in Example 3-1, and measurement of the oxygen concentration inside the bag, verification of odor after opening of the bag, and measurement of the sealing strength of the bag were performed as in Example 3-1.

Comparative Example 3-2

A multilayer film was formed as in Example 3-1 except that cobalt stearate was not used. A sealed bag was then produced as in Example 3-1, and measurement of the oxygen concentration inside the bag, verification of odor after opening of the bag, and measurement of the sealing strength of the bag were performed as in Example 3-1.

Comparative Example 3-3

A multilayer film was formed as in Example 3-1 except that diester compound A was not used. A sealed bag was then produced as in Example 3-1, and measurement of the oxygen concentration inside the bag, verification of odor after opening of the bag, and measurement of the sealing strength of the bag were performed as in Example 3-1.

Comparative Example 3-4

An iron powder having an average particle diameter of 30 μm and calcium chloride were mixed at a mass ratio of 100:1. The mixture and LLDPE1 were kneaded at a mass ratio of 30:70 to obtain an iron-based oxygen-absorbing composition. A two-material two-layer film was tried to be formed as in Example 3-1 except that this iron-based oxygen-absorbing composition was used instead of oxygen-absorbing composition (1), but the film did not have a smooth surface that can withstand the subsequent studies because of the irregularity of the film surface due to the iron powder.

Comparative Example 3-5

A laminate film composed of oxygen-absorbing layer (30 μm)/linear low-density polyethylene film (50 μm) was formed by extrusion lamination of an oxygen-absorbing layer having a thickness of 30 μm of the iron-based oxygen-absorbing composition prepared in Comparative Example 3-4 to a linear low-density polyethylene film (product name: "T.U.X HC", manufactured by Mitsui Chemical Tohocello, Inc.) having a thickness of 50 μm. Subsequently, the surface of the oxygen-absorbing layer was treated with corona discharge. An oxygen-absorbing multilayer film was prepared by dry lamination as in Example 3-1 except that this laminate film was used instead of the oxygen-absorbing multilayer film having the two-material two-layer structure. Subsequently, a sealed bag was produced as in Example 3-1, and measurement of the oxygen concentration inside the bag, verification of odor after opening of the bag, and measurement of the sealing strength of the bag were performed as in Example 3-1.

Comparative Example 3-6

100 parts by mass of nylon MXD6 (product name: "MX nylon S6011", hereinafter also abbreviated to "N-MXD6", manufactured by Mitsubishi Gas Chemical Company, Inc.) and cobalt(II) stearate giving 0.05 parts by mass of cobalt was melt-kneaded with a twin-screw extruder having two 37-mm diameter screws at 260° C., extruded into a strand from the extruder head, cooled, and then pelletized to obtain an oxygen-absorbing composition.

ing multilayer film, and measurement of the oxygen concentration inside the bag, verification of odor after opening of the bag, and measurement of the sealing strength of the bag were performed as in Example 3-1.

The following table shows the conditions and results of the Examples and the Comparative Examples.

TABLE 7

| | Oxygen-absorbing layer composition/parts by mass | | | Oxygen concentration (vol %)[1] | | Odor | | | Sealing strength (kg/15 mm) | | |
|---|---|---|---|---|---|---|---|---|---|---|---|
| | Thermoplastic resin | Compound having tetralin ring | Transition metal | Relative humidity 100% | Relative humidity 30% | Initial | Relative humidity 100% | Relative humidity 30% | Initial | Relative humidity 100% | Relative humidity 30% |
| Example 3-1 | LLDPE 95 | Diester compound A 5 | Co 0.05 | ≤0.1 | ≤0.1 | No | No | No | 4.8 | 4.9 | 4.7 |
| Example 3-2 | LLDPE 95 | Diester compound B 5 | Co 0.05 | 0.2 | 0.2 | No | No | No | 4.9 | 4.8 | 4.8 |
| Example 3-3 | LLDPE 95 | Diester compound C 5 | Co 0.05 | ≤0.1 | ≤0.1 | No | No | No | 4.8 | 4.7 | 4.9 |
| Example 3-4 | LLDPE 95 | Diester compound D 5 | Co 0.05 | ≤0.1 | ≤0.1 | No | No | No | 5.0 | 4.8 | 4.9 |
| Example 3-5 | LLDPE 95 | Diamide compound E 5 | Co 0.05 | 0.3 | 0.4 | No | No | No | 4.8 | 4.9 | 4.8 |
| Example 3-6 | LLDPE 95 | Acid anhydride F 5 | Co 0.05 | 0.2 | 0.1 | No | No | No | 4.9 | 5.0 | 4.8 |
| Comparative Example 3-1 | LLDPE 100 | — | — | 2.1 | 2.0 | No | No | No | 4.9 | 4.8 | 4.9 |
| Comparative Example 3-2 | LLDPE 100 | — | Co 0.05 | 2.0 | 2.0 | No | No | No | 4.9 | 4.9 | 4.7 |
| Comparative Example 3-3 | LLDPE 100 | Diester compound A 5 | — | 2.0 | 2.0 | No | No | No | 5.0 | 4.9 | 4.9 |
| Comparative Example 3-5 | LLDPE + iron 100 | — | — | ≤0.1 | 1.8 | Slight iron odor | Slight iron odor | Slight iron odor | 5.5 | 5.4 | 5.3 |
| Comparative Example 3-6 | N-MXD6 100 | — | Co 0.05 | ≤0.1 | 1.9 | No | No | No | 5.5 | 2.2 | 5.3 |

[1]Initial oxygen concentration: 2.0%, amount of gas: 50 cc

A three-material three-layer film was formed with a three-material five-layer multilayer film molding apparatus equipped with three extruders, a feed block, a T-die, a cooling roll, a corona discharge unit, a winding unit, and other equipment by extruding LLDPE2 from the first extruder, the oxygen-absorbing composition prepared above from the second extruder, and adhesive polyethylene (product name: "MODIC M545", hereinafter also abbreviated to "adhesive PE", manufactured by Mitsubishi Chemical Corporation) from the third extruder and supplying the extrudates to the feed block. The surface of the oxygen-absorbing layer was treated with corona discharge at a rate of 60 m/min to produce a film roll. The multilayer film had a layer structure composed of oxygen-absorbing layer (30 μm)/adhesive PE (10 μm)/LLDPE (20 μm).

Subsequently, on the corona treated surface of the laminate film, the layers shown below were dry-laminated as in Example 3-1 to prepare a nylon MXD6-based oxygen-absorbing multilayer film composed of alumina-deposited PET film (12 μm)/urethane-based dry-lamination adhesive (3 μm)/nylon 6 film (15 μm)/urethane-based dry-lamination adhesive (3 μm)/oxygen-absorbing layer (30 μm)/adhesive PE (10 μm)/LLDPE (20 μm).

Subsequently, a sealed bag was produced as in Example 3-1 using the resulting nylon MXD6-based oxygen-absorb- As obvious from the table, it was at least observed that the oxygen-absorbing multilayer bodies of the Examples exhibited satisfactory oxygen-absorbing performance under high humidity and under low humidity and no odor was generated and the sealing strength was maintained even after oxygen absorption.

Example 3-7

One surface of a piece of paper having a basis weight of 400 g/m² was treated with corona. A low-density polyethylene (product name: "NOVATEC LD LD602A", hereinafter referred to as "LDPE", manufactured by Japan Polyethylene Corporation) was extruded for lamination at a thickness of 30 μm on the corona-treated surface of the paper with an extrusion laminator composed of an extruder, a T-die, a cooling roll, a corona treatment unit, and a winding unit. The other surface of the paper was then treated with corona to produce a laminate having a structure of LDPE layer/paper base.

Subsequently, a molten multilayer was formed with a coextruding apparatus composed of first to fifth extruders, a feed block, a T-die, a cooling roll, and a winding unit by extruding LDPE from the first extruder, oxygen-absorbing composition A produced in Example 3-1 from the second extruder, adhesive polyethylene (product name: "MODIC L504", hereinafter referred to as "adhesive PE", manufactured by Mitsubishi Chemical Corporation) from the third extruder, nylon MXD6 (product name: "MX nylon S6007", manufactured by Mitsubishi Gas Chemical Company, Inc.) from the fourth extruder, and LDPE from the fifth extruder and supplying the extrudates to the feed block to give a layer structure of LDPE (sealant) layer/oxygen-absorbing layer/adhesive PE layer/N-MXD6 layer/adhesive PE layer/LDPE layer in this order from the surface to be used as the inner side of a container. This molten multilayer was laminated by coextrusion to the paper base provided with LDPE by extrusion lamination in advance such that the molten multilayer was laminated on the corona-treated surface of the LDPE layer to obtain a paper base laminated material. The resulting laminated material had a structure composed of LDPE layer (10 µm)/oxygen-absorbing layer (30 µm)/adhesive PE layer (10 µm)/N-MXD6 layer (10 µm)/adhesive PE layer (10 µm)/LDPE layer (10 µm)/paper base/LDPE layer (30 µm) in this order from the surface that was the inner side of a container.

Subsequently, an anti-heat-sealing agent was applied to the laminated material at a region corresponding to the opening port, and a blank plate was prepared by subjecting the laminated material to ruling and punching with a punching die. The blank plate was subjected to end face processing, and a sleeve was formed by thermal adhesion of the body and was formed into a gable top-type paper container having an inner capacity of 500 mL with a molding and filling machine. The resulting paper container was filled with 500 mL of orange juice and sealed, while performing heat sterilization by hot filling at about 80° C., followed by storage at 25° C. for one month. The flavor and color tone of the orange juice after storage were verified. The flavor and the color tone were satisfactorily maintained.

Comparative Example 3-7

A paper base laminated material and a paper container were produced as in Example 7 except that diester compound A and cobalt stearate were not used, and a storage test of orange juice was performed. The flavor and color tone of the orange juice after storage for one month slightly decreased.

The paper container of Example 3-7 had satisfactory oxygen-absorbing performance, which demonstrated that the flavor and color tone of the contents were maintained even after storage.

Fourth Experiment

Diester compounds A to D having tetralin rings produced in Synthesis Examples 1 to 4 and diamide compound E having a tetralin ring produced in Synthesis Example 5 were used.

Example 4-1

95 parts by mass of a polyethylene terephthalate (product name: "BK-2180", hereinafter referred to as "PET", manufactured by Japan Unipet Co., Ltd.), 5 parts by mass of diester compound A, and cobalt(II) stearate giving 0.05 parts by mass of cobalt were melt-kneaded with a twin-screw extruder having two 37-mm diameter screws at 260° C., extruded into a strand from the extruder head, cooled, and then pelletized to obtain oxygen-absorbing composition (1).

Subsequently, under the following conditions, an injection molded article (parison) having a three-layer structure composed of layer B/oxygen-absorbing layer (layer A)/layer B was molded by injecting thermoplastic resin (b) constituting the layer B from an injection cylinder, then injecting a resin composition constituting the oxygen-absorbing layer (layer A) from another injection cylinder simultaneously with thermoplastic resin (b) constituting the layer B, and then injecting a necessary amount of thermoplastic resin (b) constituting the layer B to fill the cavity. The total mass of the parison was 28 g, and the mass of the layer A was 30% by mass based on the total mass of the parison. The resin composition constituting the oxygen-absorbing layer (layer A) was oxygen-absorbing composition (1), and the thermoplastic resin (b) was PET.
(Shape of Parison)

The parison had a total length of 95 mm, an outer diameter of 22 mm, and a thickness of 2.7 mm. The parison was produced with an injection molding machine (model: M200, providing four parisons, manufactured by Meiki Co., Ltd.).
(Molding Conditions for Parison)

Temperature of injection cylinder for layer A: 270° C.
Temperature of injection cylinder for layer B: 270° C.
Temperature of resin flow path in die: 270° C.
Temperature of cooling water for die: 15° C.

The resulting parison was cooled and was applied to secondary processing to produce a bottle by heating the parison and performing biaxial stretching blow molding.
(Shape of Bottle Prepared by Secondary Processing)

The bottle had a total length of 160 mm, an outer diameter of 60 mm, an internal volume of 350 mL, and a thickness of 0.40 mm. The stretching ratios were 1.9 times in the machine direction and 2.7 times in the transverse direction. The bottom shape was of a champagne type. The body had a dimple. The secondary processing was performed with a blow molding machine (model: EFB1000ET, manufactured by Frontier, Inc.).
(Secondary Processing Conditions)

Parison-heating temperature: 102° C.
Pressure for stretching rod: 0.5 MPa
Primary blow pressure: 0.7 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Die temperature: 30° C.
[Evaluation of Bottle Performance]

The resulting bottle was evaluated through measurement of the oxygen transmission rate, verification of visibility of the contents, and an odor test in accordance with the following methods and criteria.
(1) Measurement of Oxygen Transmission Rate of Bottle The oxygen transmission rate was measured on the 30th day from the start of the measurement in an atmosphere of a temperature of 23° C. and relative humidities of 50% (outside the bottle) and 100% (inside the bottle) with an oxygen transmission rate measurement apparatus ("OX-TRAN 2-21 ML", manufactured by MOCON, Inc.). A lower measurement value indicates a higher oxygen barrier property. The detection lower limit is an oxygen transmission rate of $5 \times 10^{-5}$ cc/(package-day-0.21 atm). The oxygen transmission rate was measured in accordance with ASTM D3985.

(2) Visibility of Content in Bottle

The visibility of the contents of the resulting bottle was visually observed.

(3) Odor Test (Odor)

The resulting bottle was filled with 350 mL of distilled water and was sealed with a polyethylene lid. The bottle was stored in an atmosphere of a temperature of 40° C. and a relative humidity of 90%, and the odor of the distilled water was then verified.

Example 4-2

An oxygen-absorbing multilayer bottle was produced as in Example 4-1 except that diester compound B was used instead of diester compound A. The oxygen transmission rate was measured, and the visibility and odor of the contents were verified.

Example 4-3

An oxygen-absorbing multilayer bottle was produced as in Example 4-1 except that diester compound C was used instead of diester compound A. The oxygen transmission rate was measured, and the visibility and odor of the contents were verified.

Example 4-4

An oxygen-absorbing multilayer bottle was produced as in Example 4-1 except that diester compound D was used instead of diester compound A. The oxygen transmission rate was measured, and the visibility and odor of the contents were verified.

Example 4-5

An oxygen-absorbing multilayer bottle was produced as in Example 4-1 except that diamide compound E was used instead of diester compound A. The oxygen transmission rate was measured, and the visibility and odor of the contents were verified.

Comparative Example 4-1

A monolayer bottle having the same shape as that in Example 4-1 was produced using PET. The oxygen transmission rate was measured, and the visibility and odor of the contents were verified.

Comparative Example 4-2

An oxygen-absorbing multilayer bottle was produced as in Example 4-1 except that diester compound A was not used. The oxygen transmission rate was measured, and the visibility and odor of the contents were verified.

Comparative Example 4-3

An oxygen-absorbing multilayer bottle was produced as in Example 4-1 except that cobalt(II) stearate was not used. The oxygen transmission rate was measured, and the visibility and odor of the contents were verified.

The following table shows the conditions and the evaluation results of the Examples and the Comparative Examples.

TABLE 8

| | | Inner and | Oxygen-absorbing layer composition/parts by mass | | | Oxygen transmission rate | Visibility | |
|---|---|---|---|---|---|---|---|---|
| | Layer structure | outer layer resin | Thermoplastic resin | Compound having tetralin ring | Transition metal | (cc/package · day · 0.21 atm) | of contents | Odor |
| Example 4-1 | Three-layer | PET | PET (95) | Diester compound A (5) | Co (0.05) | 0.010 | Good | No |
| Example 4-2 | Three-layer | PET | PET (95) | Diester compound B (5) | Co (0.05) | 0.015 | Good | No |
| Example 4-3 | Three-layer | PET | PET (95) | Diester compound C (5) | Co (0.05) | 0.009 | Good | No |
| Example 4-4 | Three-layer | PET | PET (95) | Diester compound D (5) | Co (0.05) | 0.008 | Good | No |
| Example 4-5 | Three-layer | PET | PET (95) | Diamide compound E (5) | Co (0.05) | 0.018 | Good | No |
| Comparative Example 4-1 | Monolayer | | PET monolayer bottle | | | 0.040 | Good | No |
| Comparative Example 4-2 | Three-layer | PET | PET (100) | — | Co (0.05) | 0.041 | Good | No |
| Comparative Example 4-3 | Three-layer | PET | PET (95) | Diester compound A (5) | — | 0.040 | Good | No |

Example 4-6

95 parts by mass of an ethylene-vinyl alcohol copolymer (product name: "EVAL L171B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain an oxygen-absorbing composition (2).

Subsequently, under the following conditions, an injection molded cup having a three-layer structure composed of layer B/oxygen-absorbing layer (layer A)/layer B was molded by injecting thermoplastic resin (b) constituting the layer B from an injection cylinder, then injecting a resin composition constituting the oxygen-absorbing layer (layer A) from another injection cylinder simultaneously with injection of thermoplastic resin (b) constituting the layer B, and then injecting a necessary amount of thermoplastic resin (b) constituting the layer B to fill the cavity. The total mass of the injection cup was 31 g, and the mass of the layer A was 20% by mass based on the total mass of the injection cup. The resin composition constituting the oxygen-absorbing layer (layer A) was oxygen-absorbing composition (2), and the thermoplastic resin (b) was polypropylene (product name: "NOVATEC PP MG03B", hereinafter also abbreviated to "PP", manufactured by Japan Polypropylene Corporation).

(Shape of Cup)

The cup had a total length of 125 mm, a bottom diameter of 52 mm, a flange outside diameter of 70 mm, a flange inside diameter of 62 mm, a thickness of 1.1 mm, and an internal volume of 320 mL. The cup was produced with an injection molding machine (model: M200, providing four cups, manufactured by Meiki Co., Ltd.).

(Molding Conditions for Cup)

Temperature of injection cylinder for layer A: 220° C.
Temperature of injection cylinder for layer B: 220° C.
Temperature of resin flow path in die: 220° C.
Temperature of cooling water for die: 15° C.

[Evaluation of Cup Performance]

The resulting cup was evaluated through measurement of the oxygen transmission rate, measurement of the oxygen concentration inside the sealed container after sealed storage, and an odor test in accordance with the following methods and criteria.

(1) Oxygen Transmission Rate of Cup

The oxygen transmission rate of the resulting cup was measured as in Example 4-1.

(2) Measurement of Oxygen Concentration Inside Sealed Container

The resulting cup was filled with 200 g of a humidity conditioning agent to adjust the relative humidity inside the container to 100% or 30%. An aluminum foil laminate film was used as a top film, and the initial oxygen concentration was adjusted to 2 vol % by nitrogen purge. The cup was sealed and was stored at 23° C. and a relative humidity of 50%. The oxygen concentration inside the container was measured after one month.

(3) Odor Test

The aluminum foil laminate film of the sealed container after measurement of the oxygen concentration inside the sealed container was opened, and the odor inside the container was verified. The odor was evaluated for whether or not the container itself had an odor and for whether or not the odor changed after oxygen absorption. When the container itself had no odor and when the odor did not change after oxygen absorption, the container was considered "no odor inside container".

Example 4-7

An oxygen-absorbing multilayer cup was produced as in Example 4-6 except that diester compound B was used instead of diester compound A. The oxygen transmission rate and the oxygen concentration inside the sealed container were measured, and the odor was verified. No interlayer peeling of the cup was observed when the aluminum foil laminate film of the sealed container was opened.

Example 4-8

An oxygen-absorbing multilayer cup was produced as in Example 4-6 except that diester compound C was used instead of diester compound A. The oxygen transmission rate and the oxygen concentration inside the sealed container were measured, and the odor was verified. No interlayer peeling of the cup was observed when the aluminum foil laminate film of the sealed container was opened.

Example 4-9

An oxygen-absorbing multilayer cup was produced as in Example 4-6 except that diester compound D was used instead of diester compound A. The oxygen transmission rate and the oxygen concentration inside the sealed container were measured, and the odor was verified. No interlayer peeling of the cup was observed when the aluminum foil laminate film of the sealed container was opened.

Example 4-10

An oxygen-absorbing multilayer cup was produced as in Example 4-6 except that diamide compound E was used instead of diester compound A. The oxygen transmission rate and the oxygen concentration inside the sealed container were measured, and the odor was verified. No interlayer peeling of the cup was observed when the aluminum foil laminate film of the sealed container was opened.

Comparative Example 4-4

A multilayer cup was produced as in Example 4-6 except that diester compound A and cobalt stearate were not used. The oxygen transmission rate and the oxygen concentration inside the sealed container were measured, and the odor was verified. No interlayer peeling of the cup was observed when the aluminum foil laminate film of the sealed container was opened.

Comparative Example 4-5

A multilayer cup was produced as in Example 4-6 except that cobalt stearate was not used. The oxygen transmission rate and the oxygen concentration inside the sealed container were measured, and the odor was verified. No interlayer peeling of the cup was observed when the aluminum foil laminate film of the sealed container was opened.

Comparative Example 4-6

A multilayer cup was produced as in Example 4-6 except that diester compound A was not used. The oxygen transmission rate and the oxygen concentration inside the sealed container were measured, and the odor was verified. No interlayer peeling of the cup was observed when the aluminum foil laminate film of the sealed container was opened.

Comparative Example 4-7

An oxygen-absorbing multilayer cup was produced as in Example 4-6 except that nylon MXD6 (product name: "MX nylon S6011", hereinafter also abbreviated to "N-MXD6", manufactured by Mitsubishi Gas Chemical Company Inc.) was used instead of EVOH and that diester compound A was not used. The oxygen transmission rate and the oxygen concentration inside the sealed container were measured, and the odor was verified. The sealed container absorbed oxygen at a relative humidity of 100% of the inside of the container and thereby caused oxidative decomposition of the oxygen-absorbing layer (N-MXD6 layer), resulting in a reduction in strength and occurrence of interlayer peeling of the cup when the aluminum foil laminate film was opened.

The following table shows the conditions and results of the Examples and the Comparative Examples.

TABLE 9

| | Layer structure | Inner and outer layer resin | Oxygen-absorbing layer composition/parts by mass | | | Oxygen transmission rate[1] (cc/package · day · 0.21 atm) | Oxygen concentration inside container (vol %) Relative humidity inside container | | Odor inside container Relative humidity inside container | |
|---|---|---|---|---|---|---|---|---|---|---|
| | | | Thermoplastic resin | Compound having tetralin ring | Transition metal | | 30% | 100% | 30% | 100% |
| Example 4-6 | Three-layer | PP | EVOH (95) | Diester compound A (5) | Co (0.05) | Undetectable | ≤0.1 | ≤0.1 | No | No |
| Example 4-7 | Three-layer | PP | EVOH (95) | Diester compound B (5) | Co (0.05) | Undetectable | 0.3 | 0.4 | No | No |
| Example 4-8 | Three-layer | PP | EVOH (95) | Diester compound C (5) | Co (0.05) | Undetectable | ≤0.1 | ≤0.1 | No | No |
| Example 4-9 | Three-layer | PP | EVOH (95) | Diester compound D (5) | Co (0.05) | Undetectable | ≤0.1 | ≤0.1 | No | No |
| Example 4-10 | Three-layer | PP | EVOH (95) | Diamide compound E (5) | Co (0.05) | Undetectable | 0.5 | 0.5 | No | No |
| Comparative Example 4-4 | Three-layer | PP | EVOH (100) | — | — | 0.0005 | 2.1 | 2.5 | No | No |
| Comparative Example 4-5 | Three-layer | PP | PET (100) | — | Co (0.05) | 0.0005 | 2.2 | 2.4 | No | No |
| Comparative Example 4-6 | Three-layer | PP | PET (95) | Diester compound A (5) | — | 0.0005 | 2.1 | 2.5 | No | No |
| Comparative Example 4-7 | Three-layer | PP | N-MXD6 (100) | — | Co (0.05) | Undetectable | 1.8 | 0.5 | No | No |

[1]Detection lower limit: $5 \times 10^{-5}$ cc/package-day · 0.21 atm

The containers of the Examples absorbed oxygen by the oxygen-absorbing layers and reduced the oxygen transmission rates, compared to those in the Comparative Examples. The strength was maintained even after oxygen absorption, and occurrence of odor was prevented.

Fifth Experiment

Diester compounds A to D having tetralin rings produced in Synthesis Examples 1 to 4, diamide compound E having a tetralin ring produced in Synthesis Example 5, and acid anhydride F having a tetralin ring produced in Synthesis Example 6 were used.

Example 5-1

95 parts by mass of an ethylene-vinyl alcohol copolymer (product name: "EVAL L171B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain oxygen-absorbing composition (1).

An three-material five-layer oxygen-absorbing multilayer sheet was produced with a multilayer sheet molding apparatus composed of three extruders, a feed block, a T-die, a cooling roll, and a winding unit by extruding a cycloolefin copolymer (product name: "TOPAS8007-F", hereinafter also abbreviated to "COC", manufactured by TOPAS ADVANCED POLYMERS) as the material for the thermoplastic resin layer from the first extruder, maleic anhydride-modified polyolefin (product name: "ADMER QF551", manufactured by Mitsui Chemicals Inc.) as the material for the adhesive layer from the second extruder, and oxygen-absorbing composition (1) as the material for the oxygen-absorbing layer from the third extruder and supplying the extrudates to the feed block. The resulting multilayer sheet had a layer structure of COC layer (100 μm)/adhesive layer (10 μm)/oxygen-absorbing layer (100 μm)/adhesive layer (10 μm)/COC layer (100 μm). The numeric characters shown with a unit of μm in the parentheses refer to the thickness.

The resulting oxygen-absorbing sheet was produced into an oxygen-absorbing bottom member by plug assist pressure forming with a blister pack producing apparatus (trade name "FBP-M2") manufactured by CKD Corporation. The number of shots in molding was fixed to 50 shots per minute. The oxygen-absorbing bottom member had dimensions of a bottom diameter of 10 mm, an upper (opening) diameter of 9 mm, and a depth of 4 mm.

Separately, the following layers were laminated by extrusion lamination to produce a gas barrier lid member composed of aluminum foil (20 μm)/urethane-based adhesive (product name: AD502/CAT10L", manufactured by Toyo-Morton, Ltd., 2 μm)/CPP film (product name: "Pylen Film-CT P1128", manufactured by Toyobo Co., Ltd., 25 μm).

Tablets each containing 20 mg of tocopherol acetate and having a diameter of 7 mm and a thickness of 3 mm were accommodated in the resulting oxygen-absorbing bottom member, and the COC layer of the oxygen-absorbing bottom member and the CPP film of the gas barrier lid member were then heat-sealed to prepare a sealed oxygen-absorbing PTP packaging body accommodating the tablet. The accommodated tablet was visible from the oxygen-absorbing bottom member side. The sealed PTP packaging body was stored in an environment of 40° C. and 60% RH, and the tocopherol acetate retention rate was measured after storage for six months in accordance with the quantitative measurement described in the Japanese Pharmacopoeia. The three-material five-layer oxygen-absorbing multilayer sheet was subjected to the following elution test.

(Elution Test)

The resulting oxygen-absorbing multilayer sheet was cut into a size of 1 cm×1 cm to prepare ten pieces of the oxygen-absorbing multilayer sheet. The ten pieces of the oxygen-absorbing multilayer sheet were stored in an environment of 40° C. and 90% RH for one month and were then immersed in 50 mL of pure water. The oxygen-absorbing multilayer sheet immersed in pure water was stored at 40° C. and 60% RH for four months, and the total amount of carbon (hereinafter also abbreviated to "TOC") in the pure water was measured.
(TOC Measurement)
Apparatus: TOC-VCPH manufactured by Shimadzu Corporation
Temperature of combustion furnace: 720° C.
Gas/flow rate: high purity air, 150 mL/min at TOC meter portion
Amount injected: 150 μL
Detection limit: 1 μg/mL

Example 5-2

An oxygen-absorbing multilayer sheet and an oxygen-absorbing PTP packaging body were produced as in Example 5-1 except that diester compound B was used instead of diester compound A, and were evaluated as in Example 5-1.

Example 5-3

An oxygen-absorbing multilayer sheet and an oxygen-absorbing PTP packaging body were produced as in Example 5-1 except that diester compound C was used instead of diester compound A, and were evaluated as in Example 5-1.

Example 5-4

An oxygen-absorbing multilayer sheet and an oxygen-absorbing PTP packaging body were produced as in Example 5-1 except that diester compound D was used instead of diester compound A, and were evaluated as in Example 5-1.

Example 5-5

An oxygen-absorbing multilayer sheet and an oxygen-absorbing PTP packaging body were produced as in Example 5-1 except that diamide compound E was used instead of diester compound A, and were evaluated as in Example 5-1.

Example 5-6

An oxygen-absorbing multilayer sheet and an oxygen-absorbing PTP packaging body were produced as in Example 5-1 except that acid anhydride F was used instead of diester compound A, and were evaluated as in Example 5-1.

Comparative Example 5-1

An oxygen-absorbing multilayer sheet and an oxygen-absorbing PTP packaging body were produced as in Example 5-1 except that a COC monolayer sheet of 340 μm was used instead of the multilayer sheet, and were evaluated as in Example 5-1.

Comparative Example 5-2

An oxygen-absorbing multilayer sheet and an oxygen-absorbing PTP packaging body were produced as in Example 5-1 except that diester compound A and cobalt(II) stearate were not used, and were evaluated as in Example 5-1.

The following table shows the conditions and results of the Examples and the Comparative Examples.

TABLE 10

|  | Layer structure | Inner and outer layer resin | Thermoplastic resin | Compound having tetralin ring (parts by mass) | Tocopherol acetate retention rate (%) | Amount of TOC in elution test [1] (μg/mL) |
| --- | --- | --- | --- | --- | --- | --- |
| Example 5-1 | Five-layer | COC | EVOH 95 | Diester compound A 5 | 96 | Undetectable |
| Example 5-2 | Five-layer | COC | EVOH 95 | Diester compound B 5 | 93 | Undetectable |
| Example 5-3 | Five-layer | COC | EVOH 95 | Diester compound C 5 | 95 | Undetectable |
| Example 5-4 | Five-layer | COC | EVOH 95 | Diester compound D 5 | 97 | Undetectable |
| Example 5-5 | Five-layer | COC | EVOH 95 | Diamide compound E 5 | 87 | Undetectable |
| Example 5-6 | Five-layer | COC | EVOH 95 | Acid anhydride F 5 | 89 | Undetectable |
| Comparative Example 5-1 | Monolayer | COC | COC 100 | — | 37 | Undetectable |
| Comparative Example 5-2 | Five-layer | COC | EVOH 100 | — | 59 | Undetectable |

[1] Detection lower limit: 0.1 μg/mL

As obvious from the table, the oxygen-absorbing PTP packaging body of each Example had a satisfactory oxygen barrier property and showed satisfactory storage performance for a medicinal tablet even after long-term storage. In addition, the TOC was undetectable in the elution test of the oxygen-absorbing multilayer sheet, which at least demonstrated a high safety of the oxygen-absorbing PTP packaging body.

Sixth Experiment

Diester compounds A to D having tetralin rings produced in Synthesis Examples 1 to 4 and diamide compound E having a tetralin ring produced in Synthesis Example 5 were used.

Example 6-1

95 parts by mass of an ethylene-vinyl alcohol copolymer (product name: "EVAL SP521B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain an oxygen-absorbing composition.

An oxygen-absorbing multilayer sheet was formed with a three-material five-layer multilayer sheet molding apparatus equipped with first to third extruders, a feed block, a T-die, a cooling roll, and a sheet take-up unit by extruding polypropylene (product name: "NOVATEC PP FY6C", hereinafter also abbreviated to "PP1", manufactured by Japan Polypropylene Corporation) from the first extruder, the oxygen-absorbing composition from the second extruder, and adhesive polypropylene (product name: "MODIC P604V", hereinafter also abbreviated to "adhesive PP", manufactured by Mitsubishi Chemical Corporation) from the third extruder and supplying the extrudates to the feed block. The multilayer sheet had a layer structure composed of PP1 (400 μm)/adhesive PP (15 μm)/oxygen-absorbing layer (100 μm)/adhesive PP (15 μm)/PP1 (400 μm) in this order from the inner layer. The numeric characters shown with a unit of μm in the parentheses refer to the thickness. The same applies to the following Examples unless specifically indicated otherwise.

Subsequently, the resulting oxygen-absorbing multilayer sheet was thermoformed into a tray-shaped oxygen-absorbing multilayer container having an internal volume of 400 cc and a surface area of 200 cm² with a vacuum molding apparatus equipped with a plug assist.

In the resulting oxygen-absorbing multilayer container, 110 g of washed rice and 90 g of sterilized water were placed. The oxygen inside the container was purged with a nitrogen gas to reduce the oxygen concentration to 0.2 vol %. Subsequently, the container was sealed by heat sealing using a gas barrier film (product name: "EVAL EFCR-15", manufactured by Kuraray Co., Ltd.) as the lid member. This container was placed in an autoclave pot and was subjected to heating rice cooking at 105° C. for 40 min. After cooling, the oxygen concentration inside the container was measured, and the container was stored under conditions of 23° C. and 50% RH. The oxygen concentration inside the container was measured again three months after the start of storage, and the container was opened to verify the flavor of the cooked rice.

Example 6-2

An oxygen-absorbing multilayer container was produced as in Example 6-1 except that diester compound B was used instead of diester compound A and was subjected to a storage test as in Example 6-1.

Example 6-3

An oxygen-absorbing multilayer container was produced as in Example 6-1 except that diester compound C was used instead of diester compound A and was subjected to a storage test as in Example 6-1.

Example 6-4

An oxygen-absorbing multilayer container was produced as in Example 6-1 except that diester compound D was used instead of diester compound A and was subjected to a storage test as in Example 6-1.

Example 6-5

An oxygen-absorbing multilayer container was produced as in Example 6-1 except that diamide compound E was used instead of diester compound A and was subjected to a storage test as in Example 6-1.

Comparative Example 6-1

A multilayer sheet and a multilayer container were produced as in Example 6-1 except that diester compound A was not used and were subjected to a storage test as in Example 6-1.

The following table shows the conditions and results of the Examples and the Comparative Examples.

TABLE 11

| | Oxygen-absorbing layer composition (parts by mass) | | | After heating and cooking rice and cooling rice | After storage for 3 months [1)] | |
|---|---|---|---|---|---|---|
| | Thermoplastic resin | Compound having tetralin ring | Transition metal | Oxygen concentration inside container (%) | Oxygen concentration inside container (%) | Flavor of cooked rice [2)] |
| Example 6-1 | 95 (EVOH) | 5 (Diester compound A) | 0.05 (Co) | 3.5 | 0.2 | ◎ |
| Example 6-2 | 95 (EVOH) | 5 (Diester compound B) | 0.05 (Co) | 3.6 | 0.4 | ◎ |
| Example 6-3 | 95 (EVOH) | 5 (Diester compound C) | 0.05 (Co) | 3.8 | 0.5 | ◎ |
| Example 6-4 | 95 (EVOH) | 5 (Diester compound D) | 0.05 (Co) | 3.5 | 0.2 | ◎ |
| Example 6-5 | 95 (EVOH) | 5 (Diamide compound E) | 0.05 (Co) | 3.8 | 1.2 | ○ |
| Comparative Example 6-1 | 100 (EVOH) | — | — | 4.2 | 6.0 | X |

[1)] Stored at a temperature of 23° C. and a relative humidity of 50%
[2)] ◎: good, ○: almost good, X: deteriorated As obvious from the table, it was at least observed that the oxygen-absorbing multilayer containers of the Examples had excellent oxygen-absorbing performance and satisfactorily maintained the flavor of cooked rice and were suitable for storage of cooked rice.

Seventh Experiment

Diester compounds A to D having tetralin rings produced in Synthesis Examples 1 to 4 and diamide compound E having a tetralin ring produced in Synthesis Example 5 were used.

Example 7-1

95 parts by mass of a polyethylene terephthalate (product name: "BK-2180", hereinafter referred to as "PET", manufactured by Japan Unipet Co., Ltd.), 5 parts by mass of diester compound A, and cobalt(II) stearate giving 0.05 parts by mass of cobalt were melt-kneaded with a twin-screw extruder having two 37-mm diameter screws at 270° C., extruded into a strand from the extruder head, cooled, and then pelletized to obtain an oxygen-absorbing composition.

Subsequently, under the following conditions, an injection molded article (parison) having a three-layer structure composed of layer B/oxygen-absorbing layer (layer A)/layer B was molded by injecting thermoplastic resin (b) constituting the layer B from an injection cylinder, then injecting a resin composition constituting the oxygen-absorbing layer (layer A) from another injection cylinder simultaneously with thermoplastic resin (b) constituting the layer B, and then injecting a necessary amount of thermoplastic resin (b) constituting the layer B to fill the cavity. The total mass of the parison was 28 g, and the mass of the layer A was 30% by mass based on the total mass of the parison. The resin composition constituting the oxygen-absorbing layer (layer A) was oxygen-absorbing composition, and the thermoplastic resin (b) was PET.

(Shape of Parison)

The parison had a total length of 95 mm, an outer diameter of 22 mm, and a thickness of 2.7 mm. The parison was produced with an injection molding machine (model: M200, providing four parisons, manufactured by Meiki Co., Ltd.).

(Molding Conditions for Parison)
Temperature of injection cylinder for layer A: 270° C.
Temperature of injection cylinder for layer B: 270° C.
Temperature of resin flow path in die: 270° C.
Temperature of cooling water for die: 15° C.

The resulting parison was cooled and was applied to secondary processing to produce a bottle by heating the parison and performing biaxially stretching blow molding.

(Shape of Bottle Prepared by Secondary Processing)

The bottle had a total length of 160 mm, an outer diameter of 60 mm, an internal volume of 350 mL, and a thickness of 0.40 mm. The stretching ratios were 1.9 times in the machine direction and 2.7 times in the transverse direction. The bottom shape was of a champagne type. The body had a dimple. The secondary processing was performed with a blow molding machine (model: EFB1000ET, manufactured by Frontier, Inc.).

(Secondary Processing Conditions)
Parison-heating temperature: 102° C.
Pressure for stretching rod: 0.5 MPa
Primary blow pressure: 0.7 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Die temperature: 30° C.

The resulting oxygen-absorbing multilayer bottle was filled with 350 mL of *Awamori*, an alcoholic beverage, and was sealed, followed by storage at 35° C. The flavor of the *Awamori* was verified 30 days, 45 days, and 60 days after the start of the storage.

Example 7-2

An oxygen-absorbing multilayer bottle was produced as in Example 7-1 except that diester compound B was used instead of diester compound A and was subjected to a storage test as in Example 7-1.

Example 7-3

An oxygen-absorbing multilayer bottle was produced as in Example 7-1 except that diester compound C was used instead of diester compound A and was subjected to a storage test as in Example 7-1.

Example 7-4

An oxygen-absorbing multilayer bottle was produced as in Example 7-1 except that diester compound D was used instead of diester compound A and was subjected to a storage test as in Example 7-1.

Example 7-5

An oxygen-absorbing multilayer bottle was produced as in Example 7-1 except that diamide compound E was used instead of diester compound A and was subjected to a storage test as in Example 7-1.

Comparative Example 7-1

A monolayer bottle having the same shape as that in Example 7-1 was produced using PET and subjected to a storage test as in Example 7-1.

The following table shows the conditions and results of the Examples and the Comparative Examples.

TABLE 12

| | Layer structure | Inner and outer layer resin | Thermoplastic resin | Compound having tetralin ring | Transition metal | After 30 days | After 45 days | After 60 days |
|---|---|---|---|---|---|---|---|---|
| | | | Oxygen-absorbing layer composition/parts by mass | | | Flavor[1) | | |
| Example 7-1 | Three-layer | PET | 95 (PET) | 5 (Diester compound A) | 0.05 (Co) | ◎ | ◎ | ◎ |
| Example 7-2 | Three-layer | PET | 95 (PET) | 5 (Diester compound B) | 0.05 (Co) | ◎ | ◎ | ○ |
| Example 7-3 | Three-layer | PET | 95 (PET) | 5 (Diester compound C) | 0.05 (Co) | ◎ | ◎ | ◎ |
| Example 7-4 | Three-layer | PET | 95 (PET) | 5 (Diester compound D) | 0.05 (Co) | ◎ | ◎ | ◎ |

TABLE 12-continued

| | Layer structure | Inner and outer layer resin | Oxygen-absorbing layer composition/parts by mass | | Flavor[1] | | |
| | | | Thermoplastic resin | Compound having tetralin ring | Transition metal | After 30 days | After 45 days | After 60 days |
|---|---|---|---|---|---|---|---|---|
| Example 7-5 | Three-layer | PET | 95 (PET) | 5 (Diamide compound E) | 0.05 (Co) | ◎ | ◎ | ○ |
| Comparative Example 7-1 | Monolayer | | PET monolayer bottle | | | ○ | ○ | X |

[1] ◎: good, ○: almost good, X: deteriorated

As obvious from the table, it was at least observed that the oxygen-absorbing multilayer containers of the Examples had excellent oxygen-absorbing performance, satisfactorily maintained the flavor of *Awamori*, and were suitable for storage of *Awamori*.

In contrast, the PET monolayer bottle evaluated in Comparative Example 7-1 did not show an oxygen-absorbing function to significantly reduce the flavor of *Awamori*.

Eighth Experiment

Diester compounds A to D having tetralin rings produced in Synthesis Examples 1 to 4 and diamide compound E having a tetralin ring produced in Synthesis Example 5 were used.

Example 8-1

95 parts by mass of a polyethylene terephthalate (product name: "BK-2180", hereinafter referred to as "PET", manufactured by Japan Unipet Co., Ltd.), 5 parts by mass of diester compound A, and cobalt(II) stearate giving 0.05 parts by mass of cobalt were melt-kneaded with a twin-screw extruder having two 37-mm diameter screws at 270° C., extruded into a strand from the extruder head, cooled, and then pelletized to obtain an oxygen-absorbing composition.

Subsequently, under the following conditions, an injection molded article (parison) having a three-layer structure composed of layer B/oxygen-absorbing layer (layer A)/layer B was molded by injecting thermoplastic resin (b) constituting the layer B from an injection cylinder, then injecting a resin composition constituting the oxygen-absorbing layer (layer A) from another injection cylinder simultaneously with thermoplastic resin (b) constituting the layer B, and then injecting a necessary amount of thermoplastic resin (b) constituting the layer B to fill the cavity. The total mass of the parison was 28 g, and the mass of the layer A was 30% by mass based on the total mass of the parison. The resin composition constituting the oxygen-absorbing layer (layer A) was oxygen-absorbing composition, and the thermoplastic resin (b) was PET.

(Shape of Parison)

The parison had a total length of 95 mm, an outer diameter of 22 mm, and a thickness of 2.7 mm. The parison was produced with an injection molding machine (model: M200, providing four parisons, manufactured by Meiki Co., Ltd.).

(Molding Conditions for Parison)
Temperature of injection cylinder for layer A: 270° C.
Temperature of injection cylinder for layer B: 270° C.
Temperature of resin flow path in die: 270° C.
Temperature of cooling water for die: 15° C.

The resulting parison was cooled and was applied to secondary processing to produce a bottle by heating the parison and performing biaxially stretching blow molding.

(Shape of Bottle Prepared by Secondary Processing)

The bottle had a total length of 160 mm, an outer diameter of 60 mm, an internal volume of 350 mL, and a thickness of 0.40 mm. The stretching ratios were 1.9 times in the machine direction and 2.7 times in the transverse direction. The bottom shape was of a champagne type. The body had a dimple. The secondary processing was performed with a blow molding machine (model: EFB1000ET, manufactured by Frontier, Inc.).

(Secondary Processing Conditions)
Parison-heating temperature: 102° C.
Pressure for stretching rod: 0.5 MPa
Primary blow pressure: 0.7 MPa
Secondary blow pressure: 2.5 MPa
Primary blow delay time: 0.30 sec
Primary blow time: 0.30 sec
Secondary blow time: 2.0 sec
Blow exhaust time: 0.6 sec
Die temperature: 30° C.

The resulting oxygen-absorbing multilayer bottle was filled with 350 mL of orange juice and was sealed, followed by storage at 35° C. The flavor of the orange juice was then verified 30 days, 45 days, and 60 days after the start of the storage.

Example 8-2

An oxygen-absorbing multilayer bottle was produced as in Example 8-1 except that diester compound B was used instead of diester compound A and was subjected to a storage test as in Example 8-1.

Example 8-3

An oxygen-absorbing multilayer bottle was produced as in Example 8-1 except that diester compound C was used instead of diester compound A and was subjected to a storage test as in Example 8-1.

Example 8-4

An oxygen-absorbing multilayer bottle was produced as in Example 8-1 except that diester compound D was used instead of diester compound A and was subjected to a storage test as in Example 8-1.

Example 8-5

An oxygen-absorbing multilayer bottle was produced as in Example 8-1 except that diamide compound E was used instead of diester compound A and was subjected to a storage test as in Example 8-1.

Comparative Example 8-1

A monolayer bottle having the same shape as that in Example 8-1 was produced using PET and was subjected to a storage test as in Example 8-1.

The following table shows the conditions and results of the Examples and the Comparative Examples.

Chemicals Inc.) as the material for the adhesive layer from the extruder of 40 mm in diameter. The numeric characters shown with a unit of μm in the parentheses refer to the thickness.

The resulting oxygen-absorbing multilayer film was produced into a three-side sealed bag of 220 mm×300 mm. The three-side sealed bag was filled with 1000 cc of a 50% glucose solution and was then sealed. The thus-prepared sealed bag was treated with heat at 121° C. for 20 min and was then stored in an environment of 40° C. and 60% RH for

TABLE 13

| | | | Oxygen-absorbing layer composition/parts by mass | | | Flavor[1] | | |
|---|---|---|---|---|---|---|---|---|
| | Layer structure | Inner and outer layer resin | Thermoplastic resin | Compound having tetralin ring | Transition metal | After 30 days | After 45 days | After 60 days |
| Example 8-1 | Three-layer | PET | 95 (PET) | 5 (Diester compound A) | 0.05 (Co) | ◎ | ◎ | ◎ |
| Example 8-2 | Three-layer | PET | 95 (PET) | 5 (Diester compound B) | 0.05 (Co) | ◎ | ◎ | ◎ |
| Example 8-3 | Three-layer | PET | 95 (PET) | 5 (Diester compound C) | 0.05 (Co) | ◎ | ◎ | ◎ |
| Example 8-4 | Three-layer | PET | 95 (PET) | 5 (Diester compound D) | 0.05 (Co) | ◎ | ◎ | ◎ |
| Example 8-5 | Three-layer | PET | 95 (PET) | 5 (Diamide compound E) | 0.05 (Co) | ◎ | ◎ | ○ |
| Comparative Example 8-1 | Monolayer | | PET monolayer bottle | | | ○ | ○ | X |

[1] ◎: good, ○: almost good, X: deteriorated

As obvious from the table, it was at least observed that the oxygen-absorbing multilayer containers of the Examples had excellent oxygen-absorbing performance, satisfactorily maintained the flavor of orange juice, and were suitable for storage of fruit juice and/or vegetable juice.

Ninth Experiment

Diester compounds A to D having tetralin rings produced in Synthesis Examples 1 to 4, diamide compound E having a tetralin ring produced in Synthesis Example 5, and acid anhydride F having a tetralin ring produced in Synthesis Example 6 were used.

Example 9-1

95 parts by mass of an ethylene-vinyl alcohol copolymer (product name: "EVAL L171B", hereinafter also abbreviated to "EVOH", manufactured by Kuraray Co., Ltd.), 5 parts by mass of diester compound A, and cobalt(II) stearate giving 0.05 parts by mass of cobalt were melt-kneaded with a twin-screw extruder having two 37-mm diameter screws at 220° C., extruded into a strand from the extruder head, cooled, and then pelletized to obtain oxygen-absorbing composition (1).

Subsequently, an oxygen-absorbing multilayer film composed of PP layer (60 μm)/adhesive layer (5 μm)/oxygen-absorbing resin layer (30 μm)/adhesive layer (5 μm)/PP layer (60 μm) was produced by an inflation process using a three-material five-layer film molding apparatus assembled from two extruders of 50 mm in diameter and an extruder of 40 mm in diameter by coextruding polypropylene (product name: "NOVATEC PP, FG3DC", hereinafter also abbreviated to "PP", manufactured by Japan Polypropylene Corporation) from the first extruder of 50 mm in diameter, oxygen-absorbing composition (1) from the second extruder of 50 mm in diameter, and maleic anhydride-modified polyolefin (product name: "ADMER QF551", manufactured by Mitsui one month. The glucose retention rate after the storage was measured in accordance with the quantitative measurement described in the Japanese Pharmacopoeia. The oxygen-absorbing multilayer film was subjected to the following elution test.

(Elution Test)

The resulting oxygen-absorbing multilayer sheet was cut into a size of 1 cm×1 cm to prepare ten pieces of the oxygen-absorbing multilayer sheet. The ten pieces of the oxygen-absorbing multilayer sheet were stored in an environment of 40° C. and 90% RH for one month and were then immersed in 50 mL of pure water. The oxygen-absorbing multilayer sheet immersed in pure water was stored at 40° C. and 60% RH for four months, and the total amount of carbon (hereinafter also abbreviated to "TOC") in the pure water was measured.

(TOC Measurement)

Apparatus: TOC-VCPH manufactured by Shimadzu Corporation

Temperature of combustion furnace: 720° C.

Gas/flow rate: high purity air, 150 mL/min at TOC meter portion

Amount injected: 150 μL

Detection limit: 1 μg/mL

Example 9-2

An oxygen-absorbing multilayer film and a sealed bag were produced as in Example 9-1 except that diester compound B was used instead of diester compound A and were evaluated as in Example 9-1.

Example 9-3

An oxygen-absorbing multilayer film and a sealed bag were produced as in Example 9-1 except that diester compound C was used instead of diester compound A and were evaluated as in Example 9-1.

Example 9-4

An oxygen-absorbing multilayer film and a sealed bag were produced as in Example 9-1 except that diester compound D was used instead of diester compound A and were evaluated as in Example 9-1.

Example 9-5

An oxygen-absorbing multilayer film and a sealed bag were produced as in Example 9-1 except that diamide compound E was used instead of diester compound A and were evaluated as in Example 9-1.

Example 9-6

An oxygen-absorbing multilayer film and a sealed bag were produced as in Example 9-1 except that acid anhydride F was used instead of diester compound A and were evaluated as in Example 9-1.

Comparative Example 9-1

A sealed bag was produced as in Example 9-1 except that a PP monolayer film (thickness: 160 μm) was used instead of the multilayer film and was evaluated as in Example 9-1.

Comparative Example 9-2

An oxygen-absorbing multilayer film and a sealed bag were produced as in Example 9-1 except that diester compound A was not used and were evaluated as in 9-1.

The following table shows the conditions and results of the Examples and the Comparative Examples.

TABLE 14

|  | Layer structure | Inner and outer layer resin | Oxygen-absorbing layer composition (parts by mass) ||| Glucose retention rate (%) | Amount of TOC in elution test [1] (μg/mL) |
|  |  |  | Thermoplastic resin | Compound having tetralin ring | Transition metal |  |  |
| --- | --- | --- | --- | --- | --- | --- | --- |
| Example 9-1 | Five-layer | PP | EVOH 95 | Diester compound A 5 | 0.05 (Co) | 91% | Undetectable |
| Example 9-2 | Five-layer | PP | EVOH 95 | Diester compound B 5 | 0.05 (Co) | 88% | Undetectable |
| Example 9-3 | Five-layer | PP | EVOH 95 | Diester compound C 5 | 0.05 (Co) | 90% | Undetectable |
| Example 9-4 | Five-layer | PP | EVOH 95 | Diester compound D 5 | 0.05 (Co) | 93% | Undetectable |
| Example 9-5 | Five-layer | PP | EVOH 95 | Diamide compound E 5 | 0.05 (Co) | 84% | Undetectable |
| Example 9-6 | Five-layer | PP | EVOH 95 | Acid anhydride F 5 | 0.05 (Co) | 86% | Undetectable |
| Comparative Example 9-1 | Monolayer | PP | PP 100 | — | — | 27% | Undetectable |
| Comparative Example 9-2 | Five-layer | PP | EVOH 100 | — | — | 49% | Undetectable |

[1] Detection lower limit: 0.1 (μg/mL)

As obvious from the table, the drug solutions stored by the storage methods of the Examples were prevented from degradation in the drug ingredients even after long-term storage. In addition, the amount of elution from the oxygen-absorbing multilayer film into the contents was small, which at least demonstrated that the method could satisfactorily store, for example, a drug solution.

INDUSTRIAL APPLICABILITY

The oxygen-absorbing multilayer body, oxygen-absorbing paper container, oxygen-absorbing container, oxygen-absorbing sealed container, and oxygen-absorbing PTP packaging body of the present invention have excellent oxygen-absorbing performance and therefore can be widely and effectively used in a general technical field requiring oxygen absorption. In addition, these products and storage methods using them can absorb oxygen regardless of the presence or absence of moisture in the article to be stored and can further prevent an increase in odor strength after oxygen absorption and therefore can be effectively used in, in particular, for example, foods, cooked foods, beverages, medicinal products, and health foods. Moreover, the oxygen-absorbing multilayer body and other products of the present invention are not responsive to a metal detector and therefore can be widely and effectively used in packaging materials, containers, etc. that are required to be inspected with a metal detector for metals, metal pieces, etc. from the outside.

The present application is based on the following Japanese Patent Applications, the contents of which are incorporated herein by reference:

Japanese Patent Application (Patent Application No. 2013-044752) filed with the Japan Patent Office on Mar. 6, 2013;

Japanese Patent Application (Patent Application No. 2013-044233) filed with the Japan Patent Office on Mar. 6, 2013;

Japanese Patent Application (Patent Application No. 2013-044753) filed with the Japan Patent Office on Mar. 6, 2013;

Japanese Patent Application (Patent Application No. 2013-044422) filed with the Japan Patent Office on Mar. 6, 2013;

Japanese Patent Application (Patent Application No. 2013-044423) filed with the Japan Patent Office on Mar. 6, 2013;

Japanese Patent Application (Patent Application No. 2013-044424) filed with the Japan Patent Office on Mar. 6, 2013;

Japanese Patent Application (Patent Application No. 2013-044234) filed with the Japan Patent Office on Mar. 6, 2013;

Japanese Patent Application (Patent Application No. 2013-044425) filed with the Japan Patent Office on Mar. 6, 2013; and Japanese Patent Application (Patent Application No. 2013-044235) filed with the Japan Patent Office on Mar. 6, 2013.

What is claimed is:

1. An oxygen-absorbing multilayer body comprising:
an oxygen-absorbing layer containing an oxygen-absorbing composition; and
a thermoplastic resin layer containing a thermoplastic resin (b), wherein
the oxygen-absorbing composition comprises at least one compound having a tetralin ring represented by Formula (1), a transition metal catalyst, and a thermoplastic resin (a):

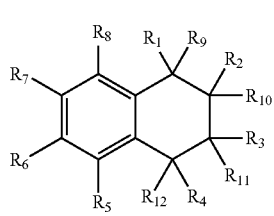
(1)

where $R_1$ to $R_{12}$ each independently represent a hydrogen atom or a monovalent substituent, the monovalent substituent being at least one selected from the group consisting of a halogen atom, an alkyl group, an alkenyl group, an alkynyl group, a phenyl group, a naphthyl group, a monovalent substituent having one hydrogen atom removed from a five- or six-membered aromatic or non-aromatic heterocyclic compound having 1 to 12 carbon atoms, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, an imide group, a substituent represented by Formula (1a), and a substituent represented by Formula (1b), which each optionally further have a substituent; two of the substituents represented by $R_1$ to $R_{12}$ are optionally bonded to each other to form an aromatic, aliphatic, or hetero ring having 4 to 7 carbon atoms, provided that the hetero ring is an acid anhydride ring being glutaric anhydride ring or adipic anhydride ring; and at least one hydrogen atom is bonded to a benzylic position of the tetralin ring;

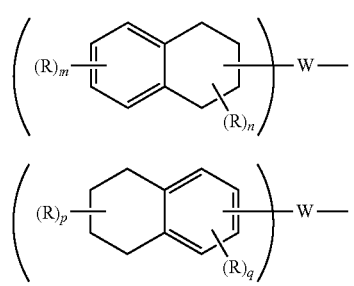

where each R independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide group, which each optionally further have a substituent; two of the substituents each represented by R are optionally bonded to each other to form a ring; W represents a bond or a bivalent organic group, the bivalent organic group being at least one selected from the group consisting of an aromatic hydrocarbon group, a saturated or unsaturated alicyclic hydrocarbon group, a linear or branched saturated or unsaturated aliphatic hydrocarbon group and a heterocyclic group, —C(=O)—, —OC(=O)—, —N(H)C(=O)—, and an arbitrary combination thereof; m represents an integer of 0 to 4; n represents an integer of 0 to 7; p represents an integer of 0 to 8; and q represents an integer of 0 to 3.

2. The oxygen-absorbing multilayer body according to claim 1, wherein the compound having a tetralin ring represented by Formula (1) has two or more carbonyl groups.

3. The oxygen-absorbing multilayer body according to claim 2, wherein in Formula (1), at least two of $R_1$ to $R_{12}$ are monovalent substituents represented by Formula (2):

—C(=O)—X (2)

where X represents one selected from the group consisting of a hydrogen atom, a hydroxy group, an alkyl group, an alkoxy group, a monoalkylamino group, and a dialkylamino group; and a plurality of X may be the same or different.

4. The oxygen-absorbing multilayer body according to claim 1, wherein the compound having a tetralin ring represented by Formula (1) has two or more tetralin rings.

5. The oxygen-absorbing multilayer body according to claim 1, wherein a proportion of the amount of the compound having a tetralin ring represented by Formula (1) to the total amount of the compound having a tetralin ring represented by Formula (1) and the thermoplastic resin (a) in the oxygen-absorbing composition is 1% to 30% by mass.

6. The oxygen-absorbing multilayer body according to claim 1, wherein the thermoplastic resin (a) is at least one selected from the group consisting of a polyolefin, a polyester, a polyamide, an ethylene-vinyl alcohol copolymer, and a chlorine-containing resin.

7. The oxygen-absorbing multilayer body according to claim 1, wherein the transition metal catalyst contains at least one transition metal selected from the group consisting of manganese, iron, cobalt, nickel, and copper.

8. The oxygen-absorbing multilayer body according to claim 1, wherein the transition metal catalyst is contained in an amount of 0.001 to 10 parts by mass in terms of the transition metal amount, in the oxygen-absorbing composition, based on 100 parts by mass of the total amount of the compound having a tetralin ring represented by Formula (1) and the thermoplastic resin (a).

9. The oxygen-absorbing multilayer body according to claim 1, wherein
the thermoplastic resin layer is a sealant layer; and
the oxygen-absorbing multilayer body is composed of at least three layers including the sealant layer, the oxygen-absorbing layer, and a gas barrier layer containing a gas barrier material in this order.

10. An oxygen-absorbing paper container prepared by molding an oxygen-absorbing multilayer body being composed of at least four layers including the oxygen-absorbing multilayer body according to claim 9 and a paper base layer laminated to the gas barrier layer side of the oxygen-absorbing multilayer body.

11. An oxygen-absorbing container comprising the oxygen-absorbing multilayer body according to claim 1.

12. The oxygen-absorbing container according to claim 11, being one selected from the group consisting of a pouch, a cup, a tray, and a bottle.

13. The oxygen-absorbing multilayer body according to claim 1, being an oxygen-absorbing multilayer injection-molded article.

14. An oxygen-absorbing sealed container comprising:
an oxygen-absorbing multilayer container body prepared by molding the oxygen-absorbing multilayer body according to claim 1; and
a gas barrier lid member being composed of at least two layers including an inner layer containing a thermoplastic resin (c) and a gas barrier layer containing a gas barrier material in this order, wherein
the thermoplastic resin layer in the oxygen-absorbing container body and the inner layer in the gas barrier lid member are joined to each other.

15. An oxygen-absorbing PTP packaging body comprising:
an oxygen-absorbing bottom member prepared by molding the oxygen-absorbing multilayer body according to claim 1; and
a gas barrier lid member being composed of at least two layers including an inner layer containing a thermoplastic resin (d) and a gas barrier layer containing a gas barrier material in this order, wherein
the thermoplastic resin layer in the oxygen-absorbing bottom member and the inner layer in the gas barrier lid member are joined to each other.

16. A storage method comprising storing at least one selected from the group consisting of cooked rice, an alcoholic beverage, fruit juice and/or vegetable juice, and a drug solution in an oxygen-absorbing container including the oxygen-absorbing multilayer body according to claim 1.

* * * * *

UNITED STATES PATENT AND TRADEMARK OFFICE
CERTIFICATE OF CORRECTION

PATENT NO. : 10,035,640 B2
APPLICATION NO. : 14/766562
DATED : July 31, 2018
INVENTOR(S) : S. Okada et al.

It is certified that error appears in the above-identified patent and that said Letters Patent is hereby corrected as shown below:

On the Title Page

Item (73), Assignee, "MITSUBISHI HAS CHEMICAL COMPANY, INC." should be
--- MITSUBISHI GAS CHEMICAL COMPANY, INC. ---

Signed and Sealed this
Twenty-eighth Day of May, 2019

Andrei Iancu
*Director of the United States Patent and Trademark Office*